United States Patent
Guzzetta et al.

(10) Patent No.: US 10,233,119 B2
(45) Date of Patent: *Mar. 19, 2019

(54) CONCRETE HAVING REDUCED SURFACE DRYING TIME AND CEMENTITIOUS COMPOSITIONS AND METHODS FOR MANUFACTURING SAME

(71) Applicant: US CONCRETE, INC., Euless, TX (US)

(72) Inventors: Alana Grace Guzzetta, San Jose, CA (US); Ryan Allen Henkensiefken, San Jose, CA (US); Raymond C. Turpin, Jr., Atlanta, GA (US)

(73) Assignee: US Concrete, Inc., Euless, TX (US)

(*) Notice: Subject to any disclaimer, the term of this patent is extended or adjusted under 35 U.S.C. 154(b) by 201 days.

This patent is subject to a terminal disclaimer.

(21) Appl. No.: 15/200,655

(22) Filed: Jul. 1, 2016

(65) Prior Publication Data

US 2017/0057869 A1    Mar. 2, 2017

Related U.S. Application Data

(63) Continuation of application No. 14/601,175, filed on Jan. 20, 2015, now Pat. No. 9,382,157, which is a (Continued)

(51) Int. Cl.
*C04B 7/00* (2006.01)
*C04B 22/12* (2006.01)
(Continued)

(52) U.S. Cl.
CPC ............ *C04B 22/124* (2013.01); *C04B 14/06* (2013.01); *C04B 20/002* (2013.01); *C04B 22/08* (2013.01);
(Continued)

(58) Field of Classification Search
USPC ................................. 106/638, 698, 700, 702
See application file for complete search history.

(56) References Cited

U.S. PATENT DOCUMENTS 2,880,102 A    3/1959    Woodard
3,767,436 A   10/1973    Peppler
(Continued)

FOREIGN PATENT DOCUMENTS

AT    509307    7/2011
DE    230527    1/1910
(Continued)

OTHER PUBLICATIONS

Bentz et al., "Microstructural Modelling of Self-Desiccation During Hydration, Conference Proceedings of an International Research Seminar entitled 'Self-Desiccation and its Importance in Concrete Technology'", Jun. 10, 1997, Lund Institute of Technology, Division of Building Materials, Lund, Sweden.
(Continued)

*Primary Examiner* — James E McDonough
(74) *Attorney, Agent, or Firm* — Randall C. Brown; John M. Guynn

(57) ABSTRACT

Cementitious compositions and methods for preparing and using the cementitious compositions to yield hardened concrete. The cementitious compositions yield hardened concrete having reduced or attenuated water vapor emission and lower internal relative humidity (IRH). Cementitious compositions are characterized by the property of rapid surface drying while maintaining good workability, particularly when using porous lightweight aggregates that absorb substantial amounts of water. Methods of decreasing water availability and increasing surface drying of concrete, including lightweight concrete, are provided. A water soluble ionic salt may be used to sequester water within the pores and capillaries of the cement paste and/or porous
(Continued)

lightweight aggreate by modifying the colligative propertie of pore water. The salt may be added directly to concrete or the concrete mix water, or, alternatively, aggregates may be infused with a water-salt solution to provide treated porous aggregates having improved water saturation and water retention.

21 Claims, 10 Drawing Sheets

Related U.S. Application Data continuation-in-part of application No. PCT/US2013/051356, filed on Jul. 19, 2013.

(60) Provisional application No. 61/709,428, filed on Oct. 4, 2012, provisional application No. 61/673,927, filed on Jul. 20, 2012.

(51) Int. Cl.

| | |
|---|---|
| *C04B 28/02* | (2006.01) |
| *C04B 28/04* | (2006.01) |
| *C04B 20/00* | (2006.01) |
| *C04B 40/06* | (2006.01) |
| *C04B 22/08* | (2006.01) |
| *C04B 22/14* | (2006.01) |
| *C04B 24/04* | (2006.01) |
| *C04B 24/12* | (2006.01) |
| *C04B 14/06* | (2006.01) |
| C04B 7/34 | (2006.01) |
| C04B 28/00 | (2006.01) |
| C04B 32/00 | (2006.01) |
| C04B 14/00 | (2006.01) |
| C04B 14/40 | (2006.01) |
| C04B 103/14 | (2006.01) |
| C04B 111/60 | (2006.01) |
| C04B 103/30 | (2006.01) |
| C04B 103/32 | (2006.01) |

(52) U.S. Cl.
CPC .......... *C04B 22/085* (2013.01); *C04B 22/147* (2013.01); *C04B 24/04* (2013.01); *C04B 24/125* (2013.01); *C04B 28/02* (2013.01); *C04B 28/04* (2013.01); *C04B 40/0633* (2013.01); *C04B 2103/14* (2013.01); *C04B 2103/302* (2013.01); *C04B 2103/32* (2013.01); *C04B 2111/60* (2013.01); *Y02P 40/146* (2015.11); *Y02W 30/92* (2015.05); *Y02W 30/94* (2015.05)

(56) References Cited

U.S. PATENT DOCUMENTS

| | | |
|---|---|---|
| 3,864,290 A | 2/1975 | Peppler |
| 4,002,713 A | 1/1977 | Duncan et al. |
| 4,018,617 A | 4/1977 | Nicholson |
| 4,032,353 A * | 6/1977 | Ball .................... C04B 28/02 |
| | | 106/725 |
| 4,092,109 A | 5/1978 | Rosenberg et al. |
| 4,261,755 A | 4/1981 | Berry |
| 4,285,733 A | 8/1981 | Rosenberg et al. |
| 4,355,079 A | 10/1982 | Rosenberg et al. |
| 4,398,959 A | 8/1983 | Rosenberg et al. |
| 4,946,506 A | 8/1990 | Arfaei et al. |
| 5,039,556 A | 8/1991 | Cogliano et al. |
| 5,176,753 A | 1/1993 | Brook |
| 5,306,344 A | 4/1994 | Gutmann et al. |
| 5,340,385 A | 8/1994 | Arfaei et al. |
| 5,520,730 A | 5/1996 | Barbour |
| 5,626,663 A | 5/1997 | Berke et al. |
| 5,725,657 A | 3/1998 | Darwin et al. |
| 6,451,105 B1 | 9/2002 | Turpin, Jr. |
| 6,468,344 B1 | 10/2002 | Liang et al. |
| 6,858,074 B2 | 2/2005 | Anderson et al. |
| 7,658,797 B2 * | 2/2010 | Guevara ................ C04B 16/08 |
| | | 106/724 |
| 8,167,996 B2 * | 5/2012 | Bui .......................... C04B 28/04 |
| | | 106/713 |
| 8,220,344 B2 | 7/2012 | Turpin et al. |
| 9,133,058 B2 | 9/2015 | Turpin, Jr. et al. |
| 9,174,869 B2 | 11/2015 | Guzzetta et al. |
| 9,382,157 B2 * | 7/2016 | Guzzetta ................ C04B 28/02 |
| 2001/0013302 A1 | 8/2001 | Mathur et al. |
| 2002/0014187 A1 | 2/2002 | Greenwood et al. |
| 2002/0107310 A1 | 8/2002 | Shendy et al. |
| 2003/0030450 A1 | 2/2003 | Devine |
| 2003/0127026 A1 | 7/2003 | Anderson et al. |
| 2003/0181579 A1 | 9/2003 | Porsch et al. |
| 2004/0127606 A1 | 7/2004 | Goodwin |
| 2004/0149174 A1 | 8/2004 | Farrington et al. |
| 2004/0198873 A1 | 10/2004 | Bury et al. |
| 2005/0072339 A1 | 4/2005 | Jardine et al. |
| 2005/0139129 A1 | 6/2005 | Daczko et al. |
| 2005/0274294 A1 | 12/2005 | Brower et al. |
| 2006/0030643 A1 | 2/2006 | Bury et al. |
| 2006/0243169 A1 | 11/2006 | Mak et al. |
| 2006/0281835 A1 | 12/2006 | Ong |
| 2006/0281836 A1 | 12/2006 | Kerns et al. |
| 2007/0125273 A1 | 6/2007 | Pinto |
| 2007/0163470 A1 | 7/2007 | Chanut et al. |
| 2007/0186821 A1 | 8/2007 | Brown |
| 2007/0256605 A1 | 11/2007 | Aldykiewicz, Jr. et al. |
| 2007/0266905 A1 | 11/2007 | Arney et al. |
| 2008/0058446 A1 | 3/2008 | Guevara et al. |
| 2008/0087199 A1 | 4/2008 | Gartner |
| 2008/0156225 A1 | 7/2008 | Bury |
| 2008/0171813 A1 | 7/2008 | Sprouts et al. |
| 2008/0178769 A1 | 7/2008 | Goodwin et al. |
| 2008/0227891 A1 | 9/2008 | Jarvie et al. |
| 2008/0275149 A1 | 11/2008 | Ladely et al. |
| 2009/0305019 A1 | 12/2009 | Chanvillard et al. |
| 2011/0015306 A1 | 1/2011 | Turpin, Jr. |
| 2011/0259246 A1 | 10/2011 | Guynn et al. |
| 2012/0097072 A1 | 4/2012 | Turpin, Jr. et al. |
| 2013/0303662 A1 | 11/2013 | Guzzetta et al. |

FOREIGN PATENT DOCUMENTS

| | | |
|---|---|---|
| DE | 2164051 | 7/1973 |
| DE | 3237090 | 4/1984 |
| EP | 0457634 | 11/1991 |
| EP | 0744387 | 11/1996 |
| EP | 1148329 | 10/2001 |
| EP | 1632461 | 3/2006 |
| EP | 1900705 | 3/2008 |
| EP | 1903014 | 3/2008 |
| EP | 1958926 | 8/2008 |
| FR | 2921358 | 3/2009 |
| JP | 2001289766 | 10/2001 |
| JP | 2008254963 | 10/2008 |
| WO | WO2006114095 | 11/2006 |
| WO | WO2007046417 | 4/2007 |
| WO | WO2010124312 | 11/2010 |
| WO | WO2011008936 | 1/2011 |

OTHER PUBLICATIONS

Examination Report for Canadian Patent Application No. 2,762,317 prepared by the Canadian Intellectual Property Office dated Jul. 24, 2013.

Examination Report for Canadian Patent Application No. 2,762,317 prepared by the Canadian Intellectual Property Office dated Aug. 6, 2014.

Examination Report for Canadian Patent Application No. 2,762,317 prepared by the Canadian Intellectual Property Office dated Apr. 10, 2015.

(56) References Cited

OTHER PUBLICATIONS

Examination Report for Canadian Patent Application No. 2,762,317 prepared by the Canadian Intellectual Property Office dated Jan. 7, 2016.
Examination Report for Mexican Patent Application No. MX/a/2011/013854 prepared by the Mexican Institute of Industrial Property on Sep. 18, 2014 and English translation thereof.
Examination Report for Mexican Patent Application No. MX/a/2011/013854 prepared by the Mexican Institute of Industrial Property on Jun. 4, 2015 and English translation thereof.
Examination Report for Mexican Patent Application No. MX/a/2011/013854 prepared by the Mexican Institute of Industrial Property dated Oct. 29, 2015 and English translation thereof.
ISR and WO for PCT/US2010/042109 dated Apr. 15, 2011.
ISR and WO for PCT/US2010/042056 dated Aug. 22, 2011.
ISR for PCT/US2013/053156 dated Oct. 17, 2013.
Partial Search Report for International Application No. PCT/US2010/042056 dated Oct. 18, 2010.
Partial Search Report for International Application No. PCT/US2010/042109 dated Oct. 21, 2010.
Rougeau et al., "Ultra High Performance Concrete with Ultrafine Particles Other Than Silica Fume", Proceedings of the International Symposium on Ultra High Performance Concrete, Sep. 13, 2004, pp. 213-225.
Social 31 Technical Data Sheet, http://www.solvaychemicals.com/EN/products/pcc/UltrafineUncoatedPCC.aspx retrieved Mar. 24, 2014.
Suprenant et al., "Are Your Slabs Dry Enough for Floor Coverings?", the Aberdeen Group (1998), pp. 1-4.
Suprenant et al., "Long Wait for Lightweight", Concrete Construction, Nov. 2000, pp. 1-2.
Vejmelkova et al., "High Performance Concrete Containing lower Slag Amount: A Complex View of Mechanical and Durability Properties", Construction and Building Materials, vol. 23, (2009), pp. 2237-2245.
Yang et al., "Self-desiccation Mechanism of High-Performance Concrete", Research Lab of Materials Engineering, College of Materials Science and Engineering, Tongji University, Shanghai 200433, China (2004).
U.S. Appl. No. 13/062,603, filed May 16, 2011, Restriction Requirement dated Oct. 21, 2013.
U.S. Appl. No. 13/947,715, filed Jul. 22, 2013, Restriction Requirement dated Dec. 17, 2013.
U.S. Appl. No. 13/062,603, filed May 16, 2011, Office Action dated Mar. 31, 2014.
U.S. Appl. No. 13/947,715, filed Jul. 22, 2013, Office Action dated Apr. 8, 2014.
U.S. Appl. No. 13/062,603, filed May 16, 2011, Final Office Action dated Aug. 13, 2014.
U.S. Appl. No. 13/062,603, filed May 16, 2011, Advisory Action dated Oct. 22, 2014.
U.S. Appl. No. 13/062,603, filed May 16, 2011, Office Action dated Jan. 14, 2015.
U.S. Appl. No. 13/947,715, filed Jul. 22, 2013, Office Action dated Jan. 14, 2015.
U.S. Appl. No. 14/601,175, filed Jan. 20, 2015, Restriction Requirement dated Apr. 15, 2015.
U.S. Appl. No. 13/062,603, filed May 16, 2011, Notice of Allowance dated May 8, 2015.
U.S. Appl. No. 14/601,175, filed Jan. 20, 2015, Office Action dated Jun. 12, 2015.
U.S. Appl. No. 13/947,715, filed Jul. 22, 2013, Notice of Allowance dated Jun. 26, 2015.
U.S. Appl. No. 14/601,175, filed Jan. 20, 2015, Final Office Action dated Aug. 5, 2015.
U.S. Appl. No. 14/601,175, filed Jan. 20, 2015, Office Action dated Nov. 17, 2015.
U.S. Appl. No. 14/867,545, filed Sep. 28, 2015, Office Action dated Jan. 13, 2016.
U.S. Appl. No. 14/601,175, filed Jan. 20, 2015, Notice of Allowance dated Mar. 1, 2016.
Office Action issued for Mexican Patent Application No. MX/a/2016/008861 prepared by the Mexican Institute of Industrial Property, dated Sep. 4, 2018, and English translation thereof. (4 pages).

* cited by examiner

CONCRETE HAVING REDUCED SURFACE DRYING TIME AND CEMENTITIOUS COMPOSITIONS AND METHODS FOR MANUFACTURING SAME

CROSS REFERENCE TO RELATED APPLICATIONS

This Application is a continuation of U.S. patent application Ser. No. 14/601,175, filed Jan. 20, 2015, issued U.S. Pat. No. 9,382,157, which is a continuation-in-part of International Patent App. No. PCT/US2013/051356, filed Jul. 19, 2013, which claims the benefit of U.S. Provisional Application No. 61/673,927 filed Jul. 20, 2012 and U.S. Provisional Application No. 61/709,428 filed Oct. 4, 2012. The disclosures of the foregoing applications are incorporated herein in their entirety.

BACKGROUND

1. Field of the Invention

The invention is in the field of concrete compositions, particularly concrete having decreased rate of water vapor emission, lower internal relative humidity, and faster surface drying after hardening.

2. Related Technology

Concrete is a composite construction material composed primarily of the reaction products of hydraulic cement, aggregates, and water. Water is both a reactant for the cement component and is necessary to provide desired flow characteristics (e.g., spread and/or slump) and ensure consolidation of freshly mixed concrete to prevent formation of strength-reducing voids and other defects. Chemical admixtures may be added to freshly mixed concrete to modify characteristics such as rheology (i.e., plastic viscosity and yield stress), water retention, and set time. Although some of the water reacts with the cement component to form crystalline hydration products, a substantial portion remains unreacted and is typically gradually removed from concrete by evaporation. The continuing presence of water in concrete can pose problems, particularly when applying a floor covering.

The discontinued use of volatile components in floor covering adhesives for concrete surfaces has created bonding and delamination problems. Concrete contains reaction water for cement hydration and water of convenience to facilitate workability and placement. Water is both chemically bound and entrapped in gel and small capillaries comprising about 30-50% of the paste material, depending upon maturity. Water in concrete must be consumed, sequestered, or evaporated into the atmosphere before a proper, permanent water-based adhesive bond can be assured. Unfortunately, the time necessary to accommodate the requisite drying process is approximately one month per inch of concrete floor depth for standard weight concrete.

A cementitious composition for forming concrete generally refers to a mixture of natural and/or artificial aggregates, such as, for example, sand and either gravel or crushed stone, which are held together by cement paste binder to form a highly durable building material. Cement paste is typically made up of the reaction products of hydraulic cement, such as Portland cement, and water. Cement paste may also contain one or more chemical admixtures as well as supplementary cementing materials, such as, for example, fly ash or ground granulated blast furnace slag cement (GGBFS).

Blended cements can comprise one or more pozzolan materials, which are primarily glassy or non-crystalline siliceous or aluminosiliceous materials that are hydraulically reactive and have cementitious properties in the presence of excess calcium hydroxide provided by hydrating Portland cement. The silicates and aluminates of a pozzolan reacting with excess calcium hydroxide form secondary cementitious phases (e.g., calcium silicate hydrates similar to those from Portland cement, but possibly having a lower calcium to silicate ratio), which provide additional strengthening properties that usually begin after about 7 days of curing.

Blended hydraulic cement may comprise up to 40% or more fly ash, which reduces the amount of water that must be blended with the cementitious composition, allowing for improvement in later strength as the concrete cures. Other examples of pozzolans that can be used in hydraulic cement blends include highly reactive pozzolans, such as silica fume and metakaolin, which further increases the rate at which the concrete gains strength, resulting in a higher early strength. Current practice permits up to 40% or more reduction in the amount of hydraulic cement used in the concrete mix when replaced with a combination of pozzolans that do not significantly reduce the final compressive strength or other performance characteristics of the resulting concrete.

Lightweight aggregates are frequently designed into a concrete mix to reduce building dead load, enable longer spans, provide better seismic benefits, increase fire resistance, and improve sound insulation. This lightweight material commonly comprises expanded shale, clay, pumice, cinders, or polystyrene with a density of about ½ or less than that of normal aggregates and is capable of producing concrete that weighs from 800 to 1000 pounds less per cubic yard.

In general, the weight reduction in lightweight aggregate is achieved by creating a highly porous internal structure that can, unfortunately, also absorb up to 30% water. This water is in addition to the normal water of convenience and can impart an additional amount to the concrete mix equal to 2-3 times of that which must normally be consumed and evaporated, thereby further increasing the time-to-dry for adhesive or epoxy application. To prevent workability losses due to water absorption during mixing, transport and placement, porous aggregates are often pre-conditioned with water.

Should the concrete be conveyed to the location of placement by a concrete pump, water absorption by the porous aggregates becomes more critical, since the concrete may be subjected to liquid pressure within the pump and attendant line of up to 1000 psi (69 bar), which greatly compresses the air in the pores and causes significant additional water absorption. Such pressure can force water required for workability into previously unsaturated pores of lightweight aggregates (i.e., pores which are not filled when subjected to atmospheric pressure but which can be filled at high pressures associated with pumping). Thus, complete saturation of the pores of lightweight aggregates is preferred to prevent workability loss and potential pump line obstructions under these conditions.

Unfortunately, complete saturation is impractical since prolonged soaking in water will not displace air trapped within the capillaries of the lightweight aggregate, so some loss of mix water during conveyance has to be tolerated. Moreover, water instilled into porous aggregates may quickly evaporate in storage, returning the lightweight aggregate largely to its previous dry condition within days. Thus, pre-wetted aggregates must be used almost immediately to capture the desired benefit.

Moreover, even these methods often do not typically result in fully saturated capillaries. Any remaining empty capillaries, when subjected to pump pressures, partially fill with water in response, compressing the air trapped in the capillaries of the lightweight in accord with the Universal Gas Law, thus resulting in the aforementioned workability losses and potential line clogging during pumping. This can have several consequences: additional water must be added to the concrete mix prior to pumping to maintain workability sufficient to facilitate pumping. Thereafter, when the concrete exits the pump and returns to normal atmospheric pressure, the excess water responds to the compressed air within the lightweight aggregates and is partially forced back out into the mix. This, in effect, increases the water-to-cement ratio, excessively diluting the plastic concrete mix and impacting the hardened concrete's permeability.

The cementitious materials in concrete require water, typically known as chemical water or hydration water, to chemically evolve into a hard, crystalline binder. For example, Portland cements generally require up to about 40% of their weight in water in order to promote complete hydration and chemical reaction.

Excess water has conventionally been added to make concrete more plastic allowing it to flow into place. This excess water is known as water of convenience. A small amount of the water does escape as a result of solids settling during the plastic phase, evaporation at the atmospheric interface, and absorption into accepting interface materials. However, much of the water of convenience remains in the concrete during and immediately following hardening. The water of convenience can then escape into the atmosphere following the hardening of the concrete. The water of convenience, depending on, among other things, the water to cementitious ratio, may represent up to about 70% of the total water in the concrete.

The concrete construction and floor-covering industries may incur both construction delays and remedial costs as a result of water vapor emissions and water intrusion from concrete. For example, adhesives and coatings used in the construction of concrete floors are relatively incompatible with moisture that develops at the concrete surface. Moisture may also create an environment for promoting the growth of mold.

Water tightness in concrete structures is a measure of the ability of the hardened concrete to resist the passage of water. Water vapor emission is proportional to the state of relative dryness of the body of the concrete structure. Once isolated from external sources of water, water vapor emissions are derived from the amount of water that is used in excess of that needed to harden the cementitious materials—i.e., the water of convenience. Depending upon the atmospheric temperature and humidity at the surface and the thickness of the concrete, the elimination of excess water through water vapor emissions can take months to reach a level that is compatible with the application of a coating or an adhesive.

There is also a possibility that water may develop under the floor due to flooding, water backup, etc. Hardened concrete that resists water vapor permeation is capable of further protecting any coatings that have been applied to the surface of the concrete. There is a need in the art for a concrete that, once it becomes hardened, is substantially resistant to water vapor permeation.

Installation of an impermeable barrier on the surface of the concrete prior to reaching an acceptable level of dryness may result in moisture accumulation, adhesive failure, and a consequential failure of the barrier due to delamination. Premature application of coatings and adhesives increases the risk of failure, while the delay caused by waiting for the concrete to reach an acceptable level of dryness may result in potentially costly and unacceptable construction delays.

The floor covering industry has determined, depending on the type of adhesive or coating used, that a maximum water vapor emission rate of from 3 to 5 pounds of water vapor per 1,000 square feet per 24 hour period ($lb/1000\ ft^2/24\ h$) is representative of a state of slab dryness necessary before adhesive may be applied to the concrete floor. Accordingly, there remains a long-felt but unsatisfied need in the art for cementitious compositions that reduce the amount of time needed to reach a desired water vapor emission rate in concrete floors enabling a more timely application of coatings and adhesives.

It is known in the art that certain polymers classified as superplasticizers may be included in concrete in order to reduce the amount of water of convenience needed to allow the cementitious mix to more readily flow into place. Certainly, a reduction in the amount of excess water remaining after the concrete hardens should lead to a reduction in the amount of time necessary to reach a desired water vapor emissions rate. However, the use of superplasticizers alone does not address other effects that influence the rate of water vapor emission from the concrete.

Accordingly, there remains a need in the art for cementitious compositions that further reduce the amount of time necessary to reach a desired water vapor emission rate in concrete floors beyond that which is achieved through a reduction in the amount of water required through the use of a superplasticizer additive.

If attainment of faster drying lightweight concrete is an objective, the usual method of water reduction by utilizing large doses of superplasticizers (very high range water reducers) is difficult because of the sensitivity of the mix to the loss of the enhanced efficiency water (Field workability consistency). Furthermore, high doses of superplasticizers tend to impart a thixotropic characteristic exhibited by workability loss if deprived of mixing shear. This loss of mixing shear often occurs during pump hose movement or delay in concrete supply. Because the efficiency of admixture-treated water is improved, loss of water by temporary absorption into the pores of lightweight aggregates during pressurized pumping has both a substantially greater negative impact on workability and a greater negative impact causing potential segregation and bleeding when the admixture-treated water is released from the pores of the aggregates after exiting the pump.

Similarly, the inclusion of silica fume or metakaolin both well-known. Highly reactive pozzolans possess very high surface areas and therefore again require super-plasticizer to reduce water and maintain workability. It also has been found that highly super-plasticized concrete is more difficult to air entrain. Air entrainment is an important feature of lightweight concrete, since it aids in reducing weight and lowers the mortar density thereby attenuating the tendency of the coarse lightweight aggregate particles to float to the surface and hinder finishing operations.

The absorbed water and resulting added mixture water caused by pumping concrete containing porous lightweight aggregates therefore poses difficulties when accelerated drying of the concrete is desired. As a consequence of concrete hydration and lowering of internal vapor pressure in the mortar, the additional water released from the capillaries of the porous aggregates permeates the mortar in the concrete. While this can be beneficial from the standpoint of promoting more complete hydration of the cementitious binder, particularly in lower water-to-cement ratio systems, it can create a prolonged period of relatively high humidity within the concrete, resulting in moist concrete that must dry out before it can be coated or sealed. Such drying is further retarded in humid climates.

The state of dryness within concrete is usually determined by drilling holes to accommodate in situ humidity probes. When these probes are installed at the depth required by ASTM F-2170-09, it is presumed to be representative of the future sealed equilibrium moisture condition of the full concrete thickness. Attainment of 75-80% relative humidity (some floor coverings tolerances may be slightly more or less) ensures that the concrete surface is ready for adhesive application. Experience in the floor covering industry has validated research data which indicates that if internal humidity probes are inserted to a depth of 40% of a concrete structure having one side exposed to the atmosphere (20% if two sides are exposed) in accordance with ASTM F-2170-09, "Standard Method for Determining Humidity in Concrete Floor Slabs Using in situ Probes", and the probes indicate an internal relative humidity of 75-80%, that this is representative of the sealed future equilibrium moisture condition of the full thickness. If the internal relative humidity is higher than 75-80%, it is assumed the floor will not accept water based glue and will generate sufficient vapor pressure to delaminate impervious coatings. Below that amount, and absent outside moisture influences, it is assumed the structure can accept water based glue and not generate sufficient vapor pressure differential to de-bond impervious coatings. Epoxy sealers are also sensitive to water vapor pressure and consequently, encounter similar problems. Premature application of either water-soluble adhesive or epoxy sealer to under-dried concrete can result in moisture accumulation beneath the applied impervious surface and a potential for loss of bond with the epoxy or flooring. There are sealers that can be applied to attenuate the water vapor emission, but they often fail, resulting in loss of space utilization during repair and occasionally creating costly litigation. To reduce the risk of such problems, floors with excessive humidity may require drying times of up to a year or more.

The substitution of the porous lightweight aggregates which absorb water instead of normal aggregates can prolong drying times by months or a year or more. Research has demonstrated that high performance standard weight coarse aggregates concrete (HPC) can dry to satisfactory IRH condition comparatively rapidly. These concretes have a water-to-cementitious ratio (w/cm) generally below 0.40 and can contain fairly large amounts of cement or cement/pozzolans to achieve an internal relative humidity of 75-80% as determined by ASTM F 2170. An example of the large water difference is shown in Table 1 below.

TABLE 1

| | dry, lbs Normal | dry, lbs High Performance Concrete (HPC) | | dry, lbs Lightweight HPC |
|---|---|---|---|---|
| Cement | 300 | 400 | | 400 |
| GGBFS | 200 | 400 | | 400 |
| Sand | 1340 | 1274 | | 1220 |
| Stone | 1750 | 1750 | Lightweight | 850 |
| Water | 325 | 285 | | 325 |
| plasticizer | 10 oz | 40 oz. | | 40 oz. |
| W/C | 0.65 | 0.36 | | 0.41 |
| PCF | 145 | 150.5 | | 118.3 |
| AE | 1.30% | 1.30% | | 5% |

TABLE 1-continued

| | dry, lbs Normal | dry, lbs High Performance Concrete (HPC) | dry, lbs Lightweight HPC |
|---|---|---|---|
| Total W/C | 0.70 | 0.39 | 0.60 |
| Aggregate Water | 23 | 23 | 151 |

Other research by Suprenant and Malisch (1998) reported that a 4 inch concrete slab made from conventional concrete required 46 days to reach a moisture vapor emission rate (MVER) of 3.0 lb/1000 ft$^2$/24 h. In 1990 they reported that a lightweight concrete slab made with the same w/cm and cured in the same manner took 183 days to reach the same MVER, a four foldincrease.

The construction industry, therefore, faces a dichotomy. It can address water absorption by the porous aggregate with as much water as needed to ensure pumpability and avoid critical workability loss in the pump line and deal with the consequent prolonged drying time of up to a year or accept the risk of floor failure by using a sealer to isolate the moisture-laden floor from an applied impervious coating or water soluble glue. The concrete construction and floor-covering industries may therefore incur construction delays and/or remedial costs as a result of water vapor emissions and water intrusion from concrete. Moisture may also create an environment for promoting growth of mold.

BRIEF SUMMARY

Disclosed herein are concrete compositions that achieve faster surface drying compared to conventional concrete of similar or even lower water-to-cementitious binder ratio (w/cm). Also disclosed are cementitious compositions and methods for manufacturing hardened concrete having decreased internal relative humidity and rate of water vapor emission, which yield concrete having a faster drying outer surface. Concrete having accelerated surface drying characteristics and decreased internal relative humidity can be advantageous for different reasons, including sooner application of coatings and adhesives to the faster-drying concrete surface compared to conventional concrete of similar or lower w/cm.

In contrast to conventional methods for obtaining concrete with fast surface-drying characteristics, which include lowering the w/cm of the concrete and/or accelerating hydration of the cementitious binder, the compositions and methods disclosed herein at least partially rely on the use of one or more water-soluble salts to adjust the colligative properties of the remaining pore water in concrete. In this way, concrete of virtually any w/cm can be modified to have accelerated surface and internal drying characteristics. Whereas the amount of pore water remaining in hardened concrete at any given time is related to the w/cm and also the rate at which water is consumed by the hydration reactions between water and cementitious binder(s), the colligative properties of the pore water can be controlled independently of the w/cm and hydration rate by including an appropriate quantity of dissolved ions within the pore water.

According to some embodiments, the colligative properties of the pore water in concrete is controlled by including one or more water soluble salts, such as one or more alkali metal salts, within the cementitious composition or mix used to manufacture the concrete. The ions released from the water soluble salt(s) sequester unreacted pore water in the hardened concrete, which reduces the partial pressure of water vapor and the internal relative humidity (IRH) within the hardened concrete. Reducing the partial pressure of water vapor and IRH in hardened concrete in turn reduces the rate of water vapor emission from the hardened concrete, which results in faster drying of the concrete surface. This advantageously permits sooner application of coatings, adhesives, or layers onto the concrete surface as compared to concrete of similar or even lower w/cm known in the art.

Based on the principles disclosed herein, the selection of an appropriate quantity of added ionic salt to achieve an IRH of 75-80% or below within a predetermined period of time can be determined for concrete of virtually any w/cm and which hydrates at any known or predicted rate. For example, a cementitious mixture can be designed to include an amount of hydraulic cement, water, and one or more ionic salts so that water that has not reacted with hydraulic cement at a predetermined time period, such as within 50 days, 45 days, 40 days, 35 days, 30 days, 28 days, 25 days, 20 days, 15 days, or 10 days, will contain a sufficient concentration of ions so as to achieve an IRH of 75-80% within the predetermined time period.

According to some embodiments, a cementitious mix can be designed with an amount of cementitious binder, water, and salt so that the moles of remaining pore water, divided by the sum of remaining moles of free water and available moles of dissolved ions, equals 0.75-0.80 or less, which is closely related to the partial pressure of water vapor as well as the IRH within hardened concrete as determined by ASTM F-2170. The addition of non-volatile and substantially non-reactive (relative to hydraulic cement) salt to the water solution will decrease the IRH and therefore the water vapor emission according to the number of solute particles present. According to some embodiments, there can be enough salt and cementitious material to ensure this eventual ratio within a specified time period or range. However, if the added salt reacts with the hydraulic cement binder, the concentration of ions within the free pore water contributed by the added salt will be substantially reduced over time by the degree of such reaction, which can add uncertainty and unpredictability to the system.

According to some embodiments, the relationship between the moles of remaining free water and moles of dissolved ions required to achieve a desired IRH for hardened concrete of 75-80% or less within a specified time period or range can be expressed according to Equation (I):

$$\text{Moles Free Water} \div (\text{Moles Free Water} + \text{Moles Dissolved Ions}) \leq 0.75\text{-}0.80 \quad \text{Equation (I).}$$

As the dissolved ion concentration increases, the ratio according to Equation (I) also decreases, as do the partial pressure of water vapor and the IRH of hardened concrete. By understanding this relationship, one of ordinary skill in the art can estimate an appropriate quantity of one or more salts that will yield hardened concrete that will have a predictable IRH of 75-80% or below within a predetermine time period or range. In this way, one can quickly target a given salt and verify this quantity by testing above and below the target to avoid adding either too little salt, which could yield hardened concrete having a surface that dries too slowly, or too much salt, which can cause other problems, such as reduced strength and/or durability. Another important aspect of Equation (I) is that as the amount of free water dissipates, either by evaporation of water from the concrete surface, continued cement hydration, or both, the numerator decreases at a faster rate than the denominator because the moles of salt ions present remain unchanged. This further accelerates the rate at which desired surface humidity of the hardened concrete is attained as compared to the rate of surface drying of concrete and attainment of said surface humidity at the same or even lower w/cm made in the absence or inadequate quantity of dissolved ions.

Another important aspect of Equation (I) is that it is useful in determining the appropriate quantity (e.g., weight) of binary salts to be added to a cementitious or concrete composition that will yield the desired ratio independently of molecular weight and/or the number of ions contributed by a particular salt compound. It is also useful in determining an appropriate salt concentration independently of aggregate specific gravity, such as when a lightweight aggregate is use. In fact, when using a porous lightweight aggregate that reduces the weight of a cubic yard of concrete but increases the total amount of water and w/cm require to provide a desired flow, the weight percent of salt within the cementitious or concrete composition will typically be substantially greater than when using a normal aggregate. By relating the amount of free water, dissolved ions, and expected IRH within a predetermined time period or range, Equation (I) normalizes for such differences in aggregate specific gravity, free water content, w/cm, and the molecular weight of salt.

In some embodiments, examples of water soluble salts that are effective in increasing the colligative properties of the remaining pore water include water soluble acetates, formates, sulfates, thiosulfates, nitrates, nitrites, bromides, chlorides, and thiocyanates of one or more alkali metals. For example, soluble alkali metal salts may be selected from salts of lithium, potassium, sodium, and mixtures thereof.

Useful water soluble salts can have minimal reactivity with the hydraulic cement component and using Equation (I) can provide desired and predictable colligative property information. Salts that react with hydraulic cement and are at least partially consumed during cement hydration are less able to increase the colligative property of water because at least some of the ions contributed by such salts are consumed and therefore unavailable or produce other ions when determining the ratio according to Equation (I). For example, it has been found that salts of alkaline earth metals are far less effective than salts of alkali metals in reducing IRH and the rate of water vapor emission and increasing the rate of surface drying of hardened concrete. It is postulated that alkaline earth metal ions, such as calcium and magnesium, react with silicate and aluminate ions and are taken out of solution. As a result, these ions are largely unavailable for increasing the colligative properties of water.

In addition to the foregoing, because lowering the w/cm typically lowers the amount of remaining pore water following the consumption of water of hydration, it may be advantageous to include a water reducer, such as a superplasticizer, also referred to as a high range water reducer (HRWR). Water reducers can be used to provide desired flow using less water, which permits concrete of desired slump at lower w/cm. In some embodiments, the superplasticizer can have a concentration in a range from about 1 to about 6 ounces per 100 pounds of the hydraulic cement.

In some embodiments, the aggregate may comprise a porous aggregate that is able to absorb and contain water. In such cases, the amount of salt can be adjusted to account for the amount of absorbed water. In addition, the water soluble salt may reduce inflow and outflow of liquid water from pores and capillaries of the porous aggregate in comparison to concrete substantially free of the at least one water soluble salt, which can further reduce the water vapor emission rate from concrete.

Another aspect of the invention includes a method of manufacturing a hardened concrete comprising preparing a fresh concrete mixture by blending together an aggregate, one or more water soluble salts, hydraulic cement and water, the water including both water of hydration and water of convenience, and allowing the water of hydration to react with the hydraulic cement to form hydrated cement paste having pores and capillaries. The one or more water soluble salts enhance the retention of free water by pores and capillaries of cement paste and inhibit diffusion of water and/or water vapor to the surface of the hardened concrete. This, in turn, causes or allows the hardened concrete to more quickly achieve a desired internal humidity and surface dryness compared to concrete made in the absence of the one or more salts.

In some embodiments, the water soluble salt permits the concrete to achieve 75-80% internal relative humidity, measured in accordance with ASTM F 2170, with less total emission of water vapor from the concrete compared to a concrete substantially free of the water soluble salt. In other embodiments of the invention, the at least one water soluble salt provides cement paste having reduced autogenous and/or drying shrinkage of hardened concrete compared to concrete substantially free of the water soluble salt.

According to some embodiments, the at least one water soluble salt is added to the fresh concrete mixture upon blending together the aggregate, at least one water soluble salt, hydraulic cement, and water. In certain embodiments of the invention, at least a portion of the water soluble salt can be indirectly added to the fresh concrete mixture by infusing a porous lightweight aggregate with an aqueous solution of the salt prior to blending together the aggregate, at least one water soluble salt, hydraulic cement, and water. In some embodiments, the water soluble salt has a concentration in the aqueous solution used to infuse a porous aggregate of from about 2.5% to about 20% by weight based on a total weight of the aqueous composition.

In some embodiments, infusing a porous lightweight aggregate with an aqueous salt solution improves workability of the fresh concrete mixture compared to a concrete made in the absence of infusing the porous lightweight aggregate with the aqueous salt solution. In some embodiments, infusing the porous lightweight aggregate with the aqueous salt solution improves pumpability and decreases workability loss when pumping the fresh concrete mixture under pressure compared to concrete made in the absence of infusing the porous lightweight aggregate with the aqueous salt solution.

These embodiments of the invention and other aspects and embodiments of the invention will become apparent upon review of the following description taken in conjunction with the accompanying drawings. The invention, though, is pointed out with particularity by the appended claims.

BRIEF DESCRIPTION OF THE SEVERAL VIEWS OF THE DRAWINGS

Figure 1:
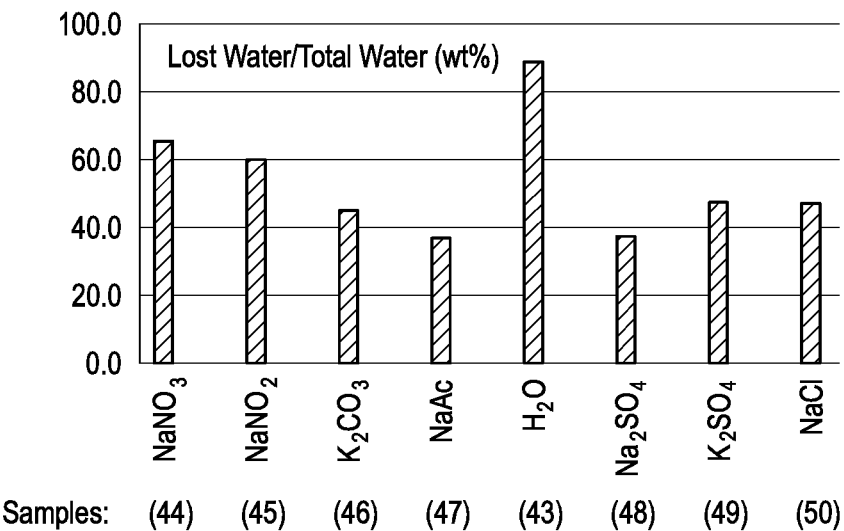
Figure 2:
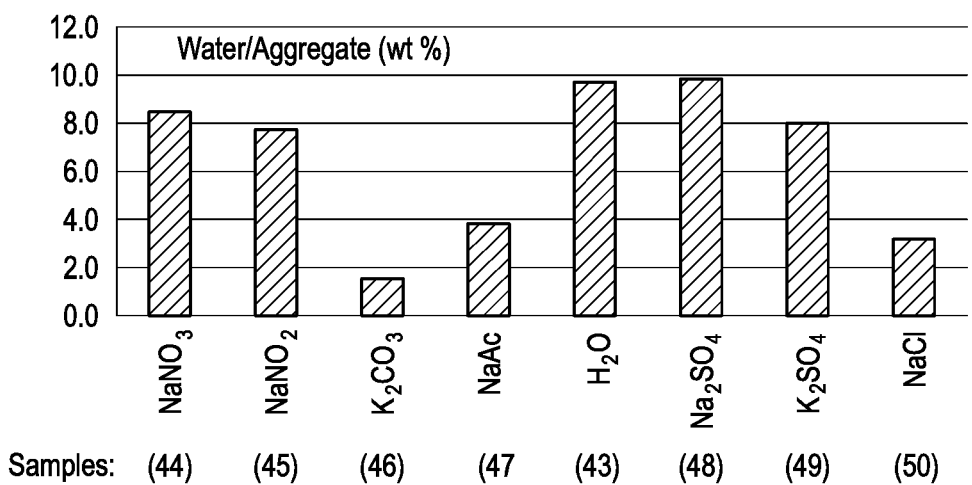
Figure 3:
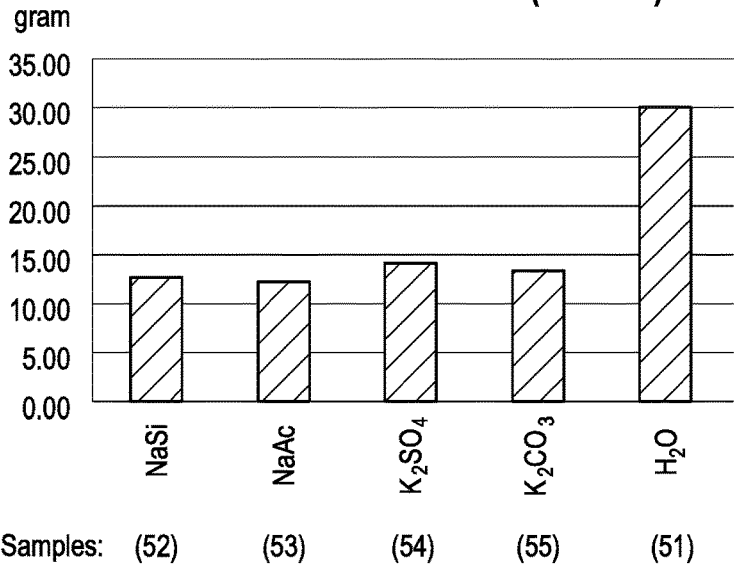
Figure 4:
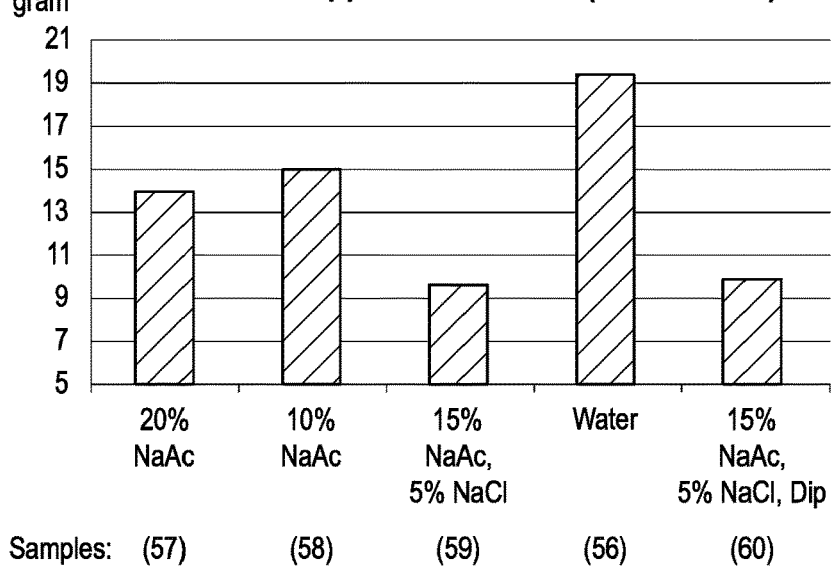
Figure 5:
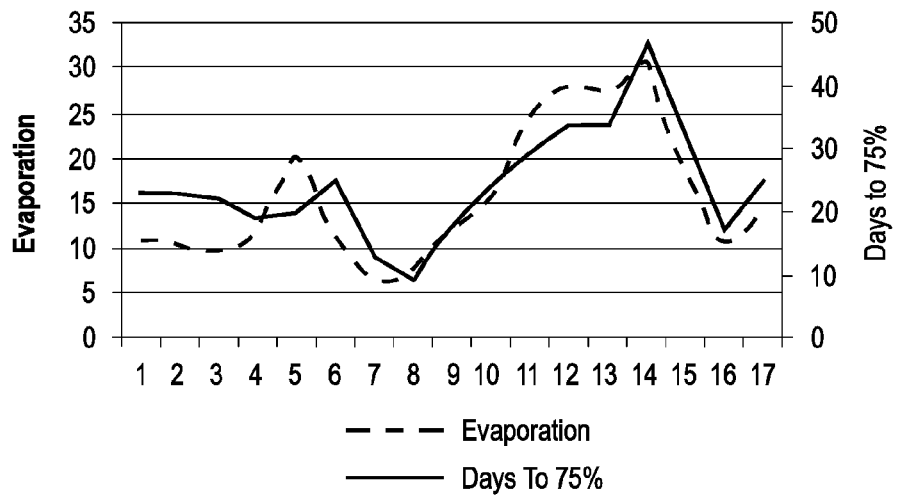
Figure 6:
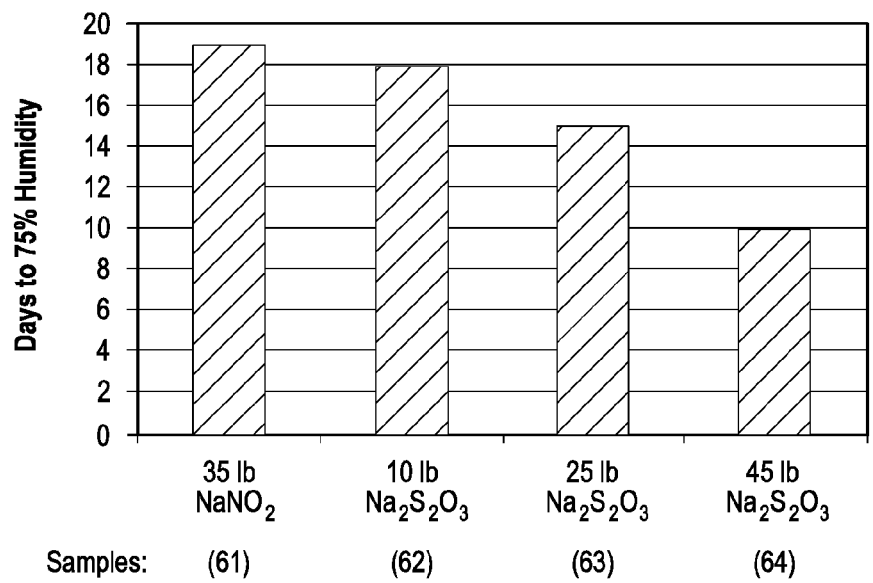
Figure 7:
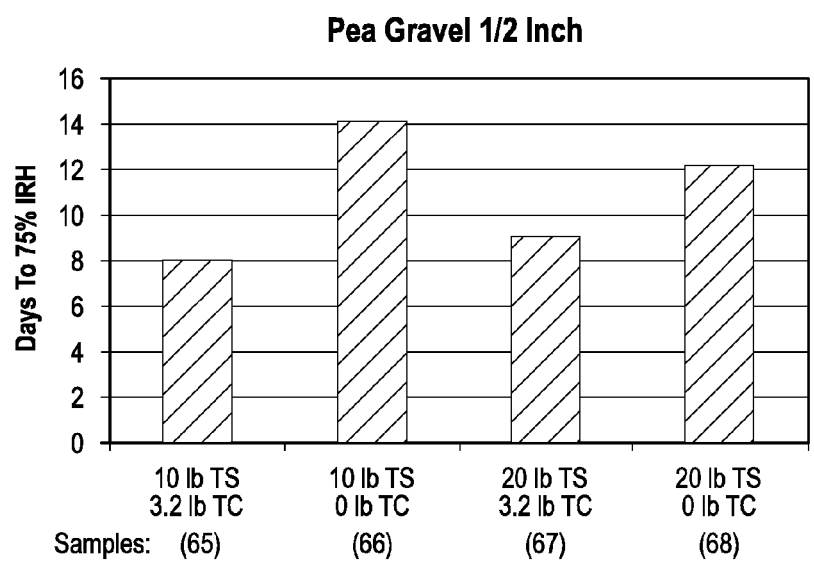
Figure 8:
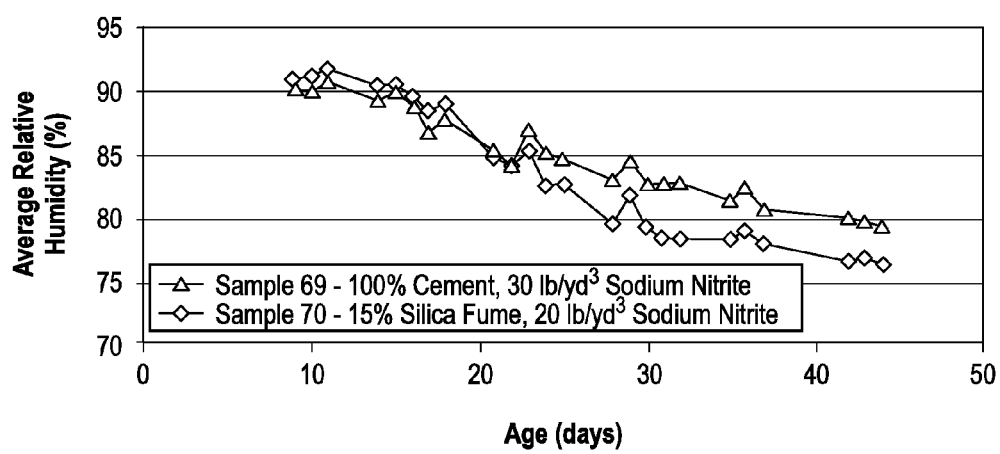
Figure 9:
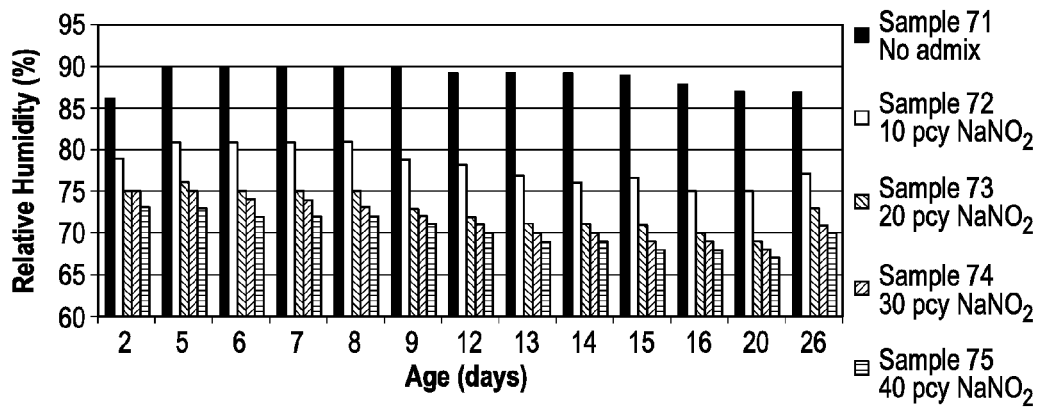
Figure 10:
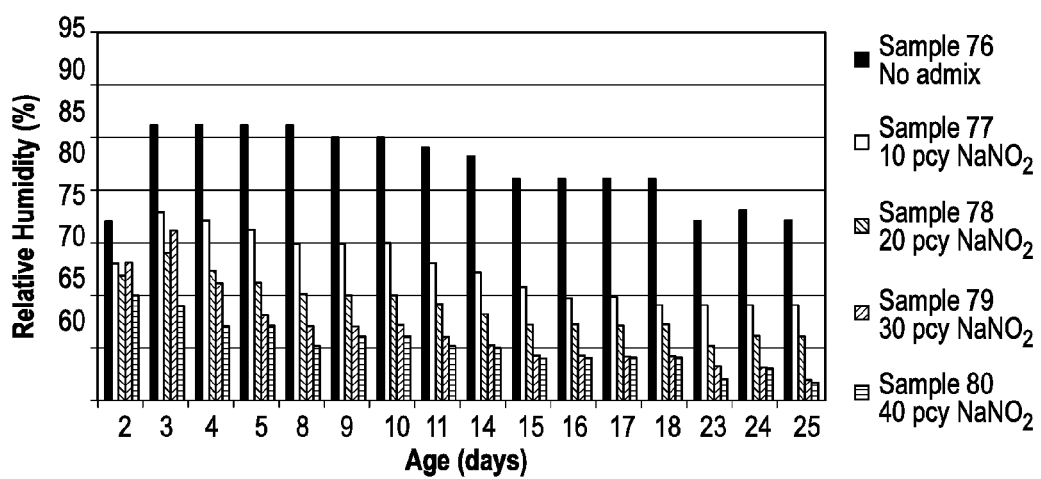
Figure 11:
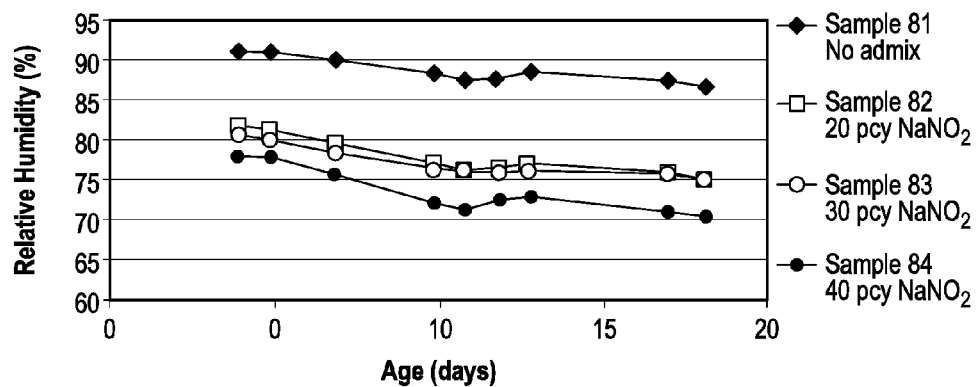
Figure 12:
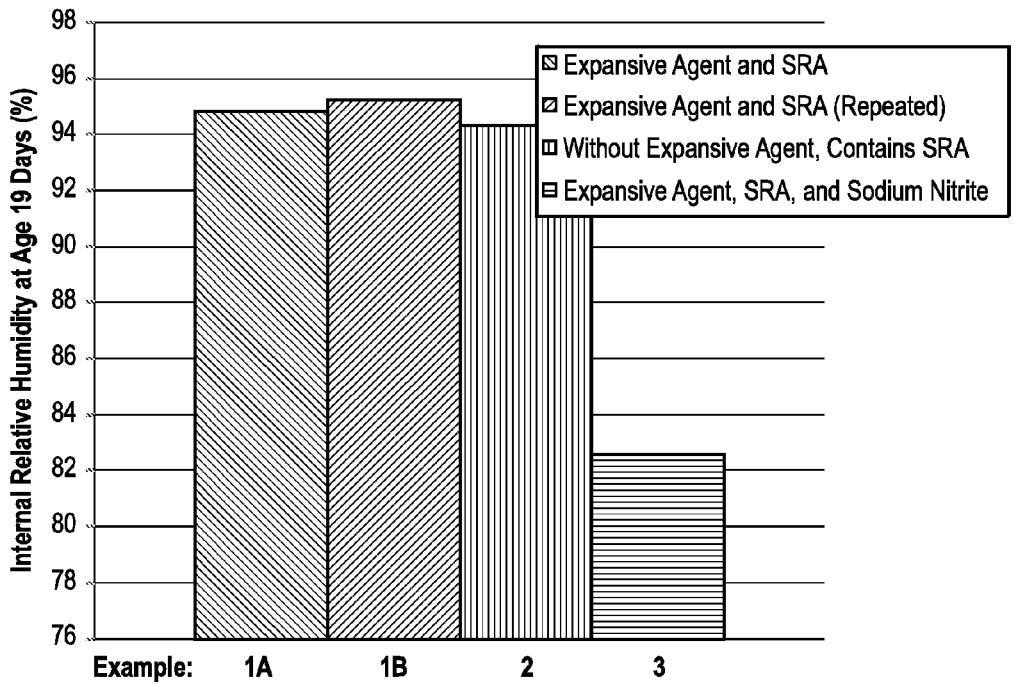
Figure 13:
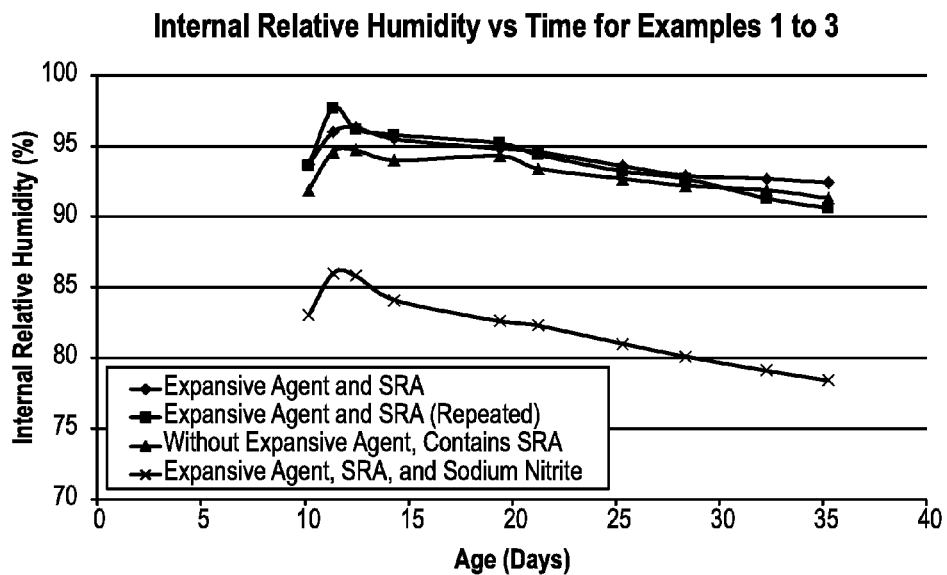
Figure 14:
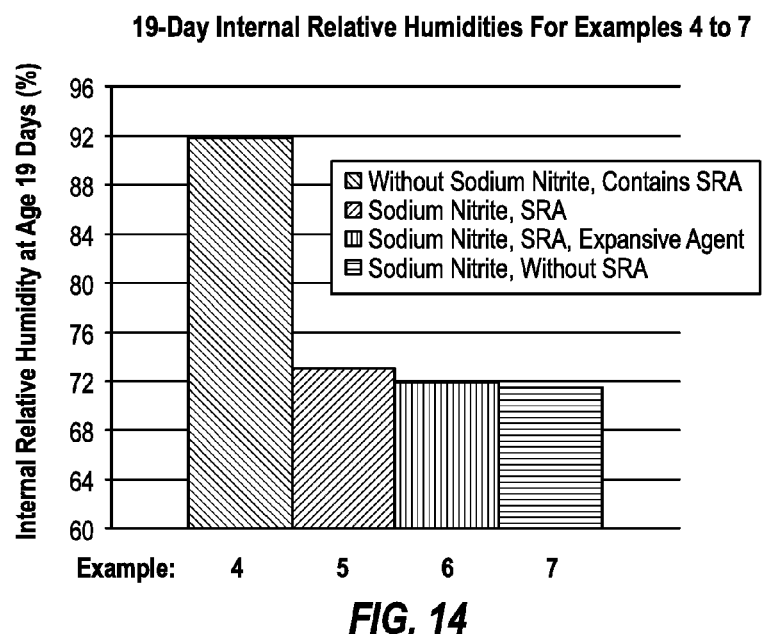
Figure 15:
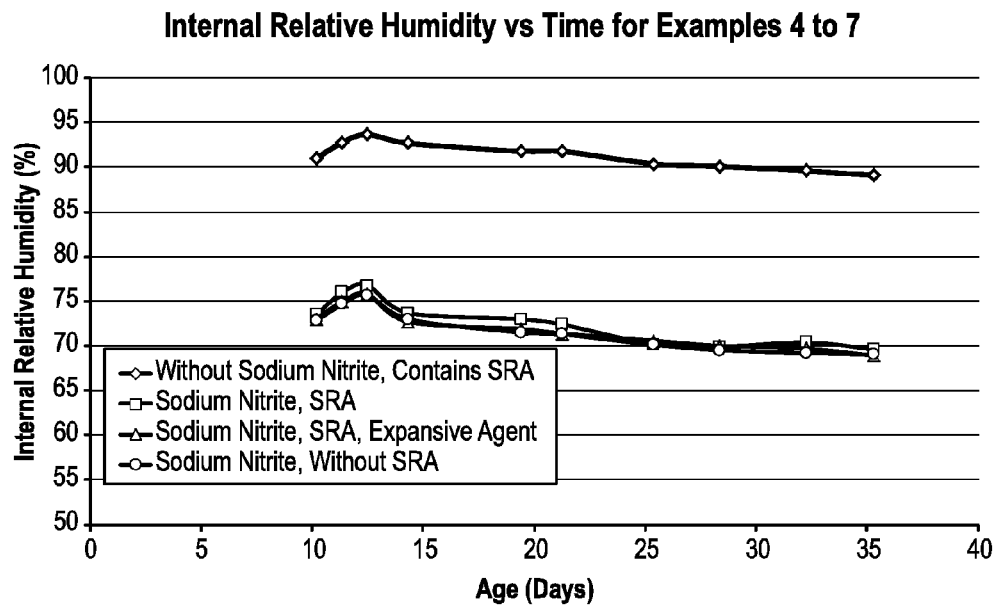
Figure 16:
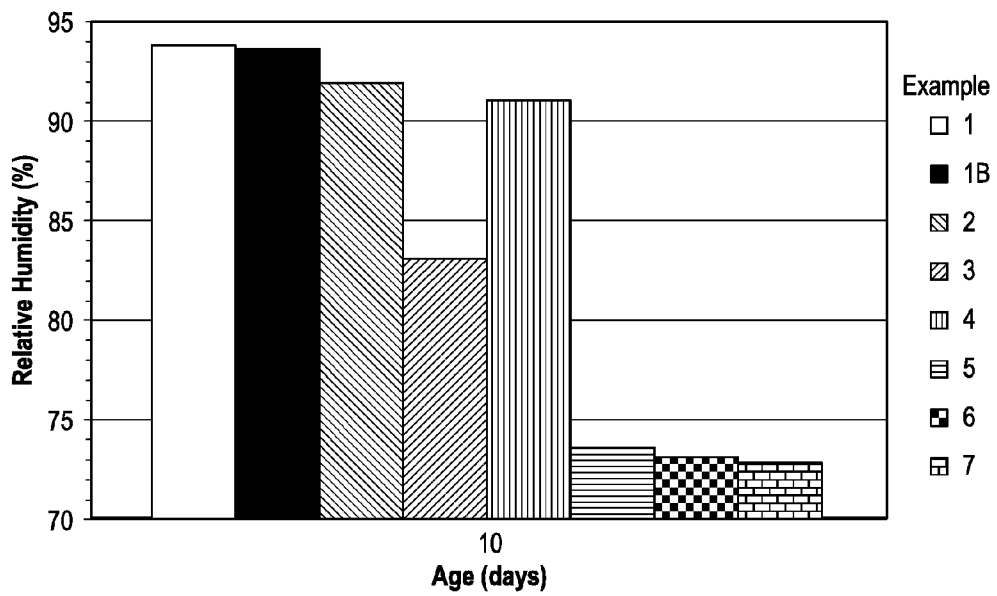
Figure 17:
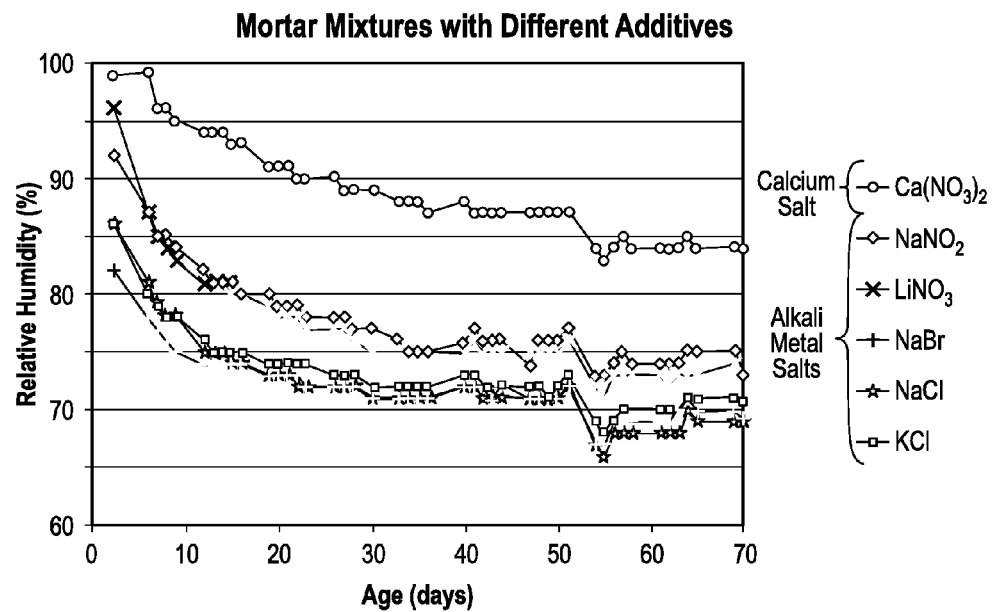
Figure 18:
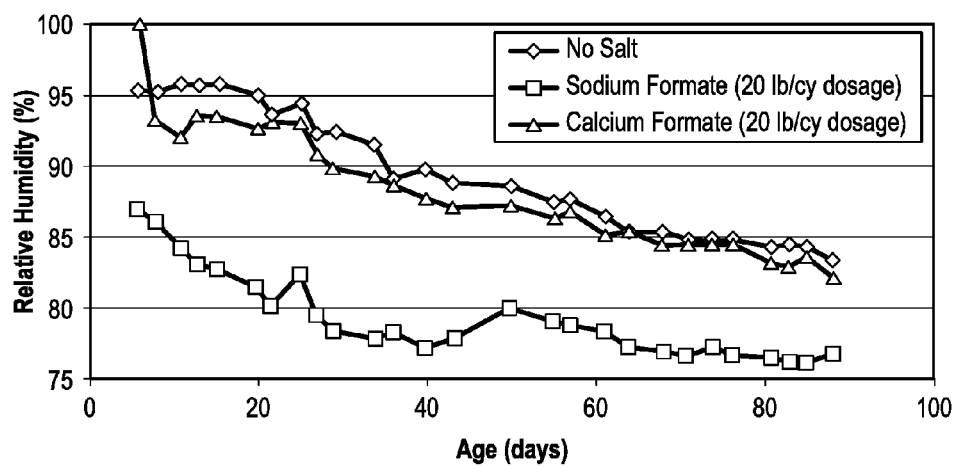
Figure 19:
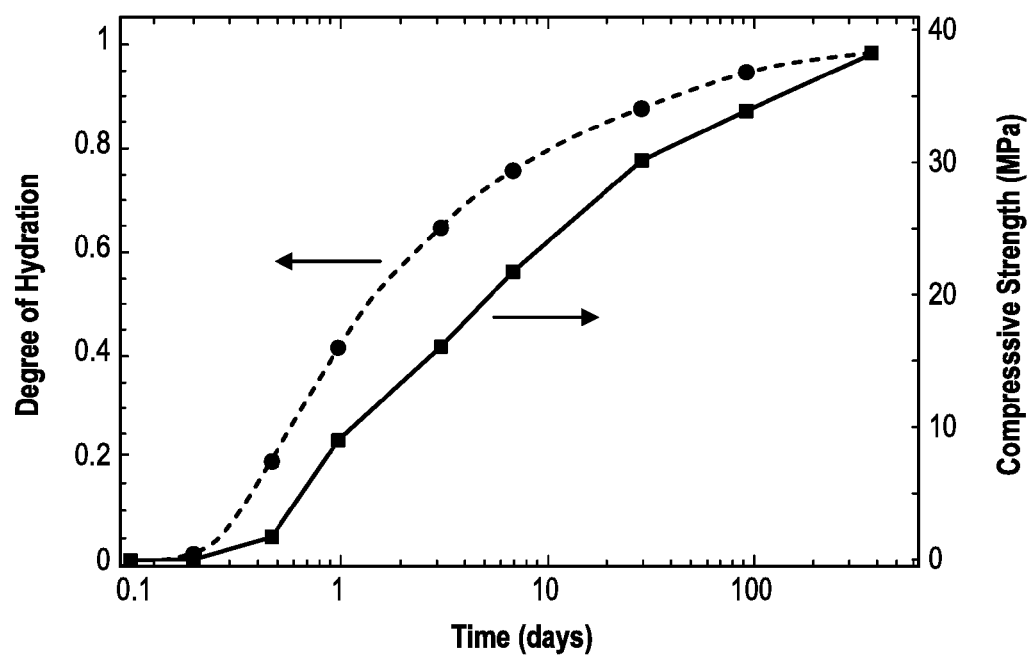

Having thus described the invention in general terms, reference will now be made to the accompanying drawings, which are not necessarily drawn to scale, and wherein:

FIG. 1 is a chart illustrating the percentage of water loss of porous lightweight aggregates treated by tap water (Sample 43) and solutions of seven different salts (Samples 44-50) after drying for 27 hours;

FIG. 2 is a chart illustrating unfilled pore space of porous lightweight aggregates treated by tap water (Sample 43) and solutions of seven different salts (Samples 44-50) after drying for 27 hours and then being re-immersed for 30 minutes, as indicated by weight percent of water needed to fully saturate the unfilled space of the aggregates;

FIG. 3 is a chart illustrating water vapor emission of concrete made from aggregates treated by tap water (Sample 51) and four solutions of different salts (Samples 52-55);

FIG. 4 is a chart illustrating water vapor emission of concrete made from aggregates treated by tap water (Sample 56) and four solutions (Samples 57-60), wherein aggregates were soaked in water (Sample 56) or boiled in aqueous solutions (Samples 57, 58, and 59) or partially dried then dipped in an aqueous solution of 15% 20 NaAc and 5% NaCl (Sample 60);

FIG. 5 is a chart illustrating the close correlation between water evaporation rate of lightweight concrete and the number of days required for the concrete to reach 75% relative humidity, as measured by an immersion probe;

FIG. 6 is a chart illustrating the number of days required for lightweight concrete containing various salts to reach 75% relative humidity, as measured by an immersion probe;

FIG. 7 is a chart illustrating the number of days required for normal weight concrete containing various salts to reach 75% relative humidity;

FIG. 8 is a graphical representation showing the relative humidity over time for two exemplary embodiments of cementitious mixes of the invention;

FIG. 9 is a chart illustrating the relative humidity over time for cementitious compositions having various concentration of sodium nitrite according to an embodiment of the invention;

FIG. 10 is a chart illustrating the relative humidity over time for cementitious compositions having various concentrations of sodium nitrite according to another embodiment of the invention;

FIG. 11 is a graphical representation showing the relative humidity over time for cementitious compositions having various concentrations of sodium nitrite according to another embodiment of the invention;

FIG. 12 is a bar graph comparing 19-day internal relative humidity values of Test Runs 1 to 3;

FIG. 13 is a line graph comparing the internal relative humidity values of Test Runs 1 to 3 for all sampled days;

FIG. 14 is a bar graph comparing 19-day internal relative humidity values of Test Runs 4 to 7;

FIG. 15 is a line graph comparing the internal relative humidity values Test Runs 4 to 7 for all sampled days;

FIG. 16 is a bar graph comparing 10-day internal relative humidity values for Test Runs 1 to 7;

FIG. 17 is a line graph comparing the internal relative humidity values for hardened concrete using different additives for Test Runs 8 to 13;

FIG. 18 is a line graph comparing the internal relative humidity values for hardened concrete in Test Runs 14 to 16 using, no additive, sodium formate, or calcium formate; and FIG. 19 is a line graph of an exemplary concrete showing the degree of hydration of the cement binder and compressive strength gain as a function of time.

DETAILED DESCRIPTION

Introduction

The present invention now will be described more fully hereinafter with reference to the accompanying drawings, in which some, but not all embodiments of the inventions are shown. Preferred embodiments of the invention may be described, but this invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments of the invention are not to be interpreted in any way as limiting the various inventions described herein.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

By way of background, the colligative property of water in hardened concrete correlates with the total concentration of ions within the water, including the concentration of ions provided by dissoloved hydraulic cement minerals, such as calcium, silicate, and aluminate ions, and also the concentration of ions provided by the one or more added ionic salts. In the early stages of cement hydration and concrete hardening, e.g., within a few hours or days of mixing, the water in concrete can have high concentrations of calcium, silicate, and aluminate ions from the hydraulic cement. As cement hydration proceeds forward, however, these ions precipitate out and form cement hydration products, such as calcium silicate hydrates (CSH) and calcium silicate aluminates (CSA), while consuming only a portion of the available water.

It has now been discovered that, in the absence of an additional source of ions, such as the one or more ionic salts added in accordance with the invention, the colligative property of water in concrete progressively decreases as the hydration reaction progresses. Therefore, water evaporation from the concrete surface becomes the only effective mechanism for the IRH and water vapor emission rate to decrease in concretes without additional ionic salt sources. This can take a significant amount of time before the concrete surface dries sufficiently to permit the application of coatings and adhesives. In humid climates this is particularly problematic as the rate of water evaporation from concrete is slowed down by high ambient relative humidity. The solution to this problem for concrete having any given w/cm and degree of hydration within a predetermined time period (e.g., within 50 days or less) is to include an amount of ions in order for the remaining water at the predetermined time period to have colligative properties so as to sequester water and achieve an internal relative humidity (IRH) at or below a predetermined level (e.g., 75-80%) within the predetermined time period (e.g., within 50 days or less).

As discussed above, part of the water used to make freshly mixed concrete is water of hydration, which is consumed over time in the hydration reaction with hydraulic cement to produce strength. Another part of the water is water of convenience and is in excess of the water of hydration. The hydration reaction that causes concrete to harden and develop strength proceeds over time, with portions of the water being consumed in hours, days, weeks, and months (See FIG. 19). Therefore, at any given time, the total amount of water available for evaporation from a concrete surface generally correlates with the sum of the water of convenience and the water of hydration that has not yet been consumed by hydraulic cement.

It has been discovered that the internal relative humidity (IRH) of concrete at any given time after placement and hardening generally correlates with two variables: (1) the amount of water remaining in the concrete that has not reacted with hydraulic cement; and (2) its colligative property, which is related to the concentration of ions (particles) within the remaining water. Increasing the concentration of ions in concrete pore water reduces the partial pressure of water vapor in concrete. In view of this, cementitious compositions, including freshly mixed concrete and other cementitious mixes, can be formulated so as to include amounts of water, hydraulic cement, and one or more added ionic salts that yield hardened concrete which can achieve an IRH of 80% or less within a desired time period, such as within 50 days or less.

Based on the principles disclosed herein, the selection of an appropriate quantity of added ionic salt to achieve an IRH at or below 80% within a predetermined period of time can be determined for concrete of virtually any w/cm and which hydrates at any known or predicted rate. For example, a cementitious mixture can be designed to include an amount of hydraulic cement, water, and one or more ionic salts so that water that has not reacted with hydraulic cement at a predetermined time period, such as within 50 days, 45 days, 40 days, 35 days, 30 days, 28 days, 25 days, 20 days, or 15 days, will contain a sufficient concentration of ions so as to achieve an IRH of 75-80% within the predetermined time period.

Because different salts can have greatly varying molecular weights, the number of ions provided per unit weight will vary with differing concentrations, ion mixture and van der Waal's forces. Thus, the weight of the salt is less important than the quantity of water soluble ions that it contributes to the remaining pore water. Thus, salts with a higher molecular weight will typically be added in greater weight amounts to provide the desired number of ions compared to salts with smaller molecular weights. In addition, the appropriate number of ions provided by the salt to yield a desired IRH and water vapor attenuation is correlated with the amount of remaining water in the concrete at the preselected time period. Concrete and cement pastes having a higher w/cm will typically require more salt to achieve a desired colligative property to control IRH, while cement pastes with lower w/cm will require less salt, all things being equal. Nevertheless, the appropriate amount of any salt of any given molecular weight, when used in concrete or cement paste of any given w/cm, can be determined using Equation (I) or similar equation once it has been determined how much pore water will remain in the hardened concrete at the preselected time period. In some cases, an excess of ions can be included to provide a margin of safety. On the other hand, it may be desirable to avoid including a large excess of ions, particularly to the extent that they may reduce long-term concrete durability and/or substantially alter the rate of cement hydration.

Definitions

As used in the specification and in the appended claims, the singular forms "a", "an", and "the" include plural referents unless the context clearly indicates otherwise. For example, reference to "a concrete" includes a plurality of such concrete.

Exemplary compositions of the invention are described in the examples presented herein. As a person having ordinary skill in the art to which this invention belongs would appreciate, variations or modifications from these exemplary compositions, as detailed in the specification and as further set forth in the claims that follow, are intended to be included within the scope of the present invention.

As used herein, "wt %" or "weight percent" or "% by weight" or "percent by weight" and any variations thereof, unless specifically stated to the contrary, means a weight percentage of the component based on the total weight of the composition or article in which the component is included. "Wt %" or "weight percent" or "% by weight" or "percent by weight" and any variations thereof, when referring to a cementitious mix, means a weight percentage of the component based on the total weight of the cementitious compounds in the cementitious mix or the weight of the cementitious mix on a water-free basis.

The terms "attenuated water vapor emission" or "decreasing the rate of water vapor emission," as may be used interchangeably herein, as well as any variation thereof, means a cementitious composition that ultimately provides a cementitious mix that produces a hardened concrete demonstrating a reduction in the amount of time needed to achieve a desired water vapor emissions rate. In an embodiment of the invention, the desired water vapor emissions rate, for example, is 3 lb/1000 ft$^2$/24 h. In certain embodiments of the invention, the attenuated water vapor emission may be measured based on the number of days required to achieve a desired internal relative humidity (IRH), for example, 75-80% IRH.

The term "concrete structure," as used herein, is intended to be broadly defined to refer to any structure that is composed, in at least significant part, of a concrete which has cured and hardened. A concrete structure includes, but is not limited to, a bridge, a roadway, a parking lot, a sidewalk, a curb, a parking garage, a floor, a patio slab, a support column, a pier, a marine structure, a piling, a conduit and any other paved surface whether located inside or outside.

As used herein, a "cement replacement" is a compound that partially substitutes for a compound that functions as the primary cement compound, such as, for example, a hydraulic cement, in a cementitious composition. Without intending to be bound by theory, the cement replacement itself may have binding properties similar to a cement. As such, any compound that can be chemically reacted or hydrolyzed by water to ultimately form other compounds that promote the hardening of a cement may, in certain embodiments, be a cement replacement. In some embodiments of the invention, the cement replacement may demonstrate cementitious properties because of their mere presence with another component of cement in the cementitious composition. A pozzolan is a non-limiting example of cement replacement that demonstrates cementitious properties when in the presence of another component of cement in the cementitious composition.

In certain embodiments of the invention, a cement replacement may be chosen to impart additional properties to the cement. In a non-limiting example, calcium carbonate may not only function as a cement replacement, but may also act as any one of a filler, a densifier, an accelerator of hydration, and any combination thereof. The compositions of the invention, in certain embodiments, may include these types of compounds as well. The terms "cementitious composition" or "cementitious mix" or "concrete composition or "concrete mixture," as may be used interchangeably herein, refer to the final mixture that comprises the compounds intended to be part of the formulation used to pour or cast a concrete. Such compositions or mixes or mixtures may refer to a composition that includes a cement material and, optionally, any of a pozzolan, one or more fillers, adjuvants, additives, dispersants, and other aggregates and/or materials that, typically upon being combined with water, form a slurry that hardens to a concrete upon curing. Cement materials include, but are not limited to, hydraulic cement, gypsum, gypsum compositions, lime and the like.

For example a cementitious composition or a cementitious mix or a concrete composition or a concrete mixture may comprise cementitious materials, optional admixtures, and aggregates. In a non-limiting example, the cementitious mix or concrete mixture, in certain embodiments, comprises a cementitious composition and the desired amount of water. Non-limiting examples of "cementitious materials" may include hydraulic cement, non-hydraulic cement, pozzolan, granulated blast-furnace slag, and the like. As used herein, when not otherwise specified, the term "concrete" may refer to the concrete mixture in either its fresh/unhardened state or its set/hardened state. A concrete in a fresh/unhardened may additionally be referred to as a "freshly mixed concrete," and a concrete in a set/hardened state may additionally be referred to as a "hardened concrete." The term "air entrainment" refers to the inclusion of air in the form of very small bubbles during the mixing of concrete. Air entrainment may confer frost resistance on hardened concrete or improve the workability of a freshly mixed concrete.

The term "granulated blast furnace slag" refers to the glassy, granular material formed when molten blast-furnace slag (a by-product of iron manufacture) is rapidly quenched. Granulated blast furnace slag may be blended in a pulverized state with Portland cement to form hydraulic mixtures. Granulated blast furnace slag may consist essentially of silica, or aluminosilica glass containing calcium and other basic elements. The pulverized form of granulated blast furnace slag may also be referred to as "ground granulated blast furnace slag, which is also referred to as "GGBFS" in certain figures provided herein.

"Internal relative humidity" (IRH) of a concrete described herein may be determined using the procedure developed by the ASTM committee F.06, also known as the F2170-09 standard entitled "In-Situ Testing of Concrete Relative Humidity," which is commonly used in Europe. In an exemplary representation of measuring internal relative humidity, the F-2170-02 test procedure involves drilling holes to a depth equal to 40% of the thickness of the concrete slab, if the slab is drying from one surface only. The hole is partially lined with a plastic sleeve that is capped at the entrance of the hole. The apparatus is allowed to acclimate to an equilibrium level for 72 hours prior to inserting a probe for measuring the internal relative humidity. The floor covering industry requires the internal relative humidity reading not to exceed 75% prior to application of a flooring adhesive.

The term "pounds per cubic yard," representing a mass based amount in pounds of a compound per cubic yard of a cementitious mix or a concrete, may also interchangeably be expressed as "lb/yd$^3$" or "pcy."

The term "pozzolan," as used herein, refers to a siliceous or siliceous and aluminous material that, by itself, possesses substantially little or no cementitious value, but when, in particular, in a finely divided form or an ultrafinely divided form, and in the presence of water, chemically reacts with calcium hydroxide to form compounds possessing cementitious properties. Non-limiting examples of pozzolans include fly ash, silica fume, micronized silica, volcanic ashes, calcined clay, and metakaolin.

As used herein, the term "highly reactive pozzolan" are pozzolans that readily react with free lime to form a siliceous binder. Non-limiting examples of highly reactive pozzolans include silica fume and metakaolin.

The term "slump," as used herein when referring to a cementitious mix, means the amount of subsidence of a cementitious composition. Conventionally, slump has been measured by the ASTM C143 (2008 is the most recent specification) standard test procedure, which measures the amount of subsidence of a cementitious composition after removing a supporting cone, as specified in the test procedure.

The term "shrinkage reducing agent," as used herein, refers to an agent that is capable of curbing the shrinkage of a cementitious mix as it cures or hardens. Non-limiting examples of shrinkage reducing agents include polypropylene glycol, in particular, polypropylene glycol with a number average molecular weight of from about 200 to about 1,500, more preferably, from about 500 to about 1,500, and, even more preferably, from about 500 to 1,000, and derivatives of polypropylene glycol, such as, for example, copolymers comprising polypropylene glycol (meth)acrylic acid ester and polypropylene glycol mono(meth)allyl ether. Other non-limiting examples of polypropylene glycol derivatives include propylene glycol diglycidyl ether, tripropylene glycol diglycidyl ether, and the like. In certain preferred embodiments of the invention, certain species of polypropylene glycol in the oligomer range may act as anti-shrinkage agents for hydraulic concrete.

Plasticizers, water reducers, or dispersants, as used interchangeably herein, are chemical admixtures that may be added to concrete mixtures to improve workability. These agents may be manufactured from lignosulfonates.

The term "superplasticizer," as used herein, is, generally, a water reducer, in particular, a high-range water reducer, or an additive that reduces the amount of water needed in a cementitious mix while still maintaining the workability, fluidity, and/or plasticity of the cementitious mix. Superplasticizers may include, but are not limited to formaldehyde condensates of at least one compound selected from the group consisting of methylolation and sulfonation products of each of naphthalene, melamine, phenol, urea, and aniline, examples of which include metal naphthalenesulfonate-formaldehyde condensates, metal melaminesulfonate-formaldehyde condensates, phenolsulfonic acid formaldehyde condensate, and phenol-sulfanilic acid-formaldehyde co-condensates. Superplasticizers may also include the polymers and copolymers obtained by polymerizing at least one monomer selected from the group consisting of unsaturated monocarboxylic acids and derivatives thereof, and unsaturated dicarboxylic acids and derivatives thereof. Indeed, in preferred embodiments of the invention, the superplasticizer comprises a polycarboxylate superplasticizer.

The term "polycarboxylate superplasticizer" encompasses a homopolymer, a copolymer, and any combination thereof comprising a polycarboxylic to which other functional groups may be bonded. Preferably, these other functional groups are capable of attaching to cement particles and other functional groups for dispersing the attached cement particle within an aqueous environment. Specifically, polycarboxylate superplasticizers are polymers with a carbon backbone having pendant side chains with the characteristic that at least a portion of the side chains are attached to the carbon backbone through a carboxyl group or an ether group. An exemplary polycarboxylate superplasticizer is given by Formula (I).

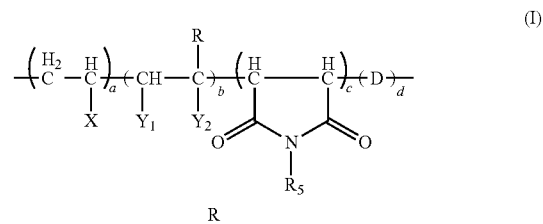

According to Formula (I):
D=a component selected from the group consisting of the structure according to Formula II, the structure according to Formula III, and combinations thereof.

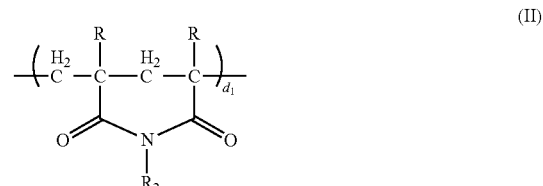

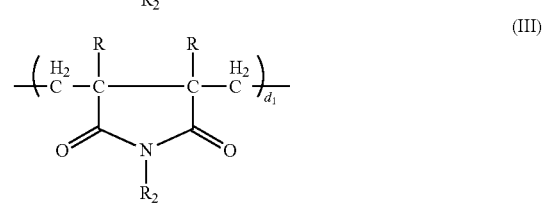

Additionally, according to Formulas (I), (II), and (III):
$X$=H, $CH_3$, $C_2$ to $C_6$ alkyl, phenyl, substituted phenyl;
$Y_1$=H, —COOM; R=H, $CH_3$;
$Y_2$=H, —$SO_3M$, —$PO_3M$, —COOM, —$OR_3$, —$COOR_3$, —$CH2OR_3$, —$CONHR_3$, —CONHC$(CH_3)_2$, $CH_2SO_3M$, —$COO(CHR_4)_n$OH where n=2 to 6;
$R_1, R_2, R_3, R_5$ are each independently —$(CH_2CHRO)_mR_4$ random copolymer of oxyethylene units and oxypropylene units where m=10 to 500 and wherein the amount of oxyethylene in the random copolymer is form about 60% to about 100% and the amount of oxypropylene in the random copolymer is from about 0% to about 40%;
$R_4$=H, methyl, $C_2$ to $C_6$ alkyl;
M=alkali metal, alkaline earth metal, ammonia, amine, methyl, $C_2$ to $C_6$ alkyl;
a=0-0.8;
b=0.2-1.0;
c=0-0.5; and
d=0-0.5.
a, b, c, d, $d_1$, and $d_2$ represent the mole fraction of each unit and the sum of a, b, c, and d is 1.0. The sum of $d_1$, and $d_2$ must be equal to d.

The term "water to cementitious ratio" or "w/c" is defined as the ratio of the mass of the water to the mass of the cementitious materials immediately present in the cementitious mix formed upon mixing a cementitious composition with the desired amount of water. Generally, when the cementitious composition also comprises a pozzolan, the mass of the pozzolan will be added to the mass of the cement in determining the water to cementitious ratio. Generally, the mass of water used in calculating w/c will not include the water contained in aggregates.

The term "water-cementitious materials ratio" or "w/cm," which may also be referred to as the "water-binder ratio," is the mass ratio of available water to the amount of cement plus pozzolan plus slag in a paste, mortar, or concrete.

The terms "water vapor emission rate," "water vapor emissions rate," "water vapor emission," and "water vapor emissions," as may be used interchangeably herein, refers to the amount of water, typically represented as mass, e.g., pounds, emitted from a 1,000 square foot surface area of concrete over a 24 hour period. The water vapor emission rate, in an embodiment of the invention, may be measured by the test described in ASTM F1869 (2004) entitled the "Standard Test Method for Measuring Moisture Vapor Emission Rate of Concrete Sub-Floor Using Anhydrous Calcium Chloride." ASTM F1869 measures the vapor emission rate by placing an airtight dome containing a specified weight of calcium chloride over the hardened concrete for a defined period of time.

The term "workability," as used herein, is the relative ease that a freshly mixed paste, mortar, or concrete may be mixed, placed, compacted, and/or finished. The homogeneity of such mixtures may also influence the workability. In certain cementitious mixtures or mortar mixtures, workability may refer to the consistency and feel of the cementitious mixture or the mortar mixture. The requisite workability can vary based on the use of the cementitious and/or the mortar mixture. For example, depending on the application, the viscosity of the mixture may vary—e.g., a higher viscosity for applications where rapid flowability is not desired or a lower viscosity where rapid flowability is required, such as when performs are used. Of course, as understood in the art, other physical property parameters may also affect the workability of the mixture.

Use of Water Soluble Salts to Reduce Internal Relative Humidity and Water Vapor Emission Rate of Concrete According to some embodiments, the colligative properties of the pore water in concrete is controlled by including one or more water soluble salts, such as one or more alkali metal salts, within the cementitious composition or mix used to manufacture the concrete. The ions released from the water soluble salt(s) sequester unreacted pore water in the hardened concrete, which reduces the partial pressure of water vapor and the internal relative humidity (IRH) within the hardened concrete. Reducing the partial pressure of water vapor and IRH in hardened concrete in turn reduces the rate of water vapor emission from the hardened concrete, which results in faster drying of the concrete surface. This advantageously permits sooner application of coatings, adhesives, or layers onto the concrete surface as compared to concrete of similar or even lower w/cm known in the art.

In some embodiments, examples of water soluble salts that are effective in increasing the colligative properties of the remaining pore water include water soluble acetates, formates, sulfates, thiosulfates, nitrates, nitrites, bromides, chlorides, and thiocyanates of one or more alkali metals. For example, soluble alkali metal salts may be selected from salts of lithium, potassium, sodium, and mixtures thereof.

Useful water soluble salts can have minimal reactivity with the hydraulic cement component and provide desired and predictable colligative properties. Salts that react with hydraulic cement and are at least partially consumed during cement hydration are less able to increase the colligative property of water because at least some of the ions contributed by such salts are consumed and therefore unavailable when determining the ratio according to Equation (I). For example, it has been found that salts of alkaline earth metals are far less effective than salts of alkali metals in reducing IRH and the rate of water vapor emission and increasing the rate of surface drying of hardened concrete. It is postulated that alkaline earth metal ions, such as calcium and magnesium, react with silicate and aluminate ions and are taken out of solution. As a result, these ions are largely unavailable for increasing the colligative properties of water.

Based on the principles disclosed herein, the selection of an appropriate quantity of added ionic salt to achieve an IRH of 75-80% or below within a predetermined period of time can be determined for concrete of virtually any w/cm and which hydrates at any known or predicted rate. For example, a cementitious mixture can be designed to include an amount of hydraulic cement, water, and one or more ionic salts so that water that has not reacted with hydraulic cement at a predetermined time period, such as within 50 days, 45 days, 40 days, 35 days, 30 days, 28 days, 25 days, 20 days, 15 days, or 10 days, will contain a sufficient concentration of ions so as to achieve an IRH of 75-80% within the predetermined time period.

In general, the amount of alkali metal salt, such as sodium nitrite, can be in a range of about 5 lbs per cubic yard (pcy) to about 60 pcy, preferably in a range of about 10 pcy to about 50 pcy, more preferably in a range of about 20 pcy to about 40 pcy. As will be discussed below, these ranges can be modified to account for the colligative properties contributed by any given quantity of other alkali metal salt.

According to some embodiments, a cementitious mix can be designed with an amount of cementitious binder, water, and salt so that the moles of remaining pore water, divided by the sum of remaining moles of free water and available moles of dissolved ions, equals 0.75-0.80 or less, which is closely related to the partial pressure of water vapor as well as the IRH within hardened concrete in accordance with ASTM F-2170. The addition of non-volatile and substantially non-reactive (relative to hydraulic cement) salt to the water solution will decrease the IRH and therefore the water vapor emission according to the number of solute particles present. According to some embodiments, there can be enough salt and cementitious material to ensure this eventual ratio within a specified time period or range. However, if the added salt reacts with the hydraulic cement binder, the concentration of ions within the free pore water contributed by the added salt will be substantially altered over time by the degree of such reaction, which can add uncertainty and unpredictability to the system.

According to some embodiments, the relationship between the moles of remaining free water and moles of dissolved ions required to achieve a desired IRH for hardened concrete of 75-80% or less within a specified time period or range can be expressed according to Equation (I):

$$\text{Moles Free Water} \div (\text{Moles Free Water} + \text{Moles Dissolved Ions}) \leq 0.75\text{-}0.80 \qquad \text{Equation (I).}$$

As the dissolved ion concentration increases, the ratio according to Equation (I) also decreases, as do the partial pressure of water vapor and the IRH of hardened concrete. By understanding this relationship, one of ordinary skill in the art can select an appropriate quantity of one or more salts that will yield hardened concrete that will have a predictable IRH of 75-80% or below within a predetermine time period or range. In this way, one can avoid adding either too little salt, which will yield hardened concrete having a surface that dries too slowly, or too much salt, which can cause other problems, such as reduced strength and/or durability. Another important aspect of Equation (I) is that as the amount of free water dissipates, either by evaporation of water from the concrete surface, continued cement hydration, or both, the numerator decreases at a faster rate than the denominator because the moles of salt ions present remain unchanged. This further accelerates the rate at which desired surface drying of the hardened concrete occurs as compared to the rate of surface drying of concrete at the same or even lower w/cm made in the absence or inadequate quantity of dissolved ions.

By way of example, assuming that 75-80% IRH is the target, the cementitious mix has a w/cm of 0.35 using 800 lbs of cement, and about 70 lbs of free water remain after 75% cement hydration at the target day (e.g., 20 days), including 40 lbs of sodium nitrite within the cementitious mix initially will yield a ratio according to Equation (I) of 0.77, which is closely related to the partial pressure of water vapor and the IRH of the hardened concrete in accordance with ASTM F-2170. Even though moles of a compound are typically measured in grams (e.g., 18 g $H_2O$ per mole; 69 g $NaNO_2$ per mole), but because units of weight conveniently cancel out in Equation (I), one can assume for simplicity that molecular weight is measured in lbs per mole rather than grams per mole (e.g., 18 lbs $H_2O$ per mole; 69 lbs $NaNO_2$ per mole). Thus, the moles of remaining water can be assumed to be 70 lbs÷18 lbs per mole=3.89 moles. Similarly, the moles of sodium nitrite can be assumed to be 40 lbs÷69 lbs per mole=0.58 mole sodium nitrite. Because sodium nitrite contributes two moles of ions per mole of dissolved compound, the number of moles of combined sodium (Na+) and nitrite ($NO_2$—) ions is 2×(40÷69)=1.16 mole of ions. Thus, the ratio of 0.77 is determined according to Equation (I) as follows:

3.89 Moles Free Water÷(3.89 Moles Free Water+ 1.16 Mole of Ions)=0.77.

By way of further example, in the case where the amounts of water and cement in a concrete composition are selected so that, at a preselected time period (e.g., 28 days), the amount of unreacted water remaining in the pores after hydration of the cement is 65 lbs. per cubic yard ($yd^3$) of concrete, including 40 lbs. of sodium nitrite per cubic yard ($yd^3$) of concrete would yield a ratio of 0.76 according to Equation (I). Thus, the ratio determined by Equation (I) for 65 lbs. of remaining water (65/18=3.61 moles pore water) and 40 lbs. of sodium nitrite ions (40/69×2=1.16 moles of ions) is as follows:

3.61 Moles Water÷(3.61 Moles Water+1.16 Moles Ions)=0.76

When using multiple salts, one would simply add up the sum of the moles of ions contributed by all of the salts.

In contrast, concrete made in the absence of added dissolved ions contributed by sodium nitrite or other water soluble salt will have a ratio approaching 1 (i.e., 3.89 moles free water÷(3.89 free water+0 moles ions)=1). Such concrete would be expected to have substantially higher IRC, water vapor emission rate, and surface moisture at the target day.

Another important aspect of Equation (I) is that it is useful in determining the appropriate quantity (e.g., weight) of salt to be added to a cementitious or concrete composition that will yield the desired ratio independently of molecular weight and/or the number of ions contributed by a particular salt compound. It is also useful in determining an appropriate salt concentration independently of aggregate specific gravity, such as when a lightweight aggregate is use. In fact, when using a porous lightweight aggregate that reduces the weight of a cubic yard of concrete but increases the total amount of water and w/cm require to provide a desired flow, the weight percent of salt within the cementitious or concrete composition will typically be substantially greater than when using a normal aggregate. By relating the amount of free water, dissolved ions, and expected IRH within a predetermined time period or range, Equation (I) normalizes for such differences in aggregate specific gravity, free water content, w/cm, and the molecular weight of salt.

With respect to molecular weight, for example, the appropriate weight quantity of sodium nitrite that should be added to yield hardened concrete having a desired IRH of 75-80% or below within a predetermined time period or range will be different than the weight quantity of salts having different molecular weight and/or which contribute a different number of dissolved ions. This amount can be normalized for virtually any other binary alkali metal salt that is assumed to contribute 2 ions per molecule by dividing the molecular weight of the alkali metal salt by the molecular weight of sodium nitrite to obtain a normalization ratio and multiplying this ratio by the amount of sodium nitrite. Thus, the amount of binary water soluble alkali metal salt that is equivalent to a given weight of sodium nitrite would be determined according to Equation (II) as follows:

Weight ($NaNO_2$)×(MW Salt÷69)=Equivalent Weight Salt        Equation (II).

Due to differences in intermolecular attraction (van der Waals forces) the salt water activities can vary from this assumption, particularly with more complex molecules. For example, sodium thiosulfate hydrate ($Na_2S_2O_3 \cdot 5H_2O$) contains three ions (2 sodium ions and 1 thiosulfate ion) per molecule but empirically contributes somewhat more than 3 ions when dissolved in the free water (perhaps because the sodium ions sequester a different number of water molecules than the thiosulfate ion). When a salt empirically contributes a different number of available ions per molecule for sequestering water, Equation (II) can be generalized to account for such differences according to Equation (III):

Weight ($NaNO_2$)×(MW Salt/ions per molecule÷69/ ions per molecule)=Equivalent Weight Salt        Equation (III).

Equation (II) is therefore the special case of Equation (III) where both alkali salts contribute 2 moles of ions per molecule of compound that can be used to sequester water within hardened concrete and the divisor 2 simply cancels out.

Using the foregoing principles, and assuming that sodium thiosulfate hydrate has a molecular weight of 248 lbs per mole and contributes 3 moles of ions, 95.8 lbs of sodium thiosulfate would contribute the same number of ions as 40 lbs of sodium nitrite according to Equation (III):

40 lbs sodium nitrite×(248/3÷69/2)=95.8 lbs sodium thiosulfate.

According to Equation (I), 95.8 lbs of sodium thiosulfate would therefore yield the same ratio 0.77 as 40 lbs of sodium nitrite:

70/18÷(70/18+3×95.8/248)=0.77

Equation (II) or (III) can be used to construct a concentration range for alkali metal salts other than sodium nitrite. For example, if the appropriate amount of sodium nitrite required to yield concrete having a desired IRH of 75-80% or below within a predetermined time period is in a range of about 5 lbs to about 60 lbs per yard of concrete, the appropriate amount of sodium thiosulfate would be in a range of about 12 lbs to about 216 lbs per yard of concrete, as determined by applying Equation (III) to each range endpoint:

5 lbs (248/3÷69/2)=12 lbs 60 lbs (248/3÷69/2)=144 lbs.

In general, for any alkali metal salt, a desired concentration range corresponding to a range of A pcy to B pcy of sodium nitrate can be expressed as follows:

A×(MW/IPM÷69/2) pcy to B×(MW/IPM÷69/2) pcy where MW=molecular weight of alkali metal salt, IPM=ions per molecule, and pcy=pounds per cubic yard.

According to some embodiments, the amount of alkali metal salt, expressed in relation to the aforementioned ranges for sodium nitrite (i.e., about 5 pcy to about 60 pcy, or about 10 pcy to about 50 pcy, or about 20 pcy to about 40 pcy), can be in a range of about 5 (MW/IPM÷34.5) pcy to about 60 (MW/IPM÷34.5) pcy, preferably in a range of about 10 (MW/IPM÷34.5) pcy to about 50 (MW/IPM÷34.5) pcy, more preferably in a range of about 20 (MW/IPM÷34.5) pcy to about 40 (MW/IPM÷34.5) pcy.

Cementitious and Concrete Compositions

Disclosed herein are composition and methods for maintaining or altering the ionic concentration of the water in concrete and/or lightweight aggregates in order to accommodate an amount of water in excess of that needed to react with the cements, which is typically required to provide desired workability. In general, concrete requires water for cement hydration as well as water of convenience to provide workability and facilitate placement. The water of hydration must typically be consumed and the water of convenience largely evaporated before proper permanent bonding of water-based adhesives can be assured. Unfortunately, the time necessary to accommodate the requisite evaporation and hydration can be approximately one month per inch of concrete floor depth. Placement of floor coverings using current water-soluble adhesives must often be delayed until the residual concrete water has sufficiently dissipated to provide an internal relative humidity (IRH) of no more than about 75-80% in accordance with ASTM F-2170-09.

Generally, water vapor emission is proportional to the state of relative dryness of the body of the concrete structure. Once isolated from external sources of water, water vapor emissions are derived from the amount of water that is used in excess of that needed to harden the cementitious materials, i.e., the water of convenience. Depending upon the atmospheric temperature and humidity at the surface and the thickness of the concrete, the elimination of excess water through water vapor emissions can take several months to reach a level that is compatible with the application of a coating or an adhesive (e.g., to reduce risk of delamination).

A lightweight coarse aggregate may be designed into a concrete mix to reduce building dead load and increase fire resistance. This lightweight material commonly comprises an expanded shale, clay, or slate with a density of about ½ that of normal stone coarse aggregate and is capable of producing lightweight concrete that weighs from 800 to 1000 pounds less per cubic yard. The weight reduction provided by the lightweight aggregate is achieved by creating a highly porous internal structure in the lightweight aggregate that can, however, absorb up to 30% water by weight. This water is in addition to the normal water required to provide desired slump and can impart additional water to the concrete mix equal to 2 to 3 times of the amount of water that must normally evaporate, thereby increasing the time to dry for adhesive or epoxy application by a similar amount. This additional time is beyond the tolerance of many fast-track construction schedules and increases the likelihood of bond failure and delamination should this drying time be truncated.

In some embodiments, water soluble salts may be used to alter the ionic concentration of the water in concrete and thereby control the internal relative humidity of concrete within a predetermined time period or range. According to one embodiment, one or more water soluble salts are incorporated into the cement paste upon mixing the cementitious components together. According to another embodiment, one or more water soluble salts can be incorporated into the pores of a lightweight aggregate and thereby indirectly incorporated into the cement paste when mixing the cementitious components together. Either method allows for improved water retention within the fine pores of the cementitious material over time, improved initial concrete workability, and limited water-vapor emission, enabling the resulting low-density concretes to attain a desired relative humidity in a shorter time. If water is made available to the mix by virtue of its being absorbed and then desorbed by lightweight aggregate, then its introduction should be anticipated by adjusting the ionic concentration of salt added to the aggregates to yield a cement paste having a desired ionic concentration.

According to certain embodiments of the invention, autogenous and drying shrinkage of concrete may be substantially reduced or, in certain embodiments, eliminated altogether. Finer cements, slags and pozzolans may lead to the production of smaller pores in the calcium-silicate-hydrate (CSH) gel. This results in increased autogenous and drying shrinkage due to the magnified effect of surface tension as pore radii diminish (Young-Laplace equation or Kelvin). As the cement particles hydrate, they consume about 20% of their weight in water and at the same time lose about 10% of their volume, resulting in chemical shrinkage or autogenous shrinkage. The large capillaries dry first, resulting in a shift to progressively smaller capillaries and gel pores.

Introducing salt into the capillaries and gel pores of cement paste reduces the relative humidity (RH) within concrete by virtue of the salt effect on relative humidity and its effect on the micro pore surface tension and pressure differential across the meniscus. As a consequence of lower w/cm and smaller pores, high performance concrete in general, and fast drying normal-weight aggregate concretes specifically, suffer from increased autogenous and drying shrinkage resulting in a potential for micro cracks and macro cracks leading to early deterioration. This phenomenon can be utilized to advantage in several ways. First, the small pores thus formed reduce the internal relative humidity (IRH) of concrete, particularly in the presence of increasing salt concentration. Second, if the lightweight coarse aggregate is water soaked with liquid water (not vapor) into its capillaries, then its introduction into a soluble salt treated mortar will result in an osmotic pressure. This pressure drives water and water vapor into the hydrated cement voids space, which offsets the tendency of the paste to undergo autogenous and drying shrinkage. This is a surprising and unexpected result.

It is conventionally believed that small particles (e.g., light weight fines) are needed for moisture sourcing dispersion. However, according to certain embodiments of the invention, well soaked coarse lightweight aggregate in a salt-dosed HPC mix may "eliminate" drying and autogenous shrinkage. If a lightweight concrete is pumped, for instance, the expected pressure may diminish the osmotic effect by forcing salts into the lightweight aggregates. The drying shrinkage attenuation will remain but autogenous shrinkage may return to significant, but diminished, extent.

This insight on shrinkage leads to new large volume uses for concrete. For example, in warehouse floor slabs or stores where concrete joints must be dowelled for load transfer, curling (top to bottom of slab drying differential) pulls the slab off subgrade support and creates surface irregularities. Both shrinkages contribute to this negative effect. Now, in a temperature-controlled environment, expanses of concrete can be longer than 100 feet without a joint, leading to reduced installation expense in reinforcing steel and jointing. This is an important improvement over conventional concrete methodologies for producing fast drying concrete, particularly those which rely on large doses of superplasticizer and low w/cm (less than 0.4), which produce large increases in autogenous and drying shrinkages.

In certain embodiments of the invention, the water vapor emission rate, as well as other properties, such as, for example, internal relative humidity, a required amount of water content of the concrete, and the required water to cementitious ratio, are determined by a process or procedure as provided in U.S. Pat. No. 8,220,344 entitled "Method for Estimating Properties of Concrete" fully incorporated herein by reference. The process or procedure, otherwise known as the "mortar method," comprises a procedure for preparing a representative mortar sample, typically substantially free of any coarse aggregate, having a water to cementitious ratio that is consistent with that of the concrete to be proportioned. Preferably, the prepared mortar mixture to be tested will have substantially the same ratio of compounds of the cementitious mix. The prepared sample mixture is cast into a small mold having a preferred surface to volume ratio of about 0.67 in-1 (6 inch×6 inch panels having a volume of about 54 cubic inches) to simulate the drying experienced by concrete that is exposed to the atmosphere at only one surface. The mortar is cast to a depth, which preferably approximates the depth of concrete that is immediately reactive to atmospheric temperature and moisture gradients. In certain embodiments of the invention, the mortar is cast to a depth of about 1½ inches. The cast samples of mortar are cured and periodically weighed at measured intervals in order to determine the amount of daily water loss. The water vapor loss is used to estimate the drying rate or some other property of a concrete based upon a correlation.

Embodiments disclosed herein relate to cementitious compositions, specifically to cementitious compositions that yield hardened concrete having decreased or attenuated rate of water vapor emission. The cementitious compositions are formulated to include hydraulic cement and at least one water soluble salt as water vapor attenuation agent. Non-limiting examples of water soluble salts useful as water vapor attenuation agents an alkali metal salts, examples of which include alkali metal formates, alkali metal acetates, alkali metal nitrates, alkali metal nitrites, alkali metal halides, alkali metal thiosulfates, and alkali metal thiocyanates. Water soluble alkali metal salts may be selected from salts of lithium, potassium, sodium, and mixtures thereof.

Other water vapor attenuation agents can be used in addition to the one or more water soluble salts. Examples of other water vapor attenuation agents include superplasticizers, such as polycarboxylate superplasticizers; finely divided particulate materials, such as highly reactive pozzolans; and shrinkage reducing agents.

In some embodiments, the cementitious composition may include a cement replacement, such as a finely divided material having a particle size less than about 75 microns. Finely divided pozzolans can react with water and calcium ions released during cement hydration to form densifying calcium silicates. In some embodiments, the pozzolan may comprise any natural pozzolan; any artificial pozzolan, such as fly ash; and any combination thereof. In yet other embodiments of the invention, the finely divided material comprises a ground slag, such as ground granulated blast furnace slag.

Another aspect of the invention provides a method of manufacturing concrete having improved water retention and surface drying characteristics, comprising: (1) preparing a fresh cementitious mixture by blending an aggregate (e.g., porous lightweight aggregate) with hydraulic cement, water and one or more water soluble salts; (2) allowing water to react with hydraulic cement to form hydration products, which hardens the fresh concrete mixture to form hardened concrete; and (3) ions from the salt sequestering and retaining water within fine capillary pores of cement paste. The salt ions inhibit diffusion of excess water not used in hydration of cement from the pores of the cement paste, thereby permitting the surface of hardened concrete to more quickly achieve a desired dryness compared to hardened concrete made without using the salt.

Examples of metal cations that may be suitable for salts in certain embodiments of the invention include, but are not limited to, lithium, potassium, sodium, and combinations thereof. Examples of anions that may be suitable for salts in certain embodiments of the invention include, but are not limited to, formate, acetate, sulfate, thiosulfate, bromide, chloride, thiocyanate, nitrite, nitrate, and combinations thereof. Further pursuant to these certain embodiments useful salts include, but are not limited to, sodium formate (HCOONa), sodium acetate (NaAc), sodium nitrate ($NaNO_3$), sodium nitrite ($NaNO_2$), sodium sulfate ($Na_2SO_4$), potassium sulfate ($K_2SO_4$), sodium chloride (NaCl), sodium silicate ($NaSiO_3$), sodium thiosulfate hydrate ($Na_2S_2O_3 \cdot 5H_2O$), and sodium thiocyanate (NaSCN).

Without intending to be bound by theory, an advantage to incorporating one or more water soluble salts into cement paste to yield concrete having a faster drying surface may be the sequestration of most of the mix water in small pores that exist within the concrete, particularly within cement paste. In some embodiments, about 50% of the paste fraction of concrete can be made up of capillary and calcium silicate gel pores. Higher cementitious concretes can be about ⅓ by volume, or 9 cubic feet of cement paste out of 27 cubic feet in a cubic yard, with the balance being made up of aggregate, according to certain embodiments of the invention. In a properly designed mix, according to certain embodiments of the invention, pore volume can, therefore, account for up to 4½ cubic feet of the water (280 pounds).

A problem that may conventionally be experienced with producing micro pores of sufficient quantity to absorb and hold this water in a non-evaporable state is that the size of the pores is typically a function of the water-cementitious (w/cm) ratio. It is generally accepted by a person having ordinary skill in the art that pore size does not substantially exist or become discontinuous, even with extended cure times, above water-cementitious ratios of about 0.6 or 0.7. As the water-cement ratio decreases from these levels, smaller pores may be formed. When the water-cement ratio drops below 0.4, sufficient micro pores are usually present to impact internal relative humidity and thus measurably affect drying. This lower level of water dictates a very stiff (low slump) workability that will not pump easily unless augmented with substantial amounts of super-plasticizer, which is tolerable in standard weight concrete but, as previously pointed out, is difficult to manage in lightweight concrete.

Physical upper limits exist on cementitious levels as well, since their relative fineness begins to require increasing amounts of water after the content surpasses about 800 pounds per cubic yard. In the usual proportions found in lightweight concrete, the aggregate alone can hold from 70 pounds to as much as 250 pounds of water. The dichotomy then becomes: more cementitious binder cannot be added nor can more water easily be withdrawn.

In some embodiments, the cementitious compositions can include compounds or be compounded to demonstrate a number of advantageous properties or features. In an embodiment of the invention, the cementitious compositions include compounds or are compounded to reduce the amount of water of convenience. In other embodiments of the invention, the cementitious compositions include certain compounds and are compounded in such a way so as to augment the effectiveness of a superplasticizer. In other embodiments, the cementitious compositions increase packing, or decrease intersticial spacing, of an aggregate that has been included in the composition, thereby effectively reducing permeability. In still other embodiments, the cementitious compositions include compounds or are compounded such that the cements that are included in the composition consume much of the water present, preferably in such a manner so as to reduce excessive production of reaction heat. In certain embodiments, a concrete composition has an advantage of improved workability. In certain embodiments, a concrete composition of the invention has a faster surface drying rate.

In some embodiments, the resulting concrete composition forms a concrete having some of the aforementioned properties. In other embodiments of the invention, the resulting concrete composition forms a lightweight concrete having at least some of the aforementioned properties. In certain embodiments of the invention, the resulting concrete composition forms a low density concrete have at least some of the aforementioned properties.

The inventive cementitious compositions, without intending to be bound by theory, offer improvements over other cementitious compositions known in the art by providing a concrete that demonstrates a reduction in the amount of time needed to achieve a desired water vapor emission rate, otherwise known herein as an "attenuated water vapor emission" or "decreasing the rate of water vapor emission." In an embodiment of the invention, the cementitious composition having a decreased rate of water vapor emission from concrete achieves a water vapor emission rate of between about 3 lb/1000 ft$^2$/24 h to about 5 lb/1000 ft$^2$/24 h in less than or equal to about 50 days, less than or equal to about 36 days, less than or equal to about 30 days, less than or equal to about 28 days, less than or equal to about 25 days, less than or equal to about 21 days, less than or equal to about 18 days, less than or equal to about 15 days, less than or equal to about 12 days, less than or equal to about 10 days, and less than or equal to about 7 days.

In some embodiments, the cementitious compositions provide a reduction in the number of days needed to achieve an internal relative humidity of 75-80% in accordance with ASTM F-2170. The cementitious compositions, according to certain embodiments of the invention, will produce a hardened concrete that has 75-80% internal relative humidity in less than about 50 days; preferably, less than about 36 days; more preferably, less than about 30 days; even more preferably, less than about 28 days; still even more preferably, less than about 22 days; and, yet still even more preferably, less than about 17 days. In some embodiments, the cementitious compositions offer the improvement of providing a finished concrete that allows the application of coatings and adhesives much sooner than concretes produced by conventional cementitious compositions known in the art.

In some embodiments, the cementitious compositions can be used to prepare a concrete structure for a flooring application. While not intending to be bound by theory, upon being mixed with water, the cementitious compositions consume and emit water in such a manner that little water remains in the hardened concrete to disturb water-based glues that are affixed to or coated onto the hardened concrete, which act as floor coverings. The inventors have discovered that it is important not only to reduce the amount of excess water in a cementitious mix, but to also include certain compounds in the formulation and to compound the formulation of the cementitious compositions in such a way that excess water is more favorably and rapidly sequestered than that which can be achieved by conventional cementitious compositions.

In various embodiments of the invention, the cementitious compositions may include compounds or be compounded to demonstrate a number of advantageous features and/or properties. In an embodiment of the invention, the cementitious compositions include compounds or are compounded to reduce the amount of water of convenience. In other embodiments of the invention, the cementitious compositions include certain compounds and are compounded in such a way so as to augment the effectiveness of a superplasticizer. In yet other embodiments of the invention, the cementitious compositions increase packing, or decrease interstitial spacing, of an aggregate that has been included in the composition, thereby effectively reducing permeability. In still yet other embodiments of the invention, the cementitious compositions include compounds or are compounded such that the cements that are included in the composition concentrate the compounds (salts) in the water enhancing their colligative properties.

In preferred embodiments, the cementitious compositions include a water vapor attenuation agent, as further described herein. In a preferred embodiment of the invention, the cementitious composition is formulated to include a water vapor attenuation agent that is a water immobilizer i.e., a compound that reduces mix water evaporability. Without intending to be limiting, compounds that reduce water evaporability or increase colligative properties are particularly useful in embodiments of the invention when a water to cement ratio higher than about 0.3, or more, is needed to achieve a certain desired degree of plasticity or workability for pouring a cementitious mix produced from the cementitious composition. Highly reactive pozzolans can assist in scavenging excess water.

Furthermore, it has been found that a cementitious mix made with cementitious compositions having a highly reactive pozzolan, without limitation, such as metakaolin and/or silica fume, continue to hydrate at relative humidity levels substantially below those cementitious mixes formed from a cementitious composition of a Portland cement, slag, and other pozzolans lending to their ability to scavenge water. In an embodiment of the invention, the water vapor attenuation agent of the cementitious composition is a highly reactive pozzolan; and any combination thereof having a concentration in the range of from about 0.5 wt % to about 25 wt %, preferably, from about 3 wt % to about 18 wt %, and, more preferably, from about 3 wt % to about 13 wt % based on the total weight of the cementitious composition.

In some embodiments, cementitious compositions having a water vapor attenuation agent that is considered a water scavenger, a highly reactive pozzolan, and any combination thereof, are capable of consuming at least about 5, at least about 10, at least about 20, at least about 30, at least about 40, and at least about 50 pounds of water per cubic yard of concrete over conventional cementitious mixes.

In some embodiments, cementitious compositions having a water vapor attenuation agent that is considered a water scavenger, which may include an ultrafine calcium carbonate, preferably, having an average particle size of less than or equal to about 3 microns; a highly reactive pozzolan; and any combination thereof, are capable of consuming at least about 5, at least about 10, at least about 20, at least about 30, at least about 40, and at least about 50 pounds of water per cubic yard of concrete over conventional cementitious mixes.

In other embodiments, smaller pore formation can be provided in the finished concrete. Smaller pore formation, depending on the formulation of the cementitious mix, may lead to concrete having decreased rate of or an attenuated water vapor emission earlier in the curing or hardening process. Without intending to be bound by theory, a reduction in pore size results in an inhibition of capillary water movement, which may lead to lower apparent internal relative humidity and a reduction in the water vapor emission rate.

In certain embodiments, the cementitious compositions may comprise soluble ionic salts. Without intending to be bound by theory, soluble ionic salts may sequester water based on the principle that water vapor concentration, and, therefore, the relative humidity over a salt solution is less than that over that of pure water because of its colligative property. Water may be present in both the gas and the liquid phase, whereas the scarcely volatile salt molecules may only be present in the liquid phase. The salt ions dilute the water and hinder the escape of water molecules into the air—i.e., the presence of the salt ions changes the equilibrium between the vapor and liquid phase. The rate of return of water molecules to the liquid surface is proportional to their concentration in the gas, where there are no salt ions to interfere. The system therefore adjusts to equilibrium where there are fewer water molecules in the air than there would be over a pure water surface. The relative humidity is therefore lower than 100%. Francois-Marie Raoult developed the following formula to represent this concept:

$$P = p_i^* x_i$$

where,
P=total vapor pressure
$p^*_1$=vapor pressure of water
$x_i$=moles of water/(moles of water+moles of salts)
If, on the other hand, a binary ionic salt such as sodium acetate (anhydrous) is used, then:
$x_i$=moles of water/(moles of water+2*moles of salt)

According to certain exemplary experimental results, the closeness of results calculated by Raoult's law is shown by the data in Table 2.

The salts of Table 2 were placed into aqueous solutions in a closed container with an inserted humidity probe and allowed to stabilize over 48 hours. Analogizing this data to concrete, if it is assumed that the cementitious materials contain 0.6% alkali as $Na_2O$ then in an 800 pound cementitious mix, for example, the moles of NaOH would be as follows:

$Na_2O + H_2O = 2$ NaOH, $0.006 \times 800 \times 80/62 = 6.2/40 = 0.155$

TABLE 2

| | $NaNO_2$ Solution RH | $NaNO_3$ Solution RH | $NaC_2H_3O_2$ Solution RH | Raoult Calculated RH |
|---|---|---|---|---|
| 1 molar | 93 | 93 | 93 | 97 |
| 3 molar | 82 | 89 | 86 | 90 |
| 6 molar | 75 | 80 | 75 | 82 |

RH = relative humidity

Additional salt addition may also raise the surface tension of water by about 5% and create a thickening of the water-ionic layer along the walls of the pores, thus effectively reducing their volume and providing an enhancement to negative pore pressure forecast by the Kelvin equation. The Kelvin equation can be used to describe the phenomenon of capillary condensation due to the presence of a curved meniscus, according to the following formula:

$$\ln \frac{P_v}{P_{sat}} = -\frac{2H\gamma V_l}{RT}$$

where,
$P_v$=equilibrium vapor pressure
$P_{sat}$=saturation vapor pressure
H=mean curvature of meniscus
γ=liquid/vapor surface tension
$V_l$=liquid molar volume
R=ideal gas constant
T=temperature An additional enhancement, although relatively smaller than the previous mentioned effects, is the expansion of the water lubrication capability by salt addition of a salt. The data in Table 3 was obtained by adding several separate salts to water and observing the expansion or displacement that occurred.

TABLE 3

| displacement | % |
|---|---|
| 1 molar | 2.4 |
| 3 molar | 5.2 |
| 6 molar | 16 |

The inventors have found that the combination of the sum of these effects permits the construction of a concrete with enhanced capacity to sequester water in a non-evaporable state. As the data set forth in Tables 4 and 5 demonstrate, excursions well beyond the maximum 0.4 water-cement ratio typically required for fast drying and HPC concrete are now possible.

TABLE 4

| | Type IV pounds cement | Grade 120 pounds slag | Type F pounds | pounds ASTM c33 Sand | pounds ASTM c33 #67 Stone | pounds ASTM c330 ½" Lightweight | Lightweight moisture % dry wt | Pounds Mix Water |
|---|---|---|---|---|---|---|---|---|
| Mix 1 | 300 | 300 | 0 | 1400 | 1700 | 0 | n/a | 325 |
| Mix 2 | 300 | 300 | 0 | 1400 | 1700 | 0 | n/a | 325 |
| Mix 3 | 300 | 300 | 0 | 1400 | 1700 | 0 | 28.2 | 325 |
| Mix 4 | 400 | 400 | 0 | 1400 | 0 | 750 | 28.2 | 325 |
| Mix 5 | 400 | 400 | 0 | 1400 | 0 | 750 | 28.2 | 325 |
| Mix 6 | 400 | 400 | 0 | 1400 | 0 | 750 | 28.2 | 325 |
| Mix 7 | 600 | 0 | 200 | 1400 | 0 | 750 | 28.2 | 325 |
| Mix 8 | 600 | 0 | 200 | 1400 | 0 | 750 | 28.2 | 325 |
| Mix 9 | 300 | 300 | 0 | 1400 | 1700 | 0 | n/a | 325 |

TABLE 5

| | Salt NaOH pounds | Salt NaNO$_2$ pounds | Salt NaNO$_3$ pounds | Salt NaC$_2$H$_3$O$_2$ pounds | Days to ASTM F 2170 75% IRH | W/Cs | Total W/Cs (Includes lightweight water). |
|---|---|---|---|---|---|---|---|
| Mix 1 | 0 | 0 | 0 | 0 | 50+ | 0.54 | 0.54 |
| Mix 2 | 0 | 0 | 0 | 20 | 23 | 0.54 | 0.54 |
| Mix 3 | 4 | 0 | 0 | 20 | 14 | 0.54 | 0.54 |
| Mix 4 | 0 | 0 | 0 | 0 | 50+ | | 0.61 |
| Mix 5 | 0 | 20 | 0 | 0 | 19 | | 0.61 |
| Mix 6 | 4 | 20 | 0 | 0 | 12 | | 0.61 |
| Mix 7 | 4 | 20 | 0 | 0 | 45 | | 0.61 |
| Mix 8 | 0 | 0 | 0 | 0 | 100+ | | 0.61 |
| Mix 9 | 0 | 0 | 35 | 0 | 26 | | 0.54 |

As can be readily observed, the drying time with both stone and lightweight concretes can be considerably shortened by increasing the concentration of single or combinations of salts. Care should be exercised to ensure that the salts do not cause efflorescence, react adversely with the concrete hydration, or strongly deliquesce.

The preponderance of the aggregate and mix water sequestered within the treated concrete at an internal relative humidity of 75% as is shown in the data set forth in Table 6.

The data in Table 6 demonstrates that the amount of water remaining in fast-dry design lightweight concrete has been reduced to 7.6 ft$^3$ after reaching an internal relative humidity of 75%.

TABLE 6

| Mix | | | |
|---|---|---|---|
| cement | 250 | 250F | pounds |
| slag | 550 | Oven Loss: | 361 |
| sand | 1400 | Evaporation: | 25 |
| Lightweight | 1006 | Retained in Concrete: | 116 |
| Water | 325 | Total | 502 |
| Lightweight Moisture: | 21.4% of dry Wt. | | |
| mix water W/Cs | 0.41 | % Water | |
| Total W/Cs | 0.63 | retained in concrete | 95 |
| NaNO$_2$ | 35 | cubic feet water retained in concrete @ 75% internal RH: | 7.6 |
| Total Water: | 502 | Chemically bound Water: | 23% |

The laboratory work with this system showed an unusual result in that evaporation pans of treated concrete made from the same samples of salt treated concrete reflected the same pattern as the internal relative humidity (IRH) specimens. It can be concluded from this that the evaporation rate is related to the formation of a discontinuous pore system and therefore indicative of small pore formations in the capillary system.

The low water vapor emission rate and relatively fast attainment of 75% IRH in lightweight concrete led to an investigation of volume change in this type of concrete. Data relating to shrinkage is set forth in Table 7.

TABLE 7

| | Dry lbs Normal | Dry lbs Modified LW HPC |
|---|---|---|
| Cement | 600 | 400 |
| GGBFS | 0 | 400 |
| Type F Ash | 200 | 0 |
| Sand | 1250 | 1400 |
| ½" lightweight | 0 | 850 |
| Stone | 1700 | |
| Water | 325 | 325 |
| plasticizer | 14 oz. | 16 oz. |
| W/C | 0.41 | 0.41 |
| PCF | 151 | 126 |
| AE | 1.30% | 1.3% |
| Total W/C | 0.43 | 0.63 |
| Agg. Water | 13 | 186 |
| NaNO$_2$ | 0 | 20 |
| NaOH | 0 | 4 |
| 7 day autogenous % | 0.016 | −0.001 |
| 28 Day air dry % | 0.041 | −0.003 |
| Total % | 0.057 | −0.004 |

The volume change was measured in standard ASTM C-157 molds during the first 24 hours. One end plate was anchored and the other plate was left free to move. The mold was lined with thin plastic to minimize friction. An additional stainless steel stud was screwed into the free end plate so that it passed through the end of the mold. A magnetically held dial micrometer stem was positioned to indicate any bar movement following initial set. The concrete bar was sealed in plastic after casting. At 24 hours the dial was read and the bar stripped from the mold, wrapped completely in 3 layers of plastic sheet with the embedded steel studs protruding. The bar was then measured in standard ASTM C-157 devices. At 7 days after casting the bar was again measured. Any change was added to the 24 hour reading and considered to constitute autogenous shrinkage. The bar was then unwrapped and allowed to dry for an additional 28 days in a standard lab environment. Drying shrinkage was computed by comparing the 7 day dimension to the one obtained after 28 days of drying. A negative number indicates expansion.

The lightweight concrete contains plain water while the surrounding mortar contains about a 1.1-1.3 molar initial concentration of binary salts. As the cement hydrates and this concentration increases, a semi-permeable gel membrane is grown around the coarse lightweight aggregate particles. The salt imbalance causes sufficient osmotic pressure to fill in the voids that normally develop due to chemical shrinkage and thereby prevents autogenous shrinkage. This type of concrete formulation loses very little water before coming to equilibrium with a 50% RH environment. The lightweight water reserve is known to replenish this loss as well.

The osmotic pressure $\pi$, is given by van't Hoff's formula, which is identical to the pressure formula of an ideal gas:

$$\pi = cRT$$

where,
c=molar concentration of the solute,
R=0.082 (liter·bar)/(deg·mol), is the gas constant, and
T=temperature on the absolute temperature scale (Kelvin).

For example, water that contains 78 gram/liter of sodium nitrite ($NaNO_2$), and sodium hydroxide (NaOH) typical of the mix in the above example, has an ionic concentration of c=2.39 mol/liter. Inserting the values into the van't Hoff formula, for the ambient temperature T=396 K, yields the osmotic pressure:

$$\pi = 2.39 \cdot 0.082 \cdot 296 = 58 \text{ bar} = 841 \text{ psi}$$

The water pressure could have destructive consequences if its source were to be unlimited, but the lightweight holds a finite amount of relatively pure solvent and removal of water results in a negative partial pressure in the lightweight particle sufficient to establish equilibrium.

The data in exemplary samples of Table 8 illustrate the effect of the addition of salt to stone and lightweight aggregate concrete. The evaporation rate was measured by weighing 6×6 inch pans of concrete as they dried. Note that the addition of salt lowered the evaporation rate.

TABLE 8

| Cement | 300 | 300 | 250 | 250 | lbs |
|---|---|---|---|---|---|
| GGBFS | 300 | 300 | 550 | 550 | lbs |
| Sand | 1400 | 1400 | 1400 | 1400 | lbs |
| ½" lightweight | 0 | 0 | 850 | 850 | lbs |
| Stone | 1700 | 1700 | 0 | 0 | lbs |
| Water | 325 | 325 | 325 | 325 | lbs |
| plasticizer | 6 | 6 | 16 | 16 | oz |

TABLE 8-continued

| W/Cs | 0.54 | 0.54 | 0.41 | 0.41 | lb/lb |
|---|---|---|---|---|---|
| Moisture loss to 75% IRH | 73 | 31 | 12 | 14 | lbs |
| $NaNO_2$ | 0 | 20 | 35 | 35 | lbs |
| NaOH | 0 | 4 | 0 | 0 | lbs |

Another aspect of the invention involves provides a cementitious composition or concrete composition having water soluble salts in the cement paste and cementitious mixtures by infusing a porous lightweight aggregate with a water-salt solution to yield a treated porous lightweight aggregate having improved water saturation and water retention. According to an embodiment of the invention, it may be advantageous and desirable to anticipate and accommodate the amount of water available in excess of that needed to react with the cements, as well as the resulting salt concentration in the cement paste. If water is made available to the mix by virtue of its being absorbed and then desorbed by lightweight aggregate, then the introduction of water should be anticipated by adjusting the ionic concentration.

According to an embodiment of the invention, the porous lightweight aggregates may be treated with salts or solutions of salts. The treated aggregates may be mixed with cementitious materials, admixtures, and water to manufacture various concrete mixtures, which can be used in applications where ordinary low-density concretes are suitable. In certain embodiments, pretreatment of lightweight aggregates permits retention of water in their small capillary pores, thus retaining water during storage, as well as facilitating rapid large capillary pore rewetting when making fresh concrete.

One method, according to an embodiment of the invention, involves infusing porous lightweight aggregates with water to yield treated porous lightweight aggregates having improved water saturation and water retention. This method may comprise providing a porous lightweight aggregate having pores and capillaries, and treating the porous lightweight aggregate with an aqueous solution comprising water and at least one salt. Without intending to be bound by theory, the salt may enhance penetration of aqueous solution into pores and capillaries of the porous lightweight aggregate and help retain water within the capillaries over time. In various embodiments of the invention, the porous lightweight aggregates are treated with salts by soaking or quenching the aggregates in an aqueous solution of the salt.

A porous lightweight aggregate having improved water saturation and water retention can be manufactured according to a method comprising: (1) providing a porous lightweight aggregate having pores and capillaries and (2) treating the porous lightweight aggregate with an aqueous solution comprising water and at least one salt. The at least one salt enhances penetration of the aqueous solution into the pores and capillaries of the porous lightweight aggregate and helps retain water within the capillaries over time, as compared to the porous lightweight aggregate treated with only water without the salt.

Another aspect of the invention provides a method of manufacturing freshly mixed concrete having improved workability comprising: (1) providing a porous lightweight aggregate infused with an aqueous solution comprising water and at least one salt, and (2) preparing a fresh concrete mixture by blending the porous lightweight aggregate with hydraulic cement and water. Without intending to be bound by theory, the salt may enhance penetration of the aqueous solution into pores and capillaries of the porous lightweight aggregate and help retain water within the capillaries over time compared to the porous lightweight aggregate only treated with water without the salt. The treated porous lightweight aggregate can lead to enhanced workability of fresh concrete compared to fresh concrete made using the porous lightweight aggregate without treatment with the salt.

Another aspect of the invention relates to a method of manufacturing low-density hardened concrete having improved drying characteristics, comprising: (1) providing a porous lightweight aggregate infused with an aqueous solution comprising water and at least one salt; (2) preparing a fresh concrete mixture by blending the porous lightweight aggregate with hydraulic cement and water; and (3) allowing the water to react with the hydraulic cement to form crystalline hydration products, which hardens the fresh concrete mixture to form the low-density hardened concrete. According to an embodiment of the invention, the at least one salt used in this method may lead to enhanced initial penetration of the aqueous solution into the pores and capillaries of the porous lightweight aggregate and helps retain water within the capillaries over time. The salt, according to an embodiment of the invention, may inhibit or slow diffusion of water from the porous lightweight aggregate, thereby causing the hardened concrete to more quickly achieve a desired internal humidity compared to hardened concrete made using the porous lightweight aggregate in the absence of the at least one salt. Slow release of water over time may promote internal curing of the cementitious binder, particularly at low water-to-cement ratios, thereby increasing strength and durability over time, according to certain embodiments of the invention.

An aspect of the invention provides a concrete manufactured according to the methods provided herein. In an embodiment of the invention, a concrete formed from a cementitious composition or cementitious mixture having a lightweight aggregate treated with water-soluble solutions as provided herein may result in: (1) high or nearly complete saturation of the pores and capillaries of lightweight aggregates with water during treatment, (2) prolonged water retention by the treated porous aggregates to better survive and prevent premature drying during shipment and storage, (3) improved workability of freshly mixed concrete since the infused aggregates will absorb little, if any, of the water added during mixing to provide desired workability, (4) limiting release of water and/or water vapor from the porous aggregates during and after hardening of the concrete structure, thereby enabling low-density concrete to attain and maintain a desired level of internal relative humidity (e.g., 75% or below) within a shorter period of time, and (5) slow release of water from the porous aggregates over time after the concrete has reached a desired level of internal relative humidity to promote "internal curing" of the cement binder over time, which can increase concrete strength, particularly in low water-to-cement ratio concrete.

In other embodiments of the invention, the water vapor attenuation agent may comprise a water soluble salt. In certain preferred embodiments of the invention, the inorganic salt includes one or more of an alkali metal halide salt. For example, the alkali metal halide salt may be any of a sodium halide, a potassium halide, a lithium halide, and any combination thereof. In preferred embodiments of the invention, the halide group may be represented by a chloride or a bromide. Indeed any combination of alkali metal chloride salts and alkali metal bromide salts may be included in the cementitious composition.

In an embodiment of the invention, the cementitious composition comprises an alkali metal nitrite salt. In certain embodiments of the invention, the cementitious composition comprises any combination of the aforementioned salts further combined with the alkali metal nitrite salt. In certain preferred embodiments, the ratio of alkali metal halide salts to alkali metal nitrite salts is such that the halide and nitrite ion concentration is substantially the same in the cementitious mix. In other embodiments of the invention, the inorganic salt itself may be an alkali metal nitrite salt, an alkali metal nitrate salt, and any combination thereof. Pursuant to these aforementioned embodiments, the alkali metal nitrite salt may be a sodium nitrite.

In certain embodiments of the invention, the halide group may be substituted by a pseudo halogen, such as a thiocyanate. The concentration of alkali metal halide salts in the cementitious mix, expressed based on a sodium chloride equivalent, may be in a range of from about 0.2 wt % to about 4 wt %, preferably, from about 0.5 wt % to about 2.5 wt %. For example, if sodium nitrite were to be used as the humidity reducer in the cementitious composition, its concentration would be in a range of from about 0.24 wt % to about 4.72 wt %, preferably, from about 0.59 wt % to about 2.95 wt %—i.e., the concentrations based on sodium chloride expressed above multiplied by the molecular weight of sodium nitrite and divided by the molecular weight of sodium chloride. In certain embodiments of the invention, the sodium nitrite has a concentration at most about 7.5 wt %. In certain other preferred embodiments of the invention, the concentration of sodium nitrite is from about 1.0 wt % to about 7.5 wt %. In yet certain other embodiments of the invention, the cementitious composition comprises at least one of an alkali metal halide salt, an alkali metal nitrate salt, and an alkali metal nitrite salt having a concentration of from about 1.0 wt % to about 7.5 wt %. In still certain other embodiments of the invention, the cementitious composition comprises at least one of a sodium nitrite having a concentration of from about 1.0 wt % to about 7.5 wt %.

In certain embodiments of the invention, the inventors have discovered that the mass-based presence of an alkali metal halide salt may be more preferred especially since the mass of the remaining cementitious mix may be influenced by the other compounds and their varying densities. For example, according to an embodiment of the invention, an amount of alkali metal salt (e.g., sodium nitrite) in the cementitious mix may be from about 5 pounds per cubic yard ("pcy") to about 60 pcy. In other embodiments of the invention, the amount of alkali metal halide salts in the cementitious mix may be from about 10 pcy to about 50 pcy. In still other embodiments of the invention, the amount of alkali metal halide salts in the cementitious mix may be from about 20 pcy to about 40 pcy.

As discussed above, an appropriate concentration range of alkali metal salt can normalized relative to molecular weight. Thus, for concentrations or concentration range endpoints that are based on the weight of sodium nitrite as the standard, a normalize concentration or concentration range endpoint for any other alkali metal salt can be determined according to Equation (III):

$$\text{Weight}(NaNO_2) \times (\text{MW Salt/ions per mole} \div 69/\text{ions per mole}) = \text{Equivalent Weight Salt} \quad \text{Equation (III)}.$$

For binary salts, Equation (II) can be used:

$$\text{Weight}(NaNO_2) \times (\text{MW Salt} \div 69) = \text{Equivalent Weight Salt} \quad \text{Equation (II)}.$$

Thus, exemplary concentration ranges for a binary alkali metal salt of molecular weight=X can be expressed as follows: about (X/69)5 pcy to about (X/69)60 pcy, or about (X/69)10 pcy to about (X/69)50 pcy, or about (X/69)20 pcy to about (X/69)40 pcy.

In some embodiments, the amount of alkali metal salt may vary depending upon the type of cement used in the cementitious mix. In other embodiments, the amount of alkali metal salt may vary depending upon the types of compounds and even perhaps their concentrations in the cementitious mix. Having the benefit of this disclosure, drying curves may be developed by a person having ordinary skill in the art, similar to those shown in FIGS. 9-11, for example, which are discussed in more detail in the examples, to determine an appropriate amount of alkali metal salt to yield concrete having an IRH of about 75-80% within a specified time period or range.

By way of example, but without intending to be limiting, the drying curve of FIG. 9 shows that an appropriate amount of sodium nitrite for that given cementitious mix is about 20 lb/yd$^3$. On the other hand, the drying curve of FIG. 10 shows that for another type of cement, which is different than the cement used in the samples of FIG. 9, the an appropriate amount of sodium nitrite for that cementitious mix is about 30 lb/yd$^3$ or maybe up to 40 lb/yd$^3$ depending upon the preferred surface drying characteristics to be achieved over time.

As further illustrated by the samples in FIG. 8, the presence of another compound of the invention may be used to reduce the amount of any of an alkali metal halide salt; at least one of an alkali metal halide salt, an alkali metal nitrate salt, and an alkali metal nitrite salt; or sodium nitrite in the cementitious mix. For example, the use of 15% by weight of silica fume in the cementitious mix may reduce the amount of sodium nitrite used in the cementitious mix from about 30 lb/yd$^3$ to about 20 lb/yd$^3$.

The cementitious compositions of the invention may be formulated by a proper selection of any combination of a cement; a binder and/or filler, including any pozzolan; an adjuvant and/or an additive; an aggregate; and a water vapor attenuation agent, as disclosed herein. The cementitious compositions of the various embodiments of the invention may comprise a superplasticizer, even more preferably, a polycarboxylate superplasticizer.

In an embodiment of the invention, the cementitious composition includes a cement. In certain embodiments of the invention, the cement is any hydraulic cement. Non-limiting examples of hydraulic cements suitable for use in certain cementitious compositions of the invention include any class of Portland cement; masonry cement; alumina cement; refractory cement; magnesia cements, such as magnesium phosphate cement and magnesium potassium phosphate cement; calcium-based cements, such as calcium aluminate cement, calcium sulfoaluminate cement, and calcium sulfate hemihydrate cement; natural cement; hydraulic hydrated lime; any complex derivative thereof; and any combination thereof.

Aggregates useful in the cementitious compositions of the invention include, but are not limited to, sand, stone, gravel, and any combination thereof. Aggregates may be further classified as coarse aggregates that include, for example, gravel, crushed stone, or iron blast furnace slag, and fine aggregates, which typically include a sand. As non-limiting examples, stone can include limestone, granite, sandstone, brownstone, river rock, conglomerate, calcite, dolomite, serpentine, travertine, slate, bluestone, gneiss, quarizitic sandstone, quartzite, and any combination thereof.

Other specialty aggregates include heavyweight aggregates and lightweight aggregates. Heavyweight aggregates can include, but are not limited to, barite, magnetite, limonite, ilmenite, iron, and steel.

Common lightweight aggregates that are found in certain embodiments of the invention include, but are not limited to, slag, fly ash, silica, shale, diatomonous shale, expanded slate, sintered clay, perlite, vermiculite, and cinders. In certain embodiments of the invention, insulating aggregates may also be used. Non-limiting examples of insulating aggregates include pumice, perlite, vermiculite, scoria, and diatomite. In yet other embodiments of the invention, the cementitious composition may additionally comprise any of the aggregates selected from expanded shale, expanded slate, expanded clay, expanded slag, fumed silica, pelletized aggregate, processed fly ash, tuff, and macrolite. In still other embodiments of the invention, an aggregate may comprise a masonry aggregate non-limiting examples of which include shale, clay, slate, expanded blast furnace slag, sintered fly ash, coal cinders, pumice, and scoria.

In certain embodiments of the invention, an aggregate may comprise any combination of coarse aggregates and fine aggregates. Coarse aggregates are generally considered those aggregate materials retained on a number 4 sieve. Fine aggregates are generally considered those aggregate materials that pass through the number 4 sieve. For example, refer to ASTM C33 (2007), which supersedes ASTM C33 (2003), and ASTM C125 (2007), which supersedes ASTM C125 (2002) and ASTM C125 (2000a) standard specifications for concrete additives for a more comprehensive description of how to distinguish between fine aggregates and coarse aggregates.

The cementitious compositions may comprise a cement replacement. In preferred embodiments of the invention, the cement replacement comprises a finely divided material, preferably, the finely a finely divided pozzolan and/or slag whose particle size is less than about 75 microns, and a finely divided highly reactive pozzolan whose particle size is less than about 75 microns. In other embodiments of the invention, the finely divided material comprises a pozzolan, which, without intending to be limiting, reacts with water and the lime released from cement hydration to form densifying calcium silicates. In certain embodiments of the invention, the pozzolan may comprise any natural pozzolan; any artificial pozzolan, such as, for example, a fly ash; and any combination thereof. In yet other embodiments of the invention, the finely divided material comprises a ground slag, preferably, a ground granulated blast furnace slag.

In an embodiment of the invention, the cementitious composition comprises a cement replacement. In an embodiment of the invention, the cementitious composition comprises a cement replacement, the cement replacement comprising a finely divided material.

In an embodiment of the invention, the cement replacement may comprise a densifying precursor. As used herein, the term "precursor" refers to a compound, complex or the like that, after at least one of becoming chemically activated, becoming hydrated, or through at least one other preparation step becomes converted into a desired form to serve to further densify a concrete. In certain embodiments of the invention, the densifying precursor is a densifying calcium silicate precursor.

In an embodiment of the invention, the finely divided material comprises a pozzolan and/or a slag. In a preferred embodiment of the invention, the pozzolan and/or the slag have a particle size of less than about 75 microns. In another preferred embodiment of the invention, the pozzolan and/or slag have a particle size of less than about 45 microns. In an embodiment of the invention, the finely divided material comprises any of a pozzolan, such as, for example, a fly ash; a hydraulic addition, such as, for example, a ground granulated blast furnace slag; and any combination thereof, and the cementitious composition has a ratio by weight of finely divided material to total weight of the cementitious composition of from about 0.05 to about 0.8, from about 0.20 to about 0.80, and, preferably, from about 0.13 to about 0.75. In another embodiment of the invention, the finely divided material comprises a highly reactive pozzolan and the cementitious composition has a ratio by weight of finely divided material to total weight of the cementitious composition, preferably, from about 0.05 to about 0.2, and, more preferably, from about 0.06 to about 0.10. In certain embodiments of the invention, the finely divided material comprises a pozzolan selected from the group consisting of any natural pozzolan; any artificial pozzolan, such as, for example, a fly ash; and any combination thereof.

In certain embodiments of the invention, the cementitious composition includes an admixture and/or additive including such admixtures or additives that function as accelerators, shrinkage reducing agents retarders, thickeners, tracers, air-entraining agents, air detraining agents, corrosion inhibitors, pigments, wetting agents, antifoaming and/or defoaming agents, any polymer that is water soluble, water repellants, fibers, damp proofing agents, gas formers, permeability reducers, pumping aids, viscosity control additives, other rheology modifying additives, fungicidal and/or germicidal agents, insecticidal agents, finely divided mineral admixtures, alkali-reactivity reducers, pH control agents and/or buffers, bonding admixtures, strength enhancing agents, shrinkage reduction agents, water reduction additives, and any mixture thereof.

In an embodiment of the invention, in addition to the water vapor attenuation agent, as further described herein, the cementitious composition comprises a cement, preferably, a hydraulic cement, having a concentration from about 10 wt % to about 80 wt %, and from about 25 wt % to about 70 wt % based on the total weight of the cementitious composition. In certain embodiments of the invention, the cementitious composition comprises a cement, preferably, a hydraulic cement, having a concentration from about 8 wt % to about 35 wt %, from about 10 wt % to about 30 wt %, from about 12 wt % to about 25 wt %, and from about 14 wt % to about 21 wt % based on the total weight of the cementitious composition.

In certain embodiments of the invention, the cementitious composition may additionally comprise, at least one of any aggregate, a pozzolan, and any combination thereof.

Cementitious compositions of the invention may comprise porous or non-porous lightweight aggregates or admixture to reduce the density and weight of concretes formed therefrom. Porous lightweight aggregates are readily available from natural sources and are inexpensive to procure, manufacture and process. Examples of porous light-weight aggregates include, but are not limited to, slag, shale, clay, slate, expanded slag, expanded shale, expanded clay, expanded slate, expanded slag, cinders, scoria, pumice, tuff, perlite, and vermiculite.

The porous lightweight aggregate, in an embodiment of the invention, may be either structural aggregates having compression strength greater than 2500 psi, or nonstructural aggregates having compression strength of 2500 psi or less. Examples of structural lightweight aggregates include shale, clay or slate expanded by rotary kiln or sintering; cinders; and expanded slag. Examples of non-structural lightweight porous aggregates include scoria, pumice, perlite and vermiculite.

In an embodiment of the invention, the cementitious composition comprises a fine aggregate having a concentration from about 50 wt % to about 85 wt %, from about 60 wt % to about 80 wt %, and from about 65 wt % to about 75 wt % based on the total weight of the cementitious composition. In another embodiment of the invention, the aggregate comprises at least one fine aggregate and at least one coarse aggregate having a weight ratio of fine aggregate to total aggregate of from about 0.25 to about 1.00, from about 0.30 to about 0.75, from about 0.35 to about 0.65, from about 0.40 to about 0.55, and from about 0.40 to about 0.50. In certain embodiments of the invention, the fine aggregate may be a porous lightweight aggregate.

The water retention of cement paste and/or lightweight aggregate and water-vapor emission of concrete may be affected by salts dissolved in solutions filling the pores of the aggregates and/or by salts directly added to cement paste, according to certain embodiments of the invention. Salts that form hydrates when exposed to water are preferred, as larger hydrate salts can be deposited in fine pores and aid in impeding water movement from cement paste and/or aggregates. The use of low water-cementitious material (w/cm) ratios, which enhance mortar desiccation rate, will leave substantial amounts of material under-hydrated. Moisture from lightweight particles, as opposed to the pressurized water outflow into the plastic concrete as free water, in lower w/cm ratio concretes (<0.45), may create an area of more completely hydrated material in the interfacial zone. A lower permeability may result, encapsulating some of the moisture within the lightweight aggregate particle itself, thereby further preventing water vapor movement into the surrounding mortar.

In certain embodiments of the invention, the cementitious composition comprises a pozzolan, such as, for example, a fly ash; a ground granulated blast furnace slag GGBFS; and any combination thereof. Relative to the overall cementitious composition, the pozzolan can have a concentration from about 5 wt % to about 30 wt %, from about 6 wt % to about 25 wt %, from about 7 wt % to about 20 wt %, and from about 13 wt % to about 17 wt % based on the total weight of the cementitious composition exclusive of water. The concentration of GGBFS can be in a range of about 3% to about 16% by weight of the cementitious composition exclusive of water and about 13.5% to about 73% by total weight of cementitious binder. The concentration of fly ash can be in a range of about 1.3% to about 8% by weight of the cementitious composition exclusive of water and about 5.9% to about 36.5% by total weight of cementitious binder.

In other embodiments of the invention, the cementitious composition comprises a highly reactive pozzolan, such as, for example, metakaolin, silica fume, and the like, including any combinations thereof, having a concentration from about 0.1 wt % to about 3 wt %, 0.5 wt % to about 2.5 wt %, and from about 1.0 wt % to about 2.0 wt % based on the total weight of the cementitious composition exclusive of water and about 4% to about 15% by total weight of cementitious binder.

In certain embodiments of the invention, a material selected from the group consisting of a pozzolan, a ground granulated blast furnace slag, and any combination thereof can be a very fine particulate material that reduces the voidage in the cementitious composition resulting in an improved moisture resistance of the finished concrete.

In other embodiments, the inventive cementitious composition comprises a dispersant. A non-limiting example of a dispersant includes any polycarboxylate dispersant, with or without polyether units. Polycarboxylate dispersants include those disclosed in U.S. Pat. Publ. No. 2008/0156225 to Bury, entitled "Rheology Modifying Additive for Cementitious Compositions," fully incorporated herein by reference. Dispersants may additionally include chemicals that function as any one of a plasticizer, a water reducer, a high range water reducer, a fluidizer, an antiflocculating agent, or a superplasticizer. Exemplary superplasticizers are disclosed in U.S. Pat. Publ. No. 2008/0087199 to Gartner, entitled "Cement Shrinkage Reducing Agent and Method for Obtaining Cement Based Articles Having Reduced Shrinkage," fully incorporated herein by reference. Dispersants may be selected that function as a superplasticizer.

In an embodiment of the invention, the cementitious composition further comprises a superplasticizer. Any superplasticizer disclosed herein or otherwise known in the art may be used in the cementitious compositions of various embodiments of the invention. In a preferred embodiment of the invention, the superplasticizer comprises a polycarboxylate admixture. A non-limiting example of a commercially available polycarboxylate superplasticizer includes GLENIUM® 3000 available from BASF Corporation. GLENIUM 3000 comprises a polymer with a carbon backbone having pendant side chains with the characteristic that at least a portion of the side chains are attached to the carbon backbone through a carboxyl group or an ether group. GLENIUM 3000 is a liquid at ambient conditions having a specific gravity of approximately 1.08.

For example, using a cementitious mix of 658 lb/yd$^3$ of Type III cement, slump of 6 inches, air content of 5-6%, concrete temperature of 65° F., and curing temperature of 65° F., it has been reported that GLENIUM 3000 provides a greater than 2 times increase in compressive strength in concrete after 8 hours of curing and an improvement of approximately 30% after 12 hours of curing compared to that of a conventional superplasticizer. For a cementitious mix of 658 lb/yd$^3$ of Type I cement, slump of 8-9 inches, non-air-entrained, concrete temperature of 70° F., dosage of admixtures adjusted to obtain 30% water reduction, GLENIUM 3000 has been shown to reduce the initial set time by as much as 2 hours and 33 minutes compared to that of a conventional superplasticizer.

In an embodiment of the invention, the superplasticizer is in the form of a liquid. In certain embodiments of the invention, the amount of superplasticizer added to the cementitious composition is from about 2 ounces to about 30 ounces, from about 4 ounces to about 24 ounces, from about 4 ounces to about 20 ounces, and from about 8 ounces to about 20 ounces for every 100 pounds of hydraulic cement in the cementitious composition. In certain preferred embodiments of the invention, the superplasticizer added to the cementitious composition is from about 4 ounces to about 16 ounces, more preferably, about 5 ounces to about 8 ounces, and, even more preferably, about 8 ounces for every 100 pounds of hydraulic cement in the cementitious composition.

In an embodiment of the invention, the cementitious composition may comprise a water reducer. A non-limiting example of a water reducer admixture includes POLYHEED® 997, an ASTM C494 type A water reducer, supplied by BASF Corporation. In certain embodiments of the invention, it is more preferred to use a water reducer with a superplasticizer in order to achieve a greater reduction in the amount of water mixed with the cementitious composition.

In an embodiment of the invention, the cementitious composition may additionally comprise prepuff particles such as those disclosed in U.S. Pat. Publ. No. 2008/0058446 to Guevare et al., entitled "Lightweight Concrete Compositions," fully incorporated herein by reference. In an exemplary embodiment, the prepuff particles are polymer particles having an average particle size of at least about 0.2 mm, at least about 0.3 mm, at least about 0.5 mm, at least about 0.9 mm, and at least about 1 mm up to at most about 8 mm, at most about 6 mm, at most about 5 mm, at most about 4 mm, at most about 3 mm, and at most about 2.5 mm.

As disclosed herein, the cementitious composition is combined with water, which functions as chemical water or hydration water and as excess water that, among other things, serves to plasticize the cementitious mix to render it more flowable. In some embodiments, the excess water, otherwise known as water of convenience, can be minimized. Alternatively, water vapor attenuation agents are selected to consume or scavenge certain amounts of the water of convenience. In yet other embodiments, the water of convenience is both minimized and consumed or scavenged based on the use of certain one or more water vapor attenuation agents.

While it is well-known in the art to include additives such as a plasticizer, more preferably, a superplasticizer, in order to reduce the amount of water of convenience needed, conventionally, the dependence on excess water has not been entirely eliminated. For example, conventional cement mixtures tend to have water to cementitious ratios on the order of 0.4 or higher. Specialty formulations that include a superplasticizer have been disclosed that reduce the water to cementitious ratio to 0.25 or higher, for example, similar to those compositions disclosed in U.S. Pat. No. 6,858,074 to Anderson et al., entitled "High Early-Strength Cementitious Composition."

In certain embodiments, the cementitious compositions are combined with water having a water to cementitious ratio of less that about 0.7, less than about 0.6, less than about 0.5, less than about 0.4, less than about 0.35, less than about 0.3, and less than about 0.25. In certain embodiments of the invention, the cementitious compositions are mixed with water in a water to cementitious ratio of about 0.2 or higher. In preferred embodiments of the invention, the cementitious compositions are mixed with water in a water to cementitious ratio of from about 0.2 to about 0.6. Based on knowledge prior to the information provided in this disclosure, a person having ordinary skill in the art would have been motivated merely to minimize, within certain limits, depending on other factors, the water to cementitious ratio of the cementitious mix. However, as this disclosure teaches, the inventive cementitious compositions may be formulated with one or more water vapor attenuation agents that allow higher water to cementitious ratios while still attenuating or decreasing the rate of water vapor emissions in the cementitious mix.

Another aspect of the invention provides methods of preparing cementitious compositions. In a preferred embodiment of the invention, a cementitious composition prepared according to certain embodiments of the invention is used to further prepare a concrete having an attenuated or decreased rate of water vapor emission after curing or hardening. In a preferred embodiment of the invention, the cementitious composition is proportioned to achieve rapid drying, which can be measured, for example, by the ASTM test procedures for vapor emissions or internal relative humidity, as described herein. In certain other embodiments of the invention, the cementitious composition is proportioned to achieve a desired property of a hardened concrete, which preferably can be measured using any of the various inventive procedures defined herein.

In an embodiment of the invention, a method for preparing a cementitious composition comprises the steps of mixing a hydraulic cement with a water vapor attenuation agent that may include any of an ultrafine calcium carbonate, preferably, having an average particle size of less than or equal to about 3 microns; a highly reactive pozzolan, preferably, silica fume and, more preferably, metakaolin; a shrinkage reducing agent, preferably, any one of polypropylene glycol, any copolymer thereof, any derivative thereof, and any combination thereof; a humidity reducer, preferably, an alkali metal halide salt, an alkali metal pseudo halide salt, an alkali metal nitrate salt, an alkali metal nitrite salt, preferably, sodium nitrite, sodium formate, sodium acetate, and any combination thereof; and combinations thereof. In an embodiment of the invention, the water vapor attenuation agent has a concentration between about 0.5% to about 18% by weight based on a total weight of cementitious compounds. In a preferred embodiment of the invention, the cementitious composition will be used to form a cementitious mix that produces a concrete having an attenuated water vapor emission rate of between about 3 lb/1000 ft$^2$/24 h to about 5 lb/1000 ft$^2$/24 h in less than or equal to about 30 days, less than or equal to about 25 days, less than or equal to about 21 days, less than or equal to about 18 days, preferably, less than or equal to about 15 days, more preferably, less than or equal to about 12 days, and, even more preferably, less than or equal to about 10 days after hardening.

In an embodiment of the invention, the method for preparing the cementitious composition may additionally include the step of adding a cement replacement. The cement replacement may comprise a finely divided material. In an embodiment of the invention, the finely divided material has a particle size of less than about 75 microns. For example, a finely divided material having a particle size of less than about 75 microns may be the material retained on a standard sieve having 75 micron openings. Alternatively, a finely divided material having a particle size of less than about 75 microns may be the material that passes through a standard sieve having a varying plurality of openings of +/−75 micron. In another embodiment of the invention, the finely divided material has a particle size of less than about 45 microns. In yet another embodiment of the invention, the finely divided material comprises a material that passes through a standard sieve size of 200.

In another embodiment of the invention, the finely divided material is selected from the group consisting of a pozzolan, such as, for example, a fly ash; a ground granulated blast furnace slag; and any combination thereof. Further to this embodiment, the cementitious composition has a ratio by weight of finely divided material to total weight of the cementitious composition of from about 0.03 to about 0.8, and, alternatively, from about 0.15 to about 0.8.

In still another embodiment of the invention, the finely divided material comprises a highly reactive pozzolan selected from the group consisting of silica fume, metakaolin, and any combination thereof. Further to this embodiment, the cementitious composition has a ratio by weight of finely divided material to cement of from about 0.05 to about 0.20.

In certain embodiments of the invention, the cement replacement comprises a densifying precursor. In a preferred embodiment of the invention, the densifying precursor is a densifying calcium silicate precursor.

In an embodiment of the invention, the method for preparing a cementitious composition includes the step of including a superplasticizer. The superplasticizer has a concentration in a range from about 1 ounce to about 6 ounces for every 100 pounds of hydraulic cement in the cementitious composition. In a preferred embodiment of the invention, the superplasticizer includes a polycarboxylate superplasticizer.

In an embodiment of the invention, the method for preparing a cementitious composition additionally comprises the step of incorporating an aggregate in the cementitious composition. In an embodiment of the invention, the aggregate comprises at least one of a fine aggregate, a course aggregate, and combinations thereof.

Another aspect of the invention provides a method for the treatment of porous aggregates used certain cementitious compositions or concrete compositions of the invention. In an embodiment of the invention, treatment of porous aggregates comprises heating the aggregates and quenching the hot aggregates with a solution of one or more salts. In alternative embodiments of the invention, porous aggregates may be soaked in solutions without first heating the aggregates. In other embodiments of the invention, the soaked aggregates may be boiled in the solution. In certain embodiments of the invention the solution of one or more salts is an aqueous solution. In certain embodiments of the invention, the concentration of the one or more salts in the solution is in a range of from about 1% by weight to about 20% by weight base on a total weight of the solution. In certain other embodiments of the invention, the concentration of the one or more salts in the solution is in a range of from about 5% by weight to about 20% by weight base on a total weight of the solution. In yet certain other embodiments of the invention, the concentration of the one or more salts in the solution is in a range of from about 5% by weight to about 15% by weight base on a total weight of the solution. In still certain other embodiments of the invention, the concentration of the one or more salts in the solution is in a range of from about 8% by weight to about 20% by weight base on a total weight of the solution.

In embodiments of the invention when the aggregates are heated before quenching by the solution, they can be heated to a temperature higher than 200° F., more preferably higher than 250° F., and more preferably in the range of 300-400° F. An example embodiment of the soaking or quenching solution is a solution of sodium acetate in a concentration of 1 to 2.5 mol/L. Without intending to be bound by theory, lightweight aggregates treated in this fashion may have extended moisture retention, and the resulting low-density concrete may have an accelerated speed to reach 75% internal relative humidity, improved internal curing and other enhanced concrete characteristics. In an embodiment of the invention, a process for treating porous aggregates used in certain cementitious compositions of the invention utilizes hot finished and sized product or lightweight clinker, and quenches and cools the aggregate in an aqueous chemical bath so that a substantial amount of the capillaries of the lightweight become filled with solution. The preferred lightweight or clinker temperature is about 350° F. (177° C.). The steam, initially quench generated, may be forced into the smaller capillaries where it condenses and fills the smaller capillaries with water. The solute may become dispersed through much of this system, increasing the water vapor retention by lowering the vapor pressure and modifying the water in the micro pores (less than 0.01 mm) and in mid-range pores as relatively non-evaporable water. Because smaller pores in many lightweights may constitute a substantial amount of the total void system, this sequestered water is infused through certain methods of the invention can measurably impact the amount available to the mortar system as self-desiccation and atmospheric vapor emissions decrease the internal relative concrete humidity to the desired 75% range.

In certain embodiments of the invention, salts may be directly attached to outer surfaces of aggregates (e.g., to improve hydration of the binder). For instance, certain chemicals or vectors that effect change in the concrete as a consequence of their dissolution into the paste may be attached to the lightweight aggregate by allowing a short surface drying time and then applying the appropriate solution to the aggregate or leaving the soak or quench solution on the surface to evaporate and deposit its solute. In one embodiment, an example solution to achieve this result comprises 15 wt % NaAc and 5 wt % NaCl.

An aspect of the invention provides porous lightweight aggregates treated with salt for improved water saturation and water retention manufactured. Without intending to be bound by theory, the salt is intended to enhance penetration of aqueous solution into pores and capillaries of the porous lightweight aggregate and helps retain water within the capillaries over time, as compared to porous lightweight aggregate treated with only water without the salt. Small pores of the lightweight aggregates may be filled with solutions to higher levels than typically achievable with the conventional use of water alone. The solution-filled aggregates of the invention may retain water in the pores for prolonged periods and may facilitate rewetting of larger pores. According to certain embodiments of the invention, higher levels of water saturation of the lightweight aggregates may prevent absorption of water when using a concrete pump, avoiding loss of workability or plasticity. Moreover, such treated porous aggregates yield concrete with lower internal humidity.

Another aspect of the various embodiments of the invention provides a cementitious mix comprising any of the cementitious compositions of the invention. In certain embodiments of the invention, the cementitious mix comprises an amount of water sufficient to provide a water to cementitious ratio of from about 0.05 to about 0.7; from about 0.1 to about 0.6; preferably, from about 0.2 to about 0.5; and, more preferably, from about 0.25 to about 0.4.

In certain embodiments of the invention, the cementitious mix comprises a hydraulic cement, an aggregate, a cement replacement, a water vapor attenuation agent, water, and a superplasticizer. In a preferred embodiment of the invention, the cement replacement is a densifying calcium silicate precursor. In another preferred embodiment of the invention, the superplasticizer is a polycarboxylate superplasticizer.

According to certain embodiments of the invention, the cementitious mix comprises a hydraulic cement having a concentration from about 8 wt % to about 35 wt % based on a total weight of cementitious compounds; an aggregate having a concentration from about 25 wt % to about 85 wt % based on the total weight of cementitious compounds; a densifying calcium silicate precursor having a concentration from about 3 wt % to about 80 wt % based on the total weight of cementitious compounds; a water vapor attenuation agent having a concentration from about 0.5 wt % to about 18 wt % based on the total weight of cementitious compounds; an amount of water sufficient to provide a water to cementitious ratio of from about 0.2 to about 0.4; and a polycarboxylate superplasticizer having a concentration from about 4 ounces to about 16 ounces per 100 pounds of cementitious compounds.

In an exemplary embodiment of the invention, the cementitious mix comprises a hydraulic cement having a concentration from about 8 wt % to about 35 wt % based on a total weight of cementitious compounds; an aggregate having a concentration from about 25 wt % to about 85 wt %, preferably, from about 35 wt % to about 75 wt % based on the total weight of cementitious compounds; a densifying calcium silicate precursor having a concentration from about 3 wt % to about 80 wt %, preferably, from about 5 wt % to about 25 wt % based on the total weight of cementitious compounds; an amount of water sufficient to provide a water to cementitious ratio of from about 0.2 to about 0.6; and a polycarboxylate superplasticizer having a concentration from about 1 ounce to about 6 ounces per 100 pounds of cementitious compounds.

An aspect of the invention provides methods of manufacturing freshly mixed concrete having improved workability and faster surface drying. An embodiment of a method of the invention comprises: (1) adding a salt directly to the concrete mix and/or providing a porous lightweight aggregate infused with an aqueous solution comprising water and at least one salt; (2) preparing a fresh concrete mixture by blending aggregate, hydraulic cement, salt and water; and (3) permitting the concrete to harden. Without intending to be bound by theory, the salt may enhance retention of water within the cement paste capillaries and/or the pores of lightweight aggregate over time. A reduced IRH, hastened surface drying, and inhibition of autogenous and drying shrinkage may be realized in certain concrete mixes of the invention. The salt may also enhance wetting of the pores of a porous lightweight aggregates, which may result in an increased workability of the fresh concrete mixture when compared to a fresh concrete mixture conventionally made without using the salt.

When using porous aggregates, relatively brief storage of such materials in normal (50%) atmospheric relative humidity will rapidly desiccate particles saturated only with plain water. In contrast, aggregates infused with aqueous salt solution of the invention loses water by evaporation at a slower rate and quickly rehydrates as large voids refill with water to a saturated condition upon contact with concrete mix water. The need for additional mix water to compensate for pump pressure workability loss may also be minimized. Further, the concrete mix can better accommodate the use of super-plasticizers since the loss of the more efficient plasticized mix water under the influence of pump pressure is minimized. Plasticizers can reduce water contents by 10% or more, thereby speeding the internal drying process.

After the fresh concrete mixture exits the concrete pump, the salt prevents air-pressurized water from being released back to the non-aggregate components of the concrete, which allows the fresh concrete to maintain desired workability and avoid problems associated with excess water, such as bleeding and segregation. Furthermore, the salt inhibits or slows diffusion of water from the porous lightweight aggregate and cement paste, thereby causing the hardened concrete to more quickly achieve a desired internal humidity (e.g., 75% or less) compared to hardened concrete made in the absence of the salt.

Furthermore, the water contained in pores of lightweight aggregates may be gradually released and react with cementitious binder materials after the concrete reaches a desired internal relative humidity, which results in prolonged hydration and internal curing and a resulting increase in long-term strength of the concrete manufactured using the cementitious compositions or according to certain methods of the invention.

When structural lightweight aggregates are used to make low-density concretes according to the disclosed inventive processes, the resulting concrete would have density and compressive strength suitable for structural application, with density in the range of 80-120 lb/ft$^3$ (pcf) and compressive strength in the range of 2500-6000 psi. When non-structural lightweight aggregates are used, concretes are suitable as fill concrete or insulating concrete when the density is in the range of 50-90 pcf and compressive strength 1000-2000 psi; or as insulating concrete when density is smaller than 50 pcf and compressive strength is in the range of 300-1000 psi.

In an embodiment of the invention, a method for preparing a concrete structure using a cementitious composition comprises the steps of mixing a hydraulic cement and a water vapor attenuation agent; adding any of a cement replacement, an admixture, and a superplasticizer; and blending an amount of water into the cementitious composition to prepare a cementitious mix. In a preferred embodiment of the invention, the cementitious mix will produce a hardened concrete having an attenuated water vapor emission rate of between about 3 lb/1000 ft$^2$/24 h to about 5 lb/1000 ft$^2$/24 h in less than or equal to about 50 days, less than or equal to about 36 days, less than or equal to about 30 days, less than or equal to about 28 days, less than or equal to about 25 days, less than or equal to about 21 days, less than or equal to about 18 days, preferably, less than or equal to about 15 days, more preferably, less than or equal to about 12 days, even more preferably, less than or equal to about 10 days, and, yet even more preferably, less than or equal to about 7 days.

Generally, the method of using the cementitious composition additionally comprises the steps of using the cementitious mix to form a cementitious segment or a preform of the concrete structure and curing the cementitious segment or preform of the concrete structure to a hardened concrete. Further to this embodiment, the cementitious segment may be subjected to additional processing steps. For example, a trowel may be applied to the cementitious segment to, for example, smooth the surface of the cementitious segment and/or to even the distribution of the cementitious mix in a form.

In certain embodiments of the invention, the methods of use may additionally comprise the step of applying a regimen and/or technique that facilitates a more rapid curing of the cementitious mix to a hardened concrete. Any technique known in the art may be used to more rapidly cure the cementitious mix. Non-limiting examples of such techniques include applying a moisture barrier between a moisture source and the formed cementitious segment; maintaining the movement of air at the surface of the cementitious segment being cured to ensure water that evolves from the segment is removed; heating, for example, with thermal and/or radiant heat, the cementitious segment being cured; and controlling humidity between the moisture barrier and the formed cementitious segment by the maintaining and heating steps.

In an embodiment of the invention, the water vapor attenuation agent may include any of a highly reactive pozzolan, preferably, silica fume and, more preferably, metakaolin; a shrinkage reducing agent, preferably, any one of polypropylene glycol, any copolymer thereof, any derivative thereof, and any combination thereof; an inorganic accelerator, preferably, an alkali metal halide salt, an alkali metal pseudo halide salt, an alkali metal nitrate salt, an alkali metal nitrite salt, preferably, sodium nitrite, and any combination thereof; and combinations thereof. In an embodiment of the invention, the water vapor attenuation agent has a concentration between about 0.5% to about 18% by weight based on a total weight of cementitious compounds.

In an embodiment of the invention, the cement replacement comprises a finely divided material. In certain embodiments of the invention, the finely divided material has a particle size of less than about 75 microns. In an embodiment of the invention, the finely divided material is a material that passes through a standard sieve size of 200. In certain embodiments of the invention, the finely divided material comprises a cement replacement.

In another embodiment of the invention, the finely divided material is selected from the group consisting of a pozzolan, such as, for example, a fly ash; a ground granulated blast furnace slag; and any combination thereof. Further to this embodiment, the cementitious composition has a ratio by weight of finely divided material to cement of from about 0.15 to about 0.8.

In still another embodiment of the invention, the finely divided material comprises a highly reactive pozzolan selected from the group consisting of silica fume, metakaolin, and any combination thereof. Further to this embodiment, the cementitious composition has a ratio by weight of finely divided material to cement of from about 0.06 to about 0.105.

In certain embodiments of the invention, the cement replacement comprises a densifying precursor. In a preferred embodiment of the invention, the densifying precursor is a densifying calcium silicate precursor.

In an embodiment of the invention, the superplasticizer has a concentration in a range from about 4 ounces to about 20 ounces for every 100 pounds of cementitious composition. In a preferred embodiment of the invention, the superplasticizer at least includes a polycarboxylate superplasticizer.

In a preferred embodiment of the invention, the amount of water and a ratio by weight of the water vapor attenuation agent to the hydraulic cement, which may encompass any of the other compounds as disclosed herein, are proportioned to hydrolyze the cementitious composition and allow the prepared cementitious mix to achieve a desired level of plasticity. In another preferred embodiment of the invention, the amount of water and a ratio by weight of the water vapor attenuation agent and/or finely divided material to the hydraulic cement, which may encompass any of the other compounds as disclosed herein, are proportioned to achieve a desired level of plasticity while achieving a desired property of the concrete. In certain embodiments, the desired property of the concrete is any of minimizing an amount of time needed to achieve a water vapor emission of the concrete, minimizing an amount of time needed to achieve an internal relative humidity of the concrete, a reduced shrinkage of the concrete, and any combination thereof. Without intending to be limiting, a reduced shrinkage of the concrete will reduce the curling or warping of the concrete when used in flooring applications and allow for better control of joint spacing between concrete segments.

In an embodiment of the invention, the method for preparing a cementitious composition additionally comprises the step of incorporating an aggregate into the cementitious composition. In an embodiment of the invention, the aggregate comprises at least one of a fine aggregate, a course aggregate, and any combination thereof.

The combination of steps for preparing a cementitious composition for use in preparing a concrete structure may be varied depending upon the desired application of the finished concrete structure. For example, in many circumstances, a concrete structure used in flooring must assure that a dry substrate is available allowing a coating and/or sealant to be applied within a reasonable amount of time. While not intending to be limiting, the compositions and methods of the invention are suitable for such applications because they provide a relatively fast drying cementitious mix with an attenuated or reduced water vapor emissions after cure. Typically, the cementitious mixes for such applications are typically characterized by an appropriate mix of cementitious compounds—i.e., cement(s), slag(s), water vapor attenuation agent(s), and/or pozzolans—available to react with the residual water allowing the water vapor emissions to be reduced to about 3 lb/1000 ft$^2$/24 h and an internal relative humidity of about 75% to be achieved in 45 days. The rule-of-thumb for more conventional compositions is 1 month for every inch of concrete thickness (e.g., 5 months for a commonly used 5 inch concrete structure).

Another aspect of the invention provides cementitious compositions manufactured using any of the aforementioned methods of the invention. Yet another aspect of the invention provides a concrete manufactured using any of the aforementioned methods of the invention.

As disclosed herein, the critical parameters for achieving a relatively fast drying concrete using the cementitious compositions of the inventions and methods as disclosed herein include any of the water to cementitious ratio; employing a curing technique that is adequate to assure eventual water impermeability; type and amount of the one or more water vapor attenuation agents included in the cementitious composition; optionally, the use of a sufficiently fine material to create a dense mass; and any combination thereof.

As a person having ordinary skill in the art having the benefit of this disclosure would understand, care must be exercised in blending any pozzolan in order to control the heat of hydration, or else thermal cracking of the concrete could become problematic rendering, for the most part, the use of any pozzolan virtually ineffective. As a person having ordinary skill in the art having the benefit of this disclosure would further understand, care must also be exercised in proportioning and compounding the cementitious mix. For example, a cementitious mix that is too sticky will be difficult to pump and finish using conventional techniques.

EXAMPLES

Examples 1-2

The purpose of the tests in Example 1 were to demonstrate the effect of the concentration of a polycarboxylate superplasticizer and the use of a water reducer on the use of chemically bound water and the extent of shrinkage realized by the concrete sample mixes of Table 9.

TABLE 9

| Compound/Property | Sample 1 | Sample 2 Concrete Mix | Sample 3 |
|---|---|---|---|
| Portland Cement, Type I-II, lb | 800 | 517 | 611 |
| Sand, ASTM C33, lb | 1,300 | 1,525 | 1,500 |
| 1 inch Stone, ASTM C33, lb | 1,850 | 1,850 | 1,850 |
| GLENIUM 3000, oz/100 lb cement | 16.0 | — | 8.0 |
| POLYHEED 997, oz/100 lb cement | — | 5.3 | — |
| Water, lb | 225 | 290 | 228 |
| water to cement ratio | 0.28 | 0.56 | 0.37 |
| Air Content, % | 1.7 | 3.4 | 5.4 |
| Density, lb/ft$^3$ (pcf) | 155 | 147 | 148 |
| Yield, ft$^3$/yd$^3$ | 26.9 | 28.1 | 28.1 |
| Slump, inches | >6.00 | 4.25 | 5.25 |

The data in Table 10 shows the shrinkage results for the concrete mixes of the examples. The specimens were tested according to the ASTM C157 (2006) protocol. Each shrinkage sample was cured at 73° F. and 100% humidity for 24 hours, and followed by a curing step while immersed in water for 7 days. Drying was conducted at 50% relative humidity and 73° F.

TABLE 10

| Days Drying | Sample 1 | Sample 2 Shrinkage, % | Sample 3 |
|---|---|---|---|
| 14 | 0.0133 | 0.0193 | 0.0133 |
| 21 | 0.0203 | 0.0290 | 0.0183 |
| 28 | 0.0227 | 0.0343 | 0.0217 |
| 35 | 0.0243 | 0.0387 | 0.0230 |
| 42 | 0.0303 | 0.0487 | 0.0300 |
| 56 | 0.0350 | 0.0560 | 0.0353 |

The cementitious composition of sample 2, which uses a water reducer instead of a polycarboxylate superplasticizer shows the greatest amount of shrinkage. The cementitious compositions of samples 1 and 3 show that the amount of shrinkage can be somewhat maintained with varying concentrations of cement in the composition by changing the proportion of superplasticizer to control the water.

The purpose of the test in Example 2 was to show that the need for additional water with an increasing concentration of cement in a cementitious composition can be offset by increasing the use of a superplasticizer and also by increasing the concentration of the superplasticizer in the cementitious composition. As the sample mixes illustrated in Table 8 show, sample 3 has 94 lbs more concrete than sample 2, and yet has a much smaller demand for water as a result of using a superplasticizer versus that of using a water reducer. Sample 1 contains 189 lbs more cement than sample 3 and yet has a lower water to cementitious ratio as are result of increasing the concentration of superplasticizer in the cementitious composition.

Example 3

The purpose of the tests in Example 3 were to demonstrate the effect of a polycarboxylate superplasticizer on the reduction in the amount of time needed to achieve a desired rate of water vapor emissions using the concrete sample mixes of Table 11.

TABLE 11

| Compound/Property | Sample 4 | Sample 5 Concrete Mix | Sample 6 |
|---|---|---|---|
| Portland Cement, Type I-II, lb | 800 | 517 | 611 |
| Sand, ASTM C33, lb | 1,300 | 1,525 | 1,500 |
| 1 inch Stone, ASTM C33, lb | 1,850 | 1,850 | 1,850 |
| GLENIUM 3000, oz/100 lb cement | 16.0 | — | 8.0 |
| POLYHEED 997, oz/100 lb cement | — | 5.3 | — |
| Water, lb | 225 | 281 | 228 |
| water to cement ratio | 0.28 | 0.54 | 0.37 |
| Air Content, % | 3.4 | N/A | 5.6 |
| Density, lb/ft$^3$ (pcf) | 155 | 146 | 147 |
| Yield, ft$^3$/yd$^3$ | 27.0 | 28.2 | 28.2 |
| Slump, inches | >6.00 | 4.50 | 5.00 |

The curing data and number of days required to achieve a water vapor emission rate of 3 lb/1000 ft$^2$/24 hr shown in Table 12 were obtained by casting each of the samples in a 2 foot×2 foot×5½ inch deep panel lined with polyethylene.

Immediately prior to initial set, each panel was given a steel trowel finish and sealed for the noted cure period at 73° F. Following the cure period, the concrete slabs were unsealed and allowed to dry at 50% relative humidity and 73° F. in a drying room. The water vapor emissions data was obtained by averaging two calcium chloride dome tests conducted according to the ASTM F1869 test standard.

TABLE 12

|  | Sample 4 | Sample 5 | Sample 6 |
|---|---|---|---|
| Curing Time, days | 28 | 28 | 28 |
| Drying Time needed for 3 lb/1000 ft² · 24 hr Emissions, days | 17 | >50 | 22 |

The mixture of sample 5 has a water to cementitious ratio that is greater than that of samples 4 and 6; however, the sample requires greater than 50 days drying in order to achieve a water vapor emissions rate of 3 lb/1000 ft²/24 hr. The mix of sample 6 shows a superplasticizer helps to attenuate the water vapor emissions over that of the water reducer used in the mix of sample 5. Sample 4 shows that increasing the concentration of the superplasticizer further reduces the amount of drying time needed to achieve the desired water vapor emissions rate.

Example 4

The purpose of the tests in Example 4 were to demonstrate the effect of a polycarboxylate superplasticizer along with the presence of a reactive pozzolan on the amount of time needed to reduce the internal relative humidity to a desired value using the concrete sample mixes of Table 13.

TABLE 13

| Compound/Property | Sample 7 | Sample 8 | Sample 9 |
|---|---|---|---|
|  |  | Concrete Mix |  |
| Hanson Cement, Type I-II, lb | 517 | 740 | 740 |
| Silica Fume, lb | — | 60 | — |
| Metakaolin, lb | — | — | 60 |
| Sand, ASTM C33, lb | 1,525 | 1,200 | 1,200 |
| Sand, ASTM C33 #67, lb | 1,950 | 1,950 | 1,950 |
| GLENIUM 3000, oz/100 lb cement | — | 16.2 | 16.2 |
| POLYHEED 997, oz/100 lb cement | 5.0 | — | — |
| Colloid Defoamer, oz | 0.5 | 0.5 | 0.5 |
| Water, lb | 264 | 186 | 197 |
| water to cement ratio | 0.51 | 0.23 | 0.25 |
| Mix Temperature, ° F. | 65 | 66 | 67 |
| Air Content, % | 1.3 | 3.6 | 1.1 |
| Density, lb/ft³ (pcf) | 152 | 156 | 156 |
| Yield, ft³/yd³ | 28.1 | 26.5 | 26.7 |
| Slump, inches | 5.75 | flowing | flowing |

Each sample was cast in a 2 foot×2 foot×5½ inch deep panel lined with polyethylene. Immediately prior to initial set, each panel was given a steel trowel finish and sealed for a 13-day cure period at 73° F. Following the cure period, the concrete slabs were unsealed and allowed to dry at 50% relative humidity and 73° F. in a drying room. The relative humidity was obtained according to the ASTM F 2170 test procedure using in situ probes. The curing data and number of days required to achieve an internal relative humidity of 75% for the cured concrete samples are shown in Table 14.

TABLE 14

|  | Sample 7 | Sample 8 | Sample 9 |
|---|---|---|---|
| Curing Time, days | 13 | 13 | 13 |
| Drying Time needed to Achieve 75% Relative Humidity, days | >63 | 28 | 28 |

The cementitious composition of sample 7, which used only the water reducer, produced a concrete having an internal relative humidity of 87.3% at the end of 63 days. Samples 8 and 9 comprising silica fume and metakaolin, respectively, as well as a superplasticizer produced a concrete that required only 28 days of drying time to achieve an internal relative humidity of 75%.

Example 5

The purpose of the tests in Example 5 was to demonstrate the effect of partial substitution with a finely divided material (finely divided ground granulated blast furnace slag and finely divided type F fly ash) generally smaller than a U.S. standard sieve size 200 or particles having a size less than about 75 microns along with a superplasticizer in the cementitious compositions using the sample mixes of Table 15.

TABLE 15

| Compound/Property | Sample 14 | Sample 15 | Sample 16 | Sample 17 | Sample 18 |
|---|---|---|---|---|---|
|  |  |  | Concrete Mix |  |  |
| Cement, lb | 800 | 600 | 400 | 560 | 680 |
| Ground Slag, lb | — | 200 | 400 | — | — |
| Fly Ash - Type F, lb | — | — | — | 240 | 120 |
| Sand, lb | 1,300 | 1,300 | 1,300 | 1,300 | 1,300 |
| GLENIUM 3000, oz/100 lb cement | 8 | 8 | 8 | 8 | 8 |
| Water, lb | 195 | 190 | 190 | 210 | 198 |
| water to cement ratio | 0.24 | 0.24 | 0.24 | 0.26 | 0.25 |
| Density, lb/ft³ (pcf) | 151 | 150 | 149 | 144 | 148 |
| Yield, cc³ | 950 | 957 | 960 | 1006 | 971 |
| Slump (Spread), inches | flowing | flowing | flowing | flowing | flowing |

The sample mixes were analyzed using the mortar method, as further disclosed herein. Mortar of the same workability level as the concrete of the investigation was mixed and cast in 6 inch×6 inch plastic pans to a depth of 1⅝ inches. The samples were cured unsealed for 24 hours and then sealed for a 14-day cure. Vapor loss measurements were determined based on the changes in weight of the samples and is reported in Table 16.

TABLE 16

|  | Sample 14 | Sample 15 | Sample 16 | Sample 17 | Sample 18 |
|---|---|---|---|---|---|
| Total Water Vapor Loss, gr | 3.7 | 2.9 | 4.4 | 7.4 | 5.6 |

Increasing the amount of ground granulated blast furnace slag, as shown in samples 15 and 16, resulted in the same water to cementitious ratio and produced a vapor loss in the same range as sample 14, the control mix. Substitution of type F fly ash in samples 17 and 18 resulted in progressively higher vapor emissions over the curing period, but represent rates that still are within a satisfactory range.

Example 6

The sample mixes of Tables 17 and 18 were used to analyze the variations in water loss measured from the 6 inch×6 inch mortar samples pans for mixes comprising cements and sands from five different regions. The average vapor loss for these samples was 6.34, while the standard deviation for the sample was 1.08.

TABLE 17

|  | Sample 19 | Sample 20 | Sample 21 | Sample 22 | Sample 23 |
|---|---|---|---|---|---|
| Cement, gr |  |  |  |  |  |
| Permanente, CA | 650 | — | — | — | — |
| Maryland | — | 650 | — | — | — |
| Texas | — | — | 650 | — | — |
| Michigan | — | — | — | 650 | — |
| Tennessee | — | — | — | — | 650 |
| Sand, gr |  |  |  |  |  |
| Seacheldt | 1,430 | 1,430 | 1,430 | 1,430 | 1,430 |
| Maryland | — | — | — | — | — |
| Texas | — | — | — | — | — |
| Michigan | — | — | — | — | — |
| Tennessee | — | — | — | — | — |
| Glenium 3000, oz/100 lb cement | 16 | 16 | 16 | 16 | 16 |
| Water, gr | 190 | 208 | 208 | 216 | 210 |
| water to cement ratio | 0.29 | 0.32 | 0.32 | 0.33 | 0.32 |
| Density, lb/ft$^3$ (pcf) | 149 | 148 | 148 | 146 | 147 |
| Yield, cc$^3$ | 953 | 968 | 967 | 985 | 976 |
| Slump, inches | 8.0 | 6.3 | 6.0 | 5.5 | 5.5 |
| Mix Temperature, ° F. | 75.0 | 76.0 | 75.0 | 76.0 | 75.0 |
| Vapor Loss, gr | 8.0 | 6.3 | 6.0 | 5.5 | 5.5 |

TABLE 18

|  | Sample 24 | Sample 25 | Sample 26 | Sample 27 |
|---|---|---|---|---|
| Cement, gr |  |  |  |  |
| Permanente, CA | — | — | — | — |
| Maryland | 650 | — | — | — |
| Texas | — | 650 | — | — |
| Michigan | — | — | 650 | — |
| Tennessee | — | — | — | 650 |
| Sand, gr |  |  |  |  |
| Seacheldt | — | — | — | — |
| Maryland | 1,430 | — | — | — |
| Texas | — | 1,430 | — | — |
| Michigan | — | — | 1,430 | — |
| Tennessee | — | — | — | 1,430 |
| Glenium 3000, oz/100 lb cement | 35 | 16 | 16 | 16 |
| Water, gr | 224 | 204 | 216 | 206 |
| water to cement ratio | 0.34 | 0.32 | 0.33 | 0.32 |
| Density, lb/ft$^3$ (pcf) | 144 | 148 | 146 | 149 |
| Yield, cc$^3$ | 1003 | 970 | 988 | 960 |
| Slump, inches | 5.0 | 8.0 | 5.5 | 7.3 |
| Mix Temperature, ° F. | 75.0 | 76.0 | 75.0 | 75.0 |
| Vapor Loss, gr | 5.0 | 8.0 | 5.5 | 7.3 |

Examples 7-8

The purpose of the tests in Example 7 were to demonstrate the effect of the concentration of a polycarboxylate superplasticizer and the use of a water reducer on the use of chemically bound water and the extent of shrinkage realized by the concrete sample mixes of Table 19.

TABLE 19

| Compound/Property | Sample 28 | Sample 29 | Sample 30 |
|---|---|---|---|
|  | Concrete Mix |  |  |
| Portland Cement, Type I-II, lb | 800 | 517 | 611 |
| Sand, ASTM C33, lb | 1,300 | 1,525 | 1,500 |
| 1 inch Stone, ASTM C33, lb | 1,850 | 1,850 | 1,850 |
| GLENIUM 3000, oz/100 lb cement | 16.0 | — | 8.0 |
| POLYHEED 997, oz/100 lb cement | — | 5.3 | — |

TABLE 19-continued

| Compound/Property | Sample 28 | Sample 29 | Sample 30 |
|---|---|---|---|
| | | Concrete Mix | |
| Water, lb | 225 | 290 | 228 |
| water to cement ratio | 0.28 | 0.56 | 0.37 |
| Air Content, % | 1.7 | 3.4 | 5.4 |
| Density, lb/ft$^3$ (pcf) | 155 | 147 | 148 |
| Yield, ft$^3$/yd$^3$ | 26.9 | 28.1 | 28.1 |
| Slump, inches | >6.00 | 4.25 | 5.25 |

The data in Table 20 shows the shrinkage results for the concrete mixes of the examples. The specimens were tested according to the ASTM C157 (2006) protocol. Each sample was cured at 73° F. and 100% relative humidity for 24 hours, and followed by a curing step while immersed in water for 7 days. Drying was conducted at 50% relative humidity and 73° F.

TABLE 20

| Days Drying | Sample 28 | Sample 29 | Sample 30 |
|---|---|---|---|
| | | Shrinkage, % | |
| 14 | 0.0133 | 0.0193 | 0.0133 |
| 21 | 0.0203 | 0.0290 | 0.0183 |
| 28 | 0.0227 | 0.0343 | 0.0217 |
| 35 | 0.0243 | 0.0387 | 0.0230 |
| 42 | 0.0303 | 0.0487 | 0.0300 |
| 56 | 0.0350 | 0.0560 | 0.0353 |

The cementitious composition of sample 29, which uses a water reducer instead of a polycarboxylate superplasticizer, shows the greatest amount of shrinkage. The cementitious compositions of samples 28 and 30 show that the amount of shrinkage can be somewhat maintained with varying concentrations of cement in the composition by changing the proportion of superplasticizer to control the water.

The purpose of the test in Example 8 was to show that the need for additional water with an increasing concentration of cement in a cementitious composition can be offset by increasing the use of a superplasticizer and also by increasing the concentration of the superplasticizer in the cementitious composition. As the sample mixes illustrated in Tables 19 and 20 show, sample 30 has 94 lbs more concrete than sample 29, and yet has a much smaller demand for water as a result of using a superplasticizer versus using a water reducer. Sample 28 contains 189 lbs more cement than sample 30 and yet has a lower water to cement ratio as a result of increasing the concentration of superplasticizer in the cementitious composition.

Example 9

The purpose of the test in Example 9 was to demonstrate the effect of a polycarboxylate superplasticizer along with the presence of a reactive pozzolan on the amount of time needed to reduce the internal relative humidity to a desired value using the concrete sample mixes of Table 21.

TABLE 21

| Compound/Property | Sample 33 | Sample 34 | Sample 35 |
|---|---|---|---|
| | | Concrete Mix | |
| Hanson Cement, Type I-II, lb | 517 | 740 | 740 |
| Silica Fume, lb | — | 60 | — |
| Metakaolin, lb | — | — | 60 |

TABLE 21-continued

| Compound/Property | Sample 33 | Sample 34 | Sample 35 |
|---|---|---|---|
| | | Concrete Mix | |
| Sand, ASTM C33, lb | 1,525 | 1,200 | 1,200 |
| Sand, ASTM C33 #67, lb | 1,950 | 1,950 | 1,950 |
| GLENIUM 3000, oz/100 lb cement | — | 16.2 | 16.2 |
| POLYHEED 997, oz/100 lb cement | 5.0 | — | — |
| Colloid Defoamer, oz | 0.5 | 0.5 | 0.5 |
| Water, lb | 264 | 186 | 197 |
| water to cement ratio | 0.51 | 0.23 | 0.25 |
| Mix Temperature, ° F. | 65 | 66 | 67 |
| Air Content, % | 1.3 | 3.6 | 1.1 |
| Density, lb/ft$^3$ (pcf) | 152 | 156 | 156 |
| Yield, ft$^3$/yd$^3$ | 28.1 | 26.5 | 26.7 |
| Slump, inches | 5.75 | flowing | flowing |

Each sample was cast in a 2 foot×2 foot×5½ inch deep panel lined with polyethylene. Immediately prior to initial set, each panel was given a steel trowel finish and sealed for a 13-day cure period at 73° F. Following the cure period, the concrete slabs were unsealed and allowed to dry at 50% relative humidity and 73° F. in a drying room. The relative humidity was obtained according to the ASTM F 2170 test procedure using in situ probes. The curing data and number of days required to achieve an internal relative humidity of 75% for the cured concrete samples are shown in Table 22.

TABLE 22

| | Sample 33 | Sample 34 | Sample 35 |
|---|---|---|---|
| Curing Time, days | 13 | 13 | 13 |
| Drying Time needed to Achieve 75% Relative Humidity, days | >63 | 28 | 28 |

The cementitious composition of sample 33, which used only the water reducer, produced a concrete having an internal relative humidity of 87.3% at the end of 63 days. Samples 34 and 35 comprising silica fume and metakaolin, respectively, as well as a superplasticizer produced a concrete that required only 28 days of drying time to achieve an internal relative humidity of 75%.

Example 10

The purpose of the tests in Example 10 was to demonstrate the effect of an inorganic accelerator on the reduction in relative humidity for the cementitious compositions using the sample mixes of Table 23.

TABLE 23

| Compound/Property | Sample 40 | Sample 41 | Sample 42 |
|---|---|---|---|
| | | Concrete Mix | |
| cement, lb/yard | balance | balance | balance |
| sodium chloride, lb/yard | 0 | 11 | 20 |
| water to cement ratio | same | same | same |
| days to 75% relative humidity | 29 | 19 | 17 |

As shown by samples 41 and 42 over control sample 40, concrete mixtures comprising sodium chlorides as an inorganic accelerator, indeed, even increasing amounts of the use of the sodium chloride, show a reduction in the amount of time needed to achieve a 75% relative humidity.

Example 11

The purpose of the tests in Example 11 was to demonstrate the improvement in water retention of lightweight aggregates treated with the various aqueous solutions. In Example 11, lightweight aggregates were heated, quenched, air dried, and re-immersed in water or solutions. Lightweight aggregates of ⅜ inch average diameter were heated to 350° F., then quenched in 7 different chemical solutions in Samples 44-50, which were aqueous solutions containing one of $NaNO_3$, $NaNO_2$, $K_2CO_3$, NaAc, Na2SO4, $K_2SO_4$ and NaCl, respectively in each of the samples. Concentrations of the solutions were 2.4 mol/L, except for $K_2SO_4$ (Sample 46), which was less than 2.4 molar due to solubility limitations. A water quenched aggregate was provided as a control in Sample 43. The aggregates were allowed to lab air dry at standard conditions for 27 hours, at 73+/−3° F. and 50% relative humidity.

The efficacy of water retention of the aggregates is inversely indicated by weight percentage of water loss as shown in FIG. 1. The anhydrous sodium acetate (NaAc) of Example 11 reduced the water evaporation to about 41% of that of plain water.

The same aggregates as in Samples 44-50 were re-immersed in water for 30 minutes after being allowed to dry, which is the normal delivery time for ready-mixed concrete. The solution treated aggregates of these Samples 51-57 not only lost less water during drying as indicated in FIG. 1, but also re-absorbed more water when re-immersed for 30 minutes, as indicated in FIG. 2, which plots the unfilled water weight percentage relative to the weight of the aggregates. Assuming the 25% weight gain by quenching with solution indicates full saturation of the lightweight, the graph displays the remaining capillary space in the lightweight after being placed in the concrete mix prior to pump delivery.

The usual weight of lightweight coarse aggregate per cubic yard of concrete ranges from 750 to 900 pounds. If the sodium acetate treated material of Sample 47 were pumped at high pressure, it is estimated that the absorption of free water by the aggregates would be about 28-34 pounds. If the water quenched material of Sample 43 were to be utilized, the potential absorption of free water by the aggregates would be about 73-88 pounds.

Solution quenching or soaking lightweight aggregates, therefore, will prolong moisture condition during transport and storage. In addition, the air space in the pores of treated lightweight aggregates can be more easily and fully filled with water, reducing the quantity and rate of water emissions from the concrete in which they are contained.

Example 12

The purpose of the tests in Example 12 was to demonstrate that even partially filling the lightweight pores with various ionic solutes resulted in lower levels of water vapor emission in the low-density concrete products. The water-cement ratio was <0.45 in added water based on saturated surface dried (SSD) aggregates. The water in the lightweight (not included in this calculation) was about 60 additional pounds. The emissions were obtained from the same concrete mix using differing solute-treated lightweight coarse aggregates. All aggregates were boiled and cooled in solution, or in the case of the tap water, were soaked for 7 days. The concretes were flushed to remove external deposits and then cast in 6×6×2.5 inch rectangular pans, sealed for 3 days to cure and then weighed at intervals to measure moisture vapor emissions until they reached the same level of moisture content of 7.8% of dry weight. Vapor loss measurements were determined based on the changes in weight of the samples and is shown in FIG. 3. The temperature was 73° F.+/−3 and about 50% relative humidity.

As shown in FIG. 3, water and four salt solutions were used to treat the aggregates: tap water ($H_2O$, Sample 51), sodium silicate 8 wt % aqueous solution ($NaSiO_3$, Sample 52), 20 wt % aqueous solution of anhydrous sodium acetate (NaAc, Sample 53), 20 wt % aqueous solution of potassium sulfate ($K_2SO_4$, Sample 54), and 20 wt % aqueous solution of potassium carbonate ($K_2CO_3$, Sample 55). While the concrete made with NaAc treated aggregates (Sample 53) has a water vapor emission of about 12 grams, the concrete made with tap water treated aggregates (Sample 51) has a water vapor emission of about 30 grams.

Example 13

Certain vectors or chemicals that effect change in the concrete as a consequence of their dissolution into the paste may be attached to the lightweight aggregate by allowing a short surface drying time and then applying the appropriate solution to the aggregate or leaving the soak or quench solution on the surface to evaporate and deposit its solute.

The purpose of the tests in Example 13 was to demonstrate the advantage of using the absorbent lightweight as a carrier or vector for materials that accelerate hydration of the cementitious medium thereby promoting densification and hydration. FIG. 4 shows water vapor emission of concrete made from aggregates treated by tap water (Sample 56) and four solutions (Samples 57-60), wherein aggregates were soaked in water (Sample 56) or boiled in aqueous solutions (Samples 57, 58, and 59) or partially dried then dipped in an aqueous solution of 15% NaAc and 5% NaCl (Sample 60).

Vapor loss measurements are provided in FIG. 4 for concretes made from boiled and soaked aggregates versus dipped aggregates. The measurements were determined based on the changes in weight of the samples. In contrast to Samples 51-55, aggregates were not flushed before being blended in concrete mixtures.

The "NaAC/NaCl" dipped Sample 60 portrays concrete made with a lightweight partially dried (1.8% internal moisture), immersed for 5 seconds in the noted solution, allowed to surface dry, and placed in a concrete mix proportioned the same as the other samples. The noted solution is an aqueous solution with 15 wt % of sodium acetate and 5 wt % of sodium chloride.

As evident in FIG. 4, the aggregates that were dipped in the noted solution can be made into a concrete with much lower water vapor emission rate than a concrete made with aggregates treated with water only, such that the rate approximates a concrete made from aggregates boiled and soaked with the same salt solution.

Example 14

The purpose of the test in Example 14 was to demonstrate the effect of the direct addition of salt(s) rather than infusion of the aggregates, according to certain other embodiments of the invention.

One or more salts from any of Samples 43-60 are added directly to concrete having either stone or lightweight aggregate in an amount in a range of about 5 pounds to about 60 pounds of salt (dry weight) per cubic yard of concrete, or about 10 pounds to about 50 pounds, or about 15 pounds to about 40 pounds per cubic yard of concrete (e.g., in the amounts listed above in Tables 5-7). The resulting concrete provides for adequate drying for application of adhesive or water impermeable coating within 60 days or less.

FIG. 5 is a graph showing representative samples of lightweight concrete that have been tested and which illustrate the close correlation between the water evaporation rate and the number of days required for the concrete to reach 75% relative humidity. The X axis is the test number in a sequence of results chosen at random out of 270 tests that were run. The right vertical axis depicts the number of days required to reach 75% IRH on a test cylinder of concrete with an imbedded humidity probe. The left vertical axis depicts the mass of water vapor that escaped from a sample in an evaporative pan made from the same batch.

The data in FIG. 5 illustrates the dichotomy that a higher moisture loss strongly correlates with a prolonged time to reach a state of 75% IRH. This is the very opposite of standard concrete in which high moisture loss would normally indicate higher drying rate and faster time to reach 75% IRH. Since the water contents are the same in each companion sample, it would indicate that the internal pore structure appears to be taking up the available water as it forms, thus inhibiting evaporation as the small pores form and reduce internal humidity. As set forth in the research described below, the smaller pores contain water that is largely non-evaporable, thus the Kelvin equation reflects this with the pore size controlling the IRH of a system.

Yang, et al., "Self-desiccation mechanism of high-performance concrete," Research Lab of Materials Engineering, College of Materials Science and Engineering, Tongji University, Shanghai 200433, China, received Jul. 9, 2003, revision accepted Mar. 15, 2004, explained the phenomenon as follows.

Abstract: Investigations on the effects of W/C ratio and silica fume on the autogenous shrinkage and internal relative humidity of high performance concrete (HPC), and analysis of the self-desiccation mechanisms of HPC showed that the autogenous shrinkage and internal relative humidity of HPC increases and decreases with the reduction of W/C respectively; and that these phenomena were amplified by the addition of silica fume. Theoretical analyses indicated that the reduction of IRH in HPC was not due to shortage of water, but due to the fact that the evaporable water in HPC was not evaporated freely. The reduction of internal relative humidity or the so-called self-desiccation of HPC was chiefly caused by the increase in mole concentration of soluble ions in HPC and the reduction of pore size or the increase in the fraction of micro-pore water in the total evaporable water (Tr/Tte ratio).

Autogenous shrinkage is a term that describes the change in volume of the concrete that is driven by internal forces as opposed to external forces such as evaporation or temperature change. Yang, et al. continue in this vein and conclude that "Theoretical analyses and calculation showed that the reduction of IRH in HPC is not due to shortage of water, but due to the fact that the evaporable water in HPC is not evaporated freely. The main reasons behind the reduction of internal relative humidity or so-called self-desiccation are the increase in mole concentration of soluble ions and the reduction of pore size or the increase in the fraction of micro-pore water in the total evaporable water." This analysis was based on the availability of ions from the cement assuming soluble alkali cement content of 0.6% as sodium oxide or hydrated, 6 pounds of sodium hydroxide (NaOH) in a mix similar to the HPC mix set forth in Table II above.

Example 15

The purpose of the test in Example 15 was to illustrate the beneficial effect on drying time by incorporating hydrophilic salts directly into concrete during the mixing process. Samples 61-64 demonstrate short drying times using hydrophilic salts in lightweight concrete. Samples 65-68 demonstrate short drying times using hydrophilic salts in normal weight concrete. FIG. 6 shows days to 75% humidity for the compositions of Samples 61-64 having about 1.1 wt % $NaNO_2$, about 0.3 wt % sodium thiosulfate hydrate, 0.8 wt % sodium thiosulfate hydrate, and about 1.25 wt % sodium thiosulfate hydrate, respectively. FIG. 7 shows days to 75% humidity for the compositions of Samples 65-68 having about 0.28 wt % sodium thiosulfate hydrate and about 0.09 wt % sodium thiocyanate, about 0.28 wt % sodium thiosulfate hydrate, about 0.55 wt % sodium thiosulfate hydrate and about 0.09 wt % sodium thiocyanate, and about 0.55 wt % sodium thiosulfate hydrate, respectively. (Note: "TS"=Sodium Thiosulfate, $Na_2S_2O_3 \cdot 5H_2O$, M.W. 248; "TC"=Sodium Thiocyanate, NaSCN, M.W 80).

Concrete compositions were made according to Samples 61-68 having the following compositions and data as set forth in Table 24 below.

TABLE 24

| | Sample | | | | | | | |
|---|---|---|---|---|---|---|---|---|
| | 61 | 62 | 63 | 64 | 65 | 66 | 67 | 68 |
| Component (lbs) | | | | | | | | |
| Cement | 400 | 400 | 400 | 400 | 300 | 300 | 300 | 300 |
| Slag (GGBFS) | 400 | 400 | 400 | 400 | 300 | 300 | 300 | 300 |
| ASTM c-33 Sand | 1400 | 1400 | 1400 | 1400 | 1300 | 1300 | 1300 | 1300 |
| Lightweight 17% water by dry wt. | 950 | 950 | 950 | 950 | 0 | 0 | 0 | 0 |
| Pea Gravel | 0 | 0 | 0 | 0 | 1700 | 1700 | 1700 | 1700 |
| Water | 325 | 325 | 325 | 325 | 325 | 325 | 325 | 325 |
| $Na_2S_2O_3 \cdot 5H_2O$ | 0 | 10 | 25 | 40 | 10 | 10 | 20 | 20 |
| $NaNO_2$ | 35 | 0 | 0 | 0 | 0 | 0 | 0 | 0 |
| NaSCN | 0 | 0 | 0 | 0 | 3.2 | 0 | 3.2 | 0 |
| Other Data | | | | | | | | |
| Time to Temperature Rise | 4:10 | 4:00 | 3:45 | 3:00 | 3:30 | 3:45 | 3:30 | 3:15 |

TABLE 24-continued

| | Sample | | | | | | | |
|---|---|---|---|---|---|---|---|---|
| | 61 | 62 | 63 | 64 | 65 | 66 | 67 | 68 |
| Water reducer: oz/100 lbs | 2.9 | 2.9 | 2.9 | 2.9 | 2.9 | 2.9 | 2.9 | 2.9 |

It has been found that additions of sodium or potassium thiosulfate (known as "hypo" in photography) impart significant acceleration of hardening to concrete mixtures. This chemical, or mixtures containing it as a partial component, are effective in increasing the rate of internal humidity reduction. Complementary to this, limited amounts of sodium or potassium thiocyanate may be used as well. The thiocyanate ion in concentrations greater than 1% by weight of cement is known create a condition that can be corrosive to reinforcement and is therefore limited for durability reasons. If the concrete is to be dry in service, larger amounts may be used (assuming prior investigation of galvanic activity potential).

Example 16

The purpose of the test in Example 16 was to illustrate the beneficial effect on relative humidity over time by using sodium nitrite substantially free of a silica fume in a cementitious mix according to an embodiment of the invention and sodium nitrite and a silica fume in a cementitious mix according to another embodiment of the invention. Sample 69 is a cementitious mix having about 30 $lb/yd^3$ of sodium nitrite but substantially free of silica fume. Sample 70 is a cementitious mix having about 20 $lb/yd^3$ of sodium nitrite and about 15% by weight of the cementitious mix. FIG. 8 is a graphical representation showing the relative humidity over time for these two exemplary embodiments of cementitious mixes of the invention. As shown in FIG. 8, Sample 70 having silica fume and 20 $lb/yd^3$ of sodium nitrite has about a 4% reduction in average relative humidity in comparison to Sample 69 having 30 $lb/yd^3$ of sodium nitrite but being substantially free of silica fume. Indeed, as further shown in FIG. 8, the relative humidity of the cementitious mix having both the sodium nitrite and silica fume begins to experience relative humidities that are lower than that of Sample 69 after about 22 days of drying.

Example 17

The purpose of the test in Example 17 was to illustrate the beneficial effect on relative humidity over time by using increasing concentrations of sodium nitrite in a cementitious mix according to an embodiment of the invention. Sample 71 has no sodium nitrite, while samples 72, 73, 74, and 75 have 10 $lb/yd^3$, 20 $lb/yd^3$, 30 $lb/yd^3$, and 40 $lb/yd^3$ of sodium nitrite, respectively. As shown in FIG. 9, which is a chart illustrating the relative humidity over time for cementitious compositions having various concentration of sodium nitrite according to certain embodiments of the invention, the cements having greater amounts of sodium nitrite—i.e., on the order of 30 $lb/yd^3$ to even 40 $lb/yd^3$—exhibit the greatest relative reductions in relative humidity over the course of drying the concrete. As further shown in FIG. 9, the use of these higher concentrations of sodium nitrite lead to relative humidities that are about 20% less than the relative humidity of the concrete substantially free of sodium nitrite after about 25 days of drying time. According to these examples, the use of on the order of 40 $lb/yd^3$ of sodium nitrite results in a reduction in relative humidity of about 9% in comparison to the relative humidity of a concrete having about 10 $lb/yd^3$ of sodium nitrite.

Example 18

The purpose of the test in Example 18 was to illustrate the beneficial effect on relative humidity over time by using increasing concentrations of sodium nitrite in a cementitious mix according to another embodiment of the invention having a different kind of cement than that used in Example 17. Sample 76 has no sodium nitrite, while samples 77, 78, 79, and 80 have 10 $lb/yd^3$, 20 $lb/yd^3$, 30 $lb/yd^3$, and 40 $lb/yd^3$ of sodium nitrite, respectively. As shown in FIG. 9, which is a chart illustrating the relative humidity over time for cementitious compositions having various concentration of sodium nitrite according to certain embodiments of the invention, the cements having greater amounts of sodium nitrite—i.e., on the order of 30 $lb/yd^3$ to even 40 $lb/yd^3$—exhibit the greatest relative reductions in relative humidity over the course of drying the concrete. As further shown in FIG. 10, the use of these higher concentrations of sodium nitrite lead to relative humidities that are about 20% less than the relative humidity of the concrete substantially free of sodium nitrite after about 25 days of drying time. Furthermore, the use of on the order of 40 $lb/yd^3$ of sodium nitrite results in a reduction in relative humidity of about 6% in comparison to the relative humidity of a concrete having about one-half of that concentration of sodium nitrite. Examples 17 and 18 show the unexpected results that can be achieved based upon the mere differences in types of cement that are used.

Example 19

The purpose of the test in Example 19 was to illustrate the extent of reductions in relative humidity over time by using increasing concentrations of sodium nitrite in a cementitious mix according to yet another embodiment of the invention. Sample 81 has no sodium nitrite, while samples 82, 83, and 84 have 20 $lb/yd^3$, 30 $lb/yd^3$, and 40 $lb/yd^3$ of sodium nitrite, respectively. As shown in FIG. 11, which is a graph illustrating the internal relative humidity over time for the cementitious compositions of samples 81-84. In the exemplary examples of FIG. 11, the cementitious composition of Sample 84 having about 40 pcy or 1 $lb/yd^3$ of sodium nitrite generally provides the lowest internal relative humidity for these concretes.

COMPARATIVE STUDY

A comparative study was performed comparing the difference in internal relative humidity achieved by various cementitious compositions. The cementititous compositions of Test Runs 3, 5-7, 9-13, and 15-16 are examples of embodiments employing alkali metal salts in accordance with the disclosed invention. Test Runs 1A, 1B, 3, 4, 8 and 14 are comparative examples of cementitious compositions that do not employ alkali metal salts and do not perform in accordance with the disclosed invention. Test Runs 8 and 14 are further show that employing an alkaline earth metal salt (calcium nitrate) is not significantly better than using no salt relative to achieving a desired low IRH.

Test Runs 1 to 3

Test Runs 1 and 2 were prepared according to Example 1 of EP 1903014 (Chanvillard et al.), with Test Run 1B being a repeat of Test Run 1A. Test Run 3 was prepared in an identical manner to Test Runs 1 and 2, except that Test 3 included a water vapor attenuation agent, i.e., sodium nitrite. The cementitious compositions were formed into 4 inch mortar cylinders. The cementitious compositions for Test Runs 1 to 3 are set forth in Table 25.

TABLE 25

| Component and Amount | Test Run | | | |
| --- | --- | --- | --- | --- |
| | 1A | 1B | 2 | 3 |
| Cement - Hanson Cupertino Type II/V (g) | 500 | 500 | 500 | 500 |
| Slag - Lehigh Nippon Grade 120 (g) | 215 | 215 | 215 | 215 |
| Expansive Agent - Calcium Oxide (g) | 42 | 42 | — | 42 |
| Water Vapor Attenuation Agent - Sodium Nitrite (g) | — | — | — | 22 |
| Fine Aggregate - Vulcan Pleasanton Top Sand (g) | 1434 | 1434 | 1434 | 1434 |
| Shrinkage Reducing Agent - MasterLIFE 20 (ml) | 3.3 | 3.3 | 3.3 | 3.3 |
| Glenium 7500 superplasticizer (ml) | 2.1 | 2.1 | 2.1 | 2.1 |
| Water (g) | 290 | 290 | 280 | 293 |
| Water-to-Cementitious Binder Ratio (w/cm) | 0.38 | 0.38 | 0.39 | 0.38 |

The internal relative humidities for Test Runs 1 to 3 were periodically measured using Vaisala HMP4Os relative humidity sensors and are set forth in Table 26. FIG. 12 is a bar graph comparing the 19-day internal relative humidity for Test Runs 1 to 3. FIG. 13 is a line graph comparing the internal relative humidity for Test Runs 1 to 3 for all sampled days.

TABLE 26

| Internal Relative Humidity (Day and %) | Test Run | | | |
| --- | --- | --- | --- | --- |
| | 1A | 1B | 2 | 3 |
| Day 10 | 93.7 | 93.6 | 91.9 | 83 |
| Day 11 | 96.0 | 97.7 | 94.6 | 86 |
| Day 12 | 96.3 | 96.2 | 94.7 | 85.8 |
| Day 14 | 95.5 | 95.8 | 94 | 84.1 |
| Day 19 | 94.8 | 95.2 | 94.3 | 82.6 |
| Day 21 | 94.6 | 94.4 | 93.4 | 82.3 |
| Day 25 | 93.6 | 93.2 | 92.7 | 81 |
| Day 28 | 92.9 | 92.7 | 92.2 | 80.1 |
| Day 32 | 92.7 | 91.3 | 91.9 | 79.1 |
| Day 35 | 92.4 | 90.6 | 91.3 | 78.4 |
| Day 38 | 91.7 | 90.1 | 90.5 | 78.1 |
| Day 41 | 91 | 90.6 | 90.3 | 77.8 |
| Day 45 | 90.5 | 89 | 90.3 | 77.1 |
| Day 47 | 90.4 | 87.9 | 89.7 | 76.2 |

As shown in Table 31 and FIGS. 12 and 13, the internal relative humidity values for Test Run 3 at each day were significantly lower than for each of Test Runs 1 and 2. Moreover, the highest internal relative humidity value for Test Run 3 occurred at Day 11 and was significantly lower than the lowest internal relative humidity values for Test Runs 1 and 2, which occurred at Day 47. This data indicate that the addition of sodium nitrite caused a dramatic reduction in the internal relative humidity of the cementitious composition compared to the same or similar compositions made according to Chanvillard.

Test Runs 4 to 7

Test Run 4 was prepared in a manner consistent with Example 1 of Chanvillard but included less cement and more slag. Test Runs 5 to 7 were prepared in similar fashion, except that a water vapor attenuation agent—sodium nitrite—was added to the cementitious compositions and the amounts of other components were altered to determine if and how such alterations would affect the internal relative humidity. Further, the amount of the water vapor attenuation agent (sodium nitrite) in Test Runs 5 to 7 was greater than in Test Run 3, above. The cementitious compositions for Test Runs 4 to 7 are set forth in Table 27.

TABLE 27

| Component and Amount | Test Run | | | |
|---|---|---|---|---|
| | 4 | 5 | 6 | 7 |
| Cement - Hanson Cupertino Type II/V (g) | 400 | 400 | 400 | 400 |
| Slag - Lehigh Nippon Grade 120 (g) | 400 | 400 | 400 | 400 |
| Expansive Agent - Calcium Oxide (g) | — | — | 44 | — |
| Water Vapor Attenuation Agent - Sodium Nitrite (g) | — | 40 | 40 | 40 |
| Fine Aggregate - Vulcan Pleasanton Top Sand (g) | 1400 | 1400 | 1400 | 1400 |
| Shrinkage Reducing Agent - MasterLIFE 20 (ml) | 8.3 | 8.3 | 8.3 | — |
| Glenium 7500 superplasticizer (ml) | 2.4 | 2.3 | 2.3 | 2.6 |
| Water (g) | 267 | 267 | 282 | 267 |
| Water-to-Cementitious Binder Ratio (w/cm) | 0.33 | 0.33 | 0.33 | 0.33 |

The internal relative humidities for Test Runs 4 to 7 were periodically measured using Vaisala HMP4Os relative humidity sensors and are set forth in Table 28. FIG. 14 is a bar graph comparing the 19-day internal relative humidity for Test Runs 4 to 7. FIG. 15 is a line graph comparing the internal relative humidity for Test Runs 4 to 7 for all sampled days.

TABLE 28

| Internal Relative Humidity (Day and %) | Test Run | | | |
|---|---|---|---|---|
| | 4 | 5 | 6 | 7 |
| Day 10 | 91 | 73.5 | 73 | 72.8 |
| Day 11 | 92.8 | 76 | 75 | 74.7 |
| Day 12 | 93.7 | 76.8 | 75.8 | 75.7 |
| Day 14 | 92.7 | 73.7 | 72.7 | 73 |
| Day 19 | 91.8 | 73 | 71.9 | 71.5 |
| Day 21 | 91.8 | 72.4 | 71.4 | 71.3 |
| Day 25 | 90.4 | 70.2 | 70.6 | 70.1 |
| Day 28 | 90.1 | 69.9 | 70 | 69.5 |
| Day 32 | 89.6 | 70.4 | 69.7 | 69.2 |
| Day 35 | 89.1 | 69.6 | 68.9 | 69 |
| Day 38 | 88.6 | 69.4 | 69.2 | 68.5 |
| Day 41 | 89.1 | 69.9 | 69.9 | 68.8 |
| Day 45 | 88.1 | 98.7 | 68.8 | 68.5 |
| Day 47 | 87.4 | 68.8 | 68.3 | 67.8 |

As shown in Table 3 and FIGS. 14 and 15, the internal relative humidity values for Test Runs 5 to 7 were significantly lower than that of Test Run 4. Moreover, the highest internal relative humidity values for Test Runs 5 to 7 occurred at Day 12 and were significantly lower than the lowest internal relative humidity value for Test Run 4, which occurred at Day 47 This data indicate that the addition of sodium nitrite caused a dramatic reduction in the internal relative humidity of the cementitious composition compared to the same or similar compositions.

FIG. 16 is a bar graph comparing the 10-day internal relative humidity for Test Runs 1 to 7, which graphically illustrates the dramatically lower internal relative humidity values for Test Runs 3 and 5 to 7, which contained sodium nitrite, compared to Test Runs 1A, 1B, 2 and 4, which contained no sodium nitrite. FIG. 16 also illustrates the further reduction in internal relative humidity values for Test Runs 5 to 7 as a result of including a higher quantity of sodium nitrite compared to Test Run 3.

This data indicate that addition of sodium nitrite caused a substantial reduction in internal relative humidity and that including or not including an expansive agent and/or a shrinkage reducing agent of Chanvillard had no significant effect on internal relative humidity. This data further demonstrate that using an increased amount of sodium nitrite further reduced the internal relative humidity compared to using a lower amount, thereby showing a clear discernable trend covering a range of alkali metal salt concentrations. We qualify this statement by noting that reducing the w/cm from 0.38 (Run 1) to 0.33 (Run 4) and/or altering the quantities of cement and slag from 500 g and 210 g (Runs 1 to 3) to 400 g and 400 g (Runs 4 to 7), respectively, apparently reduced the 14-day internal relative humidity from 95.5 (Run 1) to 92.7 (Run 4). However, in the absence of including the alkali metal salt, such measures did not cause the cementitious compositions to achieve an IRH of 75% in 50 days or less.

Test Runs 8 to 13

The cementitious compositions for Test Runs 8 to 13 are set forth in Table 29 and included one of various alkali metal or alkaline earth metal salts.

TABLE 29

| Component and Amount | Test Run | | | | | |
|---|---|---|---|---|---|---|
| | 8 | 9 | 10 | 11 | 12 | 13 |
| Cement - Hanson Cupertino II/V (g) | 400 | 400 | 400 | 400 | 400 | 400 |
| Slag - Lehigh Muroran (g) | 400 | 400 | 400 | 400 | 400 | 400 |
| Fine Aggregate - Hanson Sechelt (g) | 1300 | 1300 | 1300 | 1300 | 1300 | 1300 |
| Glenium 7500 (ml) | 2.3 | 2.9 | 3.1 | 2.9 | 2.9 | 2.8 |
| Calcium Nitrate (g) | 47.6 | — | — | — | — | — |
| Sodium Nitrite (g) | — | 20 | — | — | — | — |
| Lithium Nitrate (g) | — | — | 20 | — | — | — |

TABLE 29-continued

| Component and Amount | Test Run | | | | | |
|---|---|---|---|---|---|---|
| | 8 | 9 | 10 | 11 | 12 | 13 |
| Sodium Bromide (g) | — | — | — | 34.5 | — | — |
| Sodium Chloride (g) | — | — | — | — | 16.9 | — |
| Potassium Chloride (g) | — | — | — | — | — | 21.6 |
| Water, As Batched (g) | 270 | 270 | 270 | 270 | 270 | 270 |

Test Runs 8 to 13 compared the effect of various salts on internal relative humidity (IRH) using a standard cementitious composition. The IRH values for Test Runs 8 to 13 were tested in a manner similar to Test Runs 1 to 7 and are set forth in the line graph of FIG. 17. As shown by the test data in FIG. 17, the alkali metal salts—sodium nitrite, lithium nitrate, sodium bromide, sodium chloride, and potassium chloride—were far superior to calcium nitrate in reducing IRH. There was little difference between lithium nitrate and sodium nitrite, which indicates that lithium and sodium salts behave similarly, as do nitrate and nitrite salts. The alkali metal halide salts all behaved about the same regardless of the alkali metal cation or halide anion. However, calcium nitrate substantially underperformed every alkali metal salt. Alkali metal salts were therefore found to be unexpectedly superior to calcium salts in reducing IRH of concrete.

Test Runs 14 to 16

The cementitious compositions for Test Runs 14 to 16 are set forth in Table 30 and included either no salt, calcium formate, or sodium formate.

TABLE 30

| Component and Amount | Test Run | | |
|---|---|---|---|
| | 14 | 15 | 16 |
| Cement - Hanson Cupertino II/V (g) | 800 | 800 | 800 |
| Fine Aggregate - Hanson Sechelt (g) | 1450 | 1450 | 1450 |
| Glenium 7500 (ml) | 2.6 | 2.9 | 2.9 |
| Calcium Formate (g) | — | 20 | — |
| Sodium Formate (g) | — | — | 20 |
| Water, As Batched (g) | 270 | 270 | 270 |

Test Runs 14 to 16 compared the effect on internal relative humidity (IRH) of using either no additive, calcium formate, or sodium formate in a standard cementitious composition. The IRH values for Test Runs 14 to 16 were tested in a manner similar to Test Runs 1 to 7 and are set forth in the line graph of FIG. 18. As clearly shown, sodium formate was far superior to calcium formate in reducing internal relative humidity of the hardened concrete. In addition, using calcium formate was not much better than using no additive at all. This further shows the unexpected superiority of using alkali metal salts to reduce IRH and also the unexpected lack of benefit of using calcium formate in place of using no additive.

All publications mentioned herein, including patents, patent applications, and journal articles are incorporated herein by reference in their entireties including the references cited therein, which are also incorporated herein by reference. The publications discussed herein are provided solely for their disclosure prior to the filing date of the present application. Nothing herein is to be construed as an admission that the present invention is not entitled to antedate such publication by virtue of prior invention. Neither should the citation of documents herein be construed as an admission that the cited documents are considered material to the patentability of the claims of the various embodiments of the invention. Further, the dates of publication provided may be different from the actual publication dates which may need to be independently confirmed.

Many modifications and other embodiments of the invention set forth herein will come to mind to one skilled in the art to which this invention pertains having the benefit of the teachings presented in the descriptions herein and the associated drawings. For example, though various methods are disclosed herein, one skilled in the art will appreciate that various other methods now know or conceived in the art will be applied to a subject in conjunction with the methods of treatments or therapies disclosed herein. Therefore, it is to be understood that the invention is not to be limited to the specific embodiments disclosed and that modifications and other embodiments are intended to be included within the scope of the appended claims.

The invention claimed is:

1. A cementitious composition comprising:
   a hydraulic cement;
   an aggregate;
   one or more water soluble alkali metal salts having a cation to anion molar ratio of at least 1 and a concentration in a range of about 5 pounds per cubic yard (pcy) to about 60 pcy of the cementitious composition based on a sodium nitrite equivalent; and
   water,
   wherein the hydraulic cement, aggregate, one or more water soluble alkali metal salts, and water are selected and proportioned so that the cementitious composition has a water to cementitious binder ratio (w/cm) in a range of 0.2 to 0.7, and
   wherein the one or more water soluble alkali metal salts reduce internal relative humidity (IRH) of hardened concrete made from the cementitious composition.

2. The cementitious composition of claim 1, wherein the cementitious composition produces hardened concrete that achieves an internal relative humidity (IRH) of 80% or less in 50 days or less when evaluated in accordance with ASTM F 2170.

3. The cementitious composition of claim 1, wherein the cementitious composition produces hardened concrete that achieves an internal relative humidity (IRH) of 75% or less in 50 days or less when evaluated in accordance with ASTM F 2170.

4. The cementitious composition of claim 1, wherein the cementitious composition produces hardened concrete containing a number of moles of remaining free water and a number of moles of dissolved ions according to Equation (I):

$$\text{Moles Free Water} \div (\text{Moles Free Water} + \text{Moles Dissolved Ions}) \leq 0.80 \quad (I).$$

5. The cementitious composition of claim 1, wherein the one or more water soluble alkali metal salts comprise at least one alkali metal cation selected from the group consisting of lithium, potassium, and sodium and at least one monovalent or divalent anion selected from the group consisting of formate, acetate, sulfate, thiosulfate, thiosulfate hydrate, bromide, chloride, thiocyanate, nitrite, and nitrate.

6. The cementitious composition of claim 1, wherein the one or more water soluble alkali metal salts comprises an alkali metal salt having a concentration in a range of about 5 (MW/IPM÷34.5) pounds per cubic yard (pcy) to about 60 (MW/IPM÷34.5) pcy of the cementitious composition, where MW=molecular weight and IPM=ions per molecule for the alkali metal salt.

7. The cementitious composition of claim 6, wherein the alkali metal salt has a concentration in a range of about 10 (MW/IPM÷34.5) pcy to about 50 (MW/IPM÷34.5) pcy of the cementitious composition.

8. The cementitious composition of claim 1, wherein the aggregate comprises a lightweight aggregate and the cementitious composition yields lightweight concrete.

9. The cementitious composition of claim 8, wherein the lightweight aggregate comprises at least one of slag, shale, clay, slate, expanded slag, expanded shale, expanded clay, expanded slate, cinders, scoria, pumice, tuff, perlite, or vermiculite.

10. The cementitious composition of claim 1, wherein the aggregate comprises a porous lightweight aggregate, and wherein the one or more water soluble alkali metal salts comprise one or both of an alkali metal formate and an alkali metal thiocyanate.

11. A concrete composition comprising the mixture products of:
a hydraulic cement;
an aggregate;
one or more water soluble alkali metal salts having a cation to anion molar ratio of at least 1 and a concentration in a range of about 5 pounds per cubic yard (pcy) to about 60 pcy of the concrete composition based on a sodium nitrite equivalent; and
water,
wherein the hydraulic cement, aggregate, one or more water soluble alkali metal salts, and water are selected and proportioned so that the concrete composition, when freshly prepared, has a water to cementitious binder ratio (w/cm) in a range of 0.2 to 0.7, and, after hardening to form hardened concrete, the one or more water soluble alkali metal salts reduce internal relative humidity (IRH) of the hardened concrete.

12. The composition of claim 11, wherein the hardened concrete achieves an internal relative humidity (IRH) of 80% or less in 50 days or less when evaluated in accordance with ASTM F 2170.

13. The concrete composition of claim 11, wherein the one or more water soluble alkali metal salts comprise at least one alkali metal cation selected from the group consisting of lithium, potassium, and sodium and at least one monovalent or divalent anion selected from the group consisting of formate, acetate, sulfate, thiosulfate, thiosulfate hydrate, bromide, chloride, thiocyanate, nitrite, and nitrate.

14. The concrete composition of claim 11, wherein the aggregate comprises a lightweight aggregate and the concrete composition is lightweight concrete.

15. The concrete composition of claim 14, wherein the lightweight aggregate comprises at least one of slag, shale, clay, slate, expanded slag, expanded shale, expanded clay, expanded slate, cinders, scoria, pumice, tuff, perlite, or vermiculite.

16. The concrete composition of claim 11, wherein the aggregate comprises a porous lightweight aggregate, and wherein the one or more water soluble alkali metal salts comprise one or both of an alkali metal formate and an alkali metal thiocyanate.

17. A cementitious composition comprising:
a hydraulic cement;
an aggregate;
one or more water soluble alkali metal salts having a cation to anion molar ratio of at least 1 and a concentration in a range of about 0.2% to about 4% by weight of the cementitious composition based on a sodium chloride equivalent; and
water,
wherein the hydraulic cement, aggregate, one or more water soluble alkali metal salts, and water are selected and proportioned so that the cementitious composition has a water to cementitious binder ratio (w/cm) in a range of 0.2 to 0.7, and
wherein the one or more water soluble alkali metal salts reduce internal relative humidity (IRH) of hardened concrete made from the cementitious composition.

18. The cementitious composition of claim 17, wherein the one or more water soluble alkali metal salts have a concentration in a range of about 0.5% to about 2.5% by weight of the cementitious composition based on a sodium chloride equivalent.

19. The cementitious composition of claim 17, wherein the one or more water soluble alkali metal salts comprise at least one alkali metal cation selected from the group consisting of lithium, potassium, and sodium and at least one monovalent or divalent anion selected from the group consisting of formate, acetate, sulfate, thiosulfate, thiosulfate hydrate, bromide, chloride, thiocyanate, nitrite, and nitrate.

20. The cementitious composition of claim 17, wherein the aggregate comprises a lightweight aggregate and the cementitious composition yields lightweight concrete.

21. A concrete composition comprising the mixture products of:
a hydraulic cement;
an aggregate;
one or more water soluble alkali metal salts having a cation to anion molar ratio of at least 1 and a concentration in a range of about 0.2% to about 4% by weight of the concrete composition based on a sodium chloride equivalent; and
water,
wherein the hydraulic cement, aggregate, one or more water soluble alkali metal salts, and water are selected and proportioned so that the concrete composition, when freshly prepared, has a water to cementitious binder ratio (w/cm) in a range of 0.2 to 0.7, and, after hardening to form hardened concrete, the one or more water soluble alkali metal salts reduce internal relative humidity (IRH) of the hardened concrete.

* * * * *